US005532742A

United States Patent [19]

Kusaka et al.

[11] Patent Number: 5,532,742

[45] Date of Patent: Jul. 2, 1996

[54] IMAGE PICKUP APPARATUS WITH HORIZONTAL LINE INTERPOLATION FUNCTION HAVING THREE IMAGE PICKUP UNITS SHIFTED IN VERTICAL PHASE FROM ONE ANOTHER

[75] Inventors: Hiroya Kusaka, Kawanishi; Takashi Sakaguchi, Yamatotakada; Masaaki Nakayama, Hirakata, all of Japan

[73] Assignee: Matsushita Electric Industrial Co., Ltd., Kadoma, Japan

[21] Appl. No.: 211,151

[22] PCT Filed: Jul. 19, 1993

[86] PCT No.: PCT/JP93/01002

§ 371 Date: Mar. 22, 1994

§ 102(e) Date: Mar. 22, 1994

[87] PCT Pub. No.: WO94/03015

PCT Pub. Date: Feb. 3, 1994

[30] Foreign Application Priority Data

| | | | |
|---|---|---|---|
| Jul. 22, 1992 | [JP] | Japan | 4-195095 |
| Jul. 22, 1992 | [JP] | Japan | 4-195096 |
| Jul. 22, 1992 | [JP] | Japan | 4-195097 |
| Jul. 22, 1992 | [JP] | Japan | 4-195099 |
| Feb. 2, 1993 | [JP] | Japan | 5-015171 |

[51] Int. Cl.$^6$ .................. H04N 9/09

[52] U.S. Cl. .................. 348/264; 348/265; 348/222

[58] Field of Search .................. 348/262–265, 348/240, 571, 222; H04N 5/247, 5/232, 9/09

[56] References Cited

U.S. PATENT DOCUMENTS

| | | | |
|---|---|---|---|
| 3,975,760 | 8/1976 | Yamanaka et al. | 358/41 |
| 4,322,740 | 3/1982 | Takemoto et al. | 358/44 |
| 4,951,125 | 8/1990 | Kojima et al. | 348/561 |
| 5,268,758 | 12/1993 | Nakayama et al. | 348/571 |

FOREIGN PATENT DOCUMENTS

| | | | |
|---|---|---|---|
| 0477884 | 4/1992 | European Pat. Off. | G06F 16/62 |
| 55-130284 | 10/1980 | Japan | H04N 9/04 |
| 56-54115 | 12/1981 | Japan | H04N 9/04 |
| 59-160390 | 9/1984 | Japan | H04N 9/04 |
| 2-61248 | 12/1990 | Japan | H04N 7/18 |

OTHER PUBLICATIONS

EPO Search Report (93916186.5) dated Dec. 27, 1994.

*Primary Examiner*—James J. Groody
*Assistant Examiner*—Cheryl Cohen
*Attorney, Agent, or Firm*—Ratner & Prestia

[57] ABSTRACT

In an image pickup apparatus with a horizontal line interpolation function having a plurality of solid state image pickup elements, three chrominance signals obtained from the plurality of solid state image pickup elements are shifted in vertical phase from one another, whereby when a horizontal interpolation line is synthesized, in the case where the interpolated video signal is viewed as a whole of three chrominance signals (e.g. when a luminance signal synthesized from G, R, and B signals by matrix operation is considered), deterioration in vertical frequency response characteristic can be reduced, and deterioration in vertical sharpness of an image can be reduced. Further, by combining a frame signal in a pseudo fashion, a high-quality frame still image can be formed.

20 Claims, 36 Drawing Sheets

H HORIZONTAL INTERPOLATION LINE
k−1, k, k+1, k+2 LINE NUMBER

RB COLOR STRIPE FILTER

H HORIZONTAL INTERPOLATION LINE
k−1, k, k+1, k+2 LINE COVER $R_m = R_n$ , $G_m = \frac{G_{n-1} + G_{n+1}}{2}$ , $B_m = R_n$ $R_m = w \cdot R_{n+2} + (1 - w) \cdot R_n$ $G_m = (w + p) \cdot G_{n+1} + (1 - w - p) \cdot G_{n-1}$ $B_m = w \cdot B_{n+2} + (1 - w) \cdot B_n$ $$R_{m-1} = \frac{R_{n-2} + R_n}{2} \qquad G_{m-1} = G_{n-1} \qquad B_{m-1} = \frac{B_{n-2} + B_n}{2}$$

$$R_m = R_n \qquad G_m = \frac{G_{n-1} + G_{n+1}}{2} \qquad B_m = B_n$$

$$R_{m+1} = \frac{R_n + R_{n+2}}{2} \qquad G_{m+1} = G_{n+1} \qquad B_{m+1} = \frac{B_n + B_{n+2}}{2}$$

$$R_{m-1}=\frac{R_{n-2}+R_n}{2} \quad G_{m-1}=G_{n-1} \quad B_{m-1}=\frac{B_{n-2}+B_n}{2}$$

$$R_m=R_n \quad G_m=\frac{G_{n-1}+G_{n+1}}{2} \quad B_m=B_n$$

$$Y_{m-1}=0.3R_{m-1}+0.59G_{m-1}+0.11B_{m-1}$$

$$=0.3\frac{R_{n-2}+R_n}{2}+0.59G_{n-1}+0.11\frac{B_{n-2}+B_n}{2}$$

$$Y_m=0.3R_n+0.59\frac{G_{n-1}+G_{n+1}}{2}+0.11B_n$$

$$(R-Y)_{m-1}=0.7\frac{R_{n-2}+R_n}{2}-0.59G_{n-1}-0.11\frac{B_{n-2}+B_n}{2}$$

$$(R-Y)_m=0.7R_n-0.59\frac{G_{n-1}+G_{n+1}}{2}-0.11B_n$$

$$(B-Y)_{m-1}=-0.3\frac{R_{n-2}+R_n}{2}-0.59G_{n-1}+0.89\frac{B_{n-2}+B_n}{2}$$

$$(B-Y)_m=-0.3R_n-0.59\frac{G_{n-1}+G_{n+1}}{2}+0.89B_n$$

$$R_m = R_n \qquad G_m = \frac{G_{n-1} + G_{n+1}}{2} \qquad B_m = B_n$$

$$R_{m+1} = \frac{R_n + R_{n+2}}{2} \qquad G_{m+1} = G_{n+1} \qquad B_{m+1} = \frac{B_n + B_{n+2}}{2}$$

$$Y_m = 0.3R_n + 0.59\frac{G_{n-1} + G_{n+1}}{2} + 0.11B_n$$

$$Y_{m+1} = 0.3\frac{R_n + R_{n+2}}{2} + 0.59G_{n+1} + 0.11\frac{B_n + B_{n+2}}{2}$$

$$(R-Y)_m = 0.7R_n - 0.59\frac{G_{n-1} + G_{n+1}}{2} - 0.11B_n$$

$$(R-Y)_{m+1} = 0.7\frac{R_n + R_{n+2}}{2} - 0.59G_{n+1} - 0.11\frac{B_n + B_{n+2}}{2}$$

$$(B-Y)_m = -0.3R_n - 0.59\frac{G_{n-1} + G_{n+1}}{2} + 0.89B_n$$

$$(B-Y)_{m+1} = -0.3\frac{R_n + R_{n+2}}{2} - 0.59G_{n+1} + 0.89\frac{B_n + B_{n+2}}{2}$$

$$R_m = R_n,\ G_m = \frac{G_{n-1} + G_{n+1}}{2},\ B_m = B_n$$

$$R_m = \frac{R_{n-1} + R_{n+1}}{2},\ G_m = G_n,\ B_m = \frac{B_{n-1} + B_{n+1}}{2}$$

FIG.33

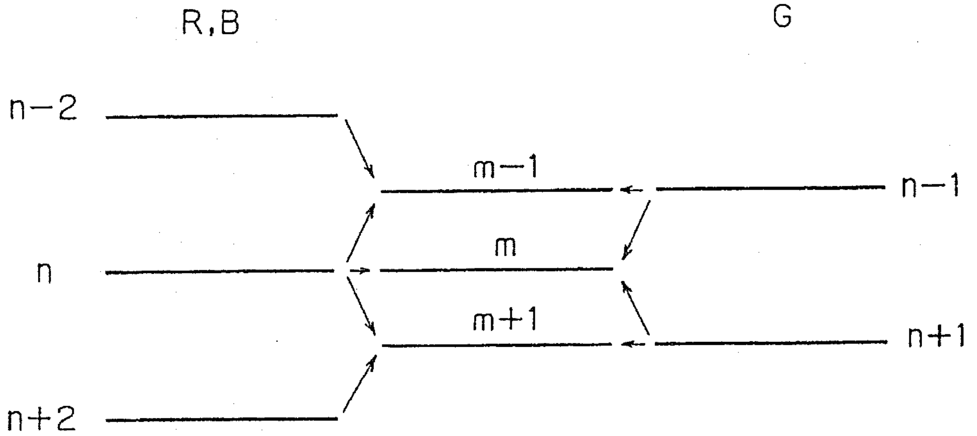

$$R_{m-1}=\frac{R_{n-2}+R}{2} \qquad G_{m-1}=G_{n-1} \qquad B_{m-1}=\frac{B_{n-2}+B_{n}}{2}$$

$$R_{m}=R_{n} \qquad G_{m}=\frac{G_{n-1}+G_{n+1}}{2} \qquad B_{m}=B_{n}$$

$$R_{m+1}=\frac{R_{n}+R_{n+2}}{2} \qquad G_{m+1}=G_{n+1} \qquad B_{m+1}=\frac{B_{n}+B_{n+2}}{2}$$

$$Y_{m-1}=0.3R_{m-1}+0.59G_{m-1}+0.11B_{m-1}$$

$$=0.3\frac{R_{n-2}+R_{n}}{2}+0.59G_{n-1}+0.11\frac{B_{n-2}+B_{n}}{2}$$

$$Y_{m}=0.3R_{n}+0.59\frac{G_{n-1}+G_{n+1}}{2}+0.11B_{n}$$

$$(R-Y)_{m-1}=0.7\frac{R_{n-2}+R_{n}}{2}-0.59G_{n-1}-0.11\frac{B_{n-2}+B_{n}}{2}$$

$$(R-Y)_{m}=0.7R_{n}-0.59\frac{G_{n-1}+G_{n+1}}{2}-0.11B_{n}$$

$$(B-Y)_{m-1}=-0.3\frac{R_{n-2}+R_{n}}{2}-0.59G_{n-1}+0.89\frac{B_{n-2}+B_{n}}{2}$$

$$(B-Y)_{m}=-0.3R_{n}-0.59\frac{G_{n-1}+G_{n+1}}{2}+0.89B_{n}$$

IMAGE PICKUP APPARATUS WITH HORIZONTAL LINE INTERPOLATION FUNCTION HAVING THREE IMAGE PICKUP UNITS SHIFTED IN VERTICAL PHASE FROM ONE ANOTHER

TECHNICAL FIELD

The present invention relates to an electronic zoom function circuit, a motion correction circuit for implementing motion correction, and a function of obtaining frame image signals of high image quality in an image pickup apparatus such as a video camera, and more specifically, relates to an image pickup apparatus with a horizontal line interpolation function having a horizontal line interpolation function in which an electronic horizontal line interpolation process is implemented by arithmetically processing a video signal, and having a function in which a pseudo frame signal is generated by arithmetically processing a video signal.

BACKGROUND ART

In recent years, in image pickup apparatus such as video cameras, the apparatus have been advanced with reduction in size and weight, high-multiplification zooming, and moreover multi-function, so that product development is undergoing in which the optical zoom and electronic zoom functions are interlocked. Also, as users have spread over from children to the old as well as conventional enthusiasts, screen blurs due to hand blurs are generated, and there have been marketed image pickup apparatus provided with a motion correction circuit using electronic zoom function.

A conventional motion corrector device using the electronic zoom function is shown in, for example, TV society technical report Vol. 11, No. 3 (May. 1987).

The conventional motion correction circuit having an electronic zoom function is described below.

An input signal is converted into a digital signal by an A/D converter and fed to a motion vector detector circuit and a memory circuit, and in the motion vector detector circuit video signals of two fields are compared to detect a motion vector, and in a memory control circuit using the motion vector to obtain a stub signal corrected for hand blurs from the memory circuit, and a memory output signal is formed into a normal video signal by an interpolation circuit which is controlled by an interpolation control circuit and is converted into an analog signal by a D/A converter circuit.

In this way, a motion vector is detected from two-field video signals, and hand blurs are corrected by the interpolation function.

As another example of the conventional image pickup apparatus having a horizontal line interpolation function, there is listed, e.g., "An image pickup apparatus" of U.S. Pat. No. 4,951,125 (registered on Aug. 21, 1990), which was filed by the present applicant and registered.

The conventional motion correction circuit having an electronic zoom function is described below.

The above conventional example comprises: a solid state image pickup element; an image pickup element drive circuit for controlling the transfer and halt of vertical transfer (scanning) of the solid state image pickup element with a control signal (denoted by CTL1); a switching unit for apportioning an output signal SO of the solid state image pickup element according to a control signal (denoted by CTL2) to a first line memory M1 through an nth line memory Mn ($n \geqq 3$, where n is an integer); a selector for selecting output signals of m lines out of the line memories M1 through Mn ($2 \leqq m < n$, where m is an integer) according to a control signal (denoted by CTL3); one or a plurality of multipliers for multiplying output signals S1 through Sm of the selector with weighting signals W1 through Wm, respectively; an adder for adding output signals of the multipliers; and a control signal generator circuit for generating the control signals CTL1, CTL2, CTL3, and W1 through Wm, wherein the switching unit is controlled in such a way that, when a signal stored in the line memory Mx ($1 \leqq x \leqq n$, where x is an integer) which remains after the selection by the selector is the oldest signal out of the line memories M1 through Mn, vertical transfer (scanning) of the solid state image pickup element is effected so that a new one-line sin SOnew is generated and then the signal SOnew is written into the line memory Mx.

In the image pickup apparatus with an interpolation function as described above, there has been a problem that frequency response characteristics may deteriorate in the interpolation process and therefore affect the image quality.

DISCLOSURE OF THE INVENTION

The present invention is intended to improve the deterioration in frequency response characteristic when in the process of interpolation in the conventional image pickup apparatus having an interpolation function and thereby to obtain high-quality interpolation-processed images, having a first objective to reduce the deterioration in frequency response characteristic in the process of interpolation horizontal line formation found in the conventional electronic zoom function circuit.

A second objective is to generate frame still images and produce high-quality still image outputs in an image pickup apparatus having a still image generation function. In order to achieve the above objectives, the present invention comprises, in an image pickup apparatus, a plurality of solid state image pickup elements for obtaining different three chrominance signals; a vertical phase shift section for shifting a vertical phase of some of the three chrominance signals obtained from the image pickup apparatus by a certain pitch; and a coefficient generating auxiliary circuit for changing an interpolation coefficient for an interpolation process according to the shift of the phase, wherein, with the present arrangement, the three chrominance signals obtained from the plurality of solid state image pickup elements are out of phase in terms of a vertical phase by the vertical phase shift section, and therefore, when subjected to the interpolation process, deterioration in vertical frequency response characteristic due to the interpolation process differs among the three chrominance signals, thereby reducing particularly deterioration in vertical frequency response characteristic of the output line interpolated at around the center of two input lines, and thus, allowing to reduce the deterioration in the vertical sharpness when in horizontal line interpolation.

Also, the vertical phase shift section may be replaced with at least one image pickup element drive circuit for driving the solid state image pickup element and a drive control circuit for controlling the image pickup element drive circuit, where also the same effects as above can be obtained.

Further, by constituting so that the vertical phase shift section is replaced with at least one image pickup element drive circuit for driving the solid state image pickup element, a drive control circuit for controlling the image pickup element drive circuit, and a vertical interpolation selector circuit, wherein, by the vertical interpolation selector circuit, when in the vertical interpolation on, the drive control circuit controls the image pickup element drive circuit so that the vertical phase of the three chrominance signals will be out of phase, and when in the vertical interpolation off, the drive control circuit controls the image pickup element drive circuit so that the three chrominance signals will be coincident in vertical phase, whereby when in the vertical interpolation on, deterioration in vertical sharpness during the horizontal line interpolation process can be reduced, and when the interpolation process is not effected, by keeping the vertical interpolation off, three chrominance signals having vertical phase coincident can be obtained, thus high resolution video images free from deterioration in vertical resolution can be obtained.

Still further, by adding a filter circuit for controlling frequency characteristics of signals, it becomes possible to remove false signals following to vertical phase shift.

Yet further, by adding a frame calculation circuit for obtaining a pseudo frame signal from the three chrominance signals and an interpolation circuit for obtaining an interpolation horizontal line signal from an output signal of the frame calculation circuit, it becomes possible to obtain an interpolation horizontal line by the interpolation circuit from a pseudo frame signal generated from the three chrominance signals shifted in vertical phase by the vertical phase shift section, thereby allowing to reduce deterioration in vertical sharpness at the time of the horizontal line interpolation.

Yet further, by adding a frame still image circuit for obtaining a frame still image from an output signal of the frame calculation circuit, it becomes possible to obtain a high-quality frame still image from a pseudo frame signal generated from the three chrominance signals shifted in vertical phase by the vertical phase shift section.

Yet further, by adding a vertical interpolation selector circuit to the above arrangement, and by the vertical interpolation selector circuit, when in the vertical interpolation on, the drive control circuit controls the image pickup element drive circuit so that the three chrominance signals will be out of phase in terms of vertical phase, and when in the vertical interpolation off, the drive control circuit controls the image pickup element drive circuit so that the three chrominance signal will be coincident in vertical phase, it becomes possible to obtain three chrominance signals different in vertical phase when in the vertical interpolation on, allowing to obtain a high-quality frame still image from a pseudo frame signal generated from the three chrominance signals different in vertical phase from one another. Also, when the still image generation process is not effected, by turning the vertical interpolation off, it is possible to obtain three chrominance signals coincident in vertical phase and thereby to obtain a high-resolution image free from deterioration in vertical resolution.

BRIEF DESCRIPTION OF THE DRAWINGS

FIG. 2(*b*) is an arrangement example of a color separation prism in the first embodiment;

FIG. 33 is a second explanatory view of a digital signal processing circuit of the image pickup apparatus with a horizontal line interpolation function in the seventh embodiment;

BEST MODE FOR IMPLEMENTING THE INVENTION

[1] <First embodiment: Basic construction (A construction having three solid state image pickup elements)>

Figure 1:
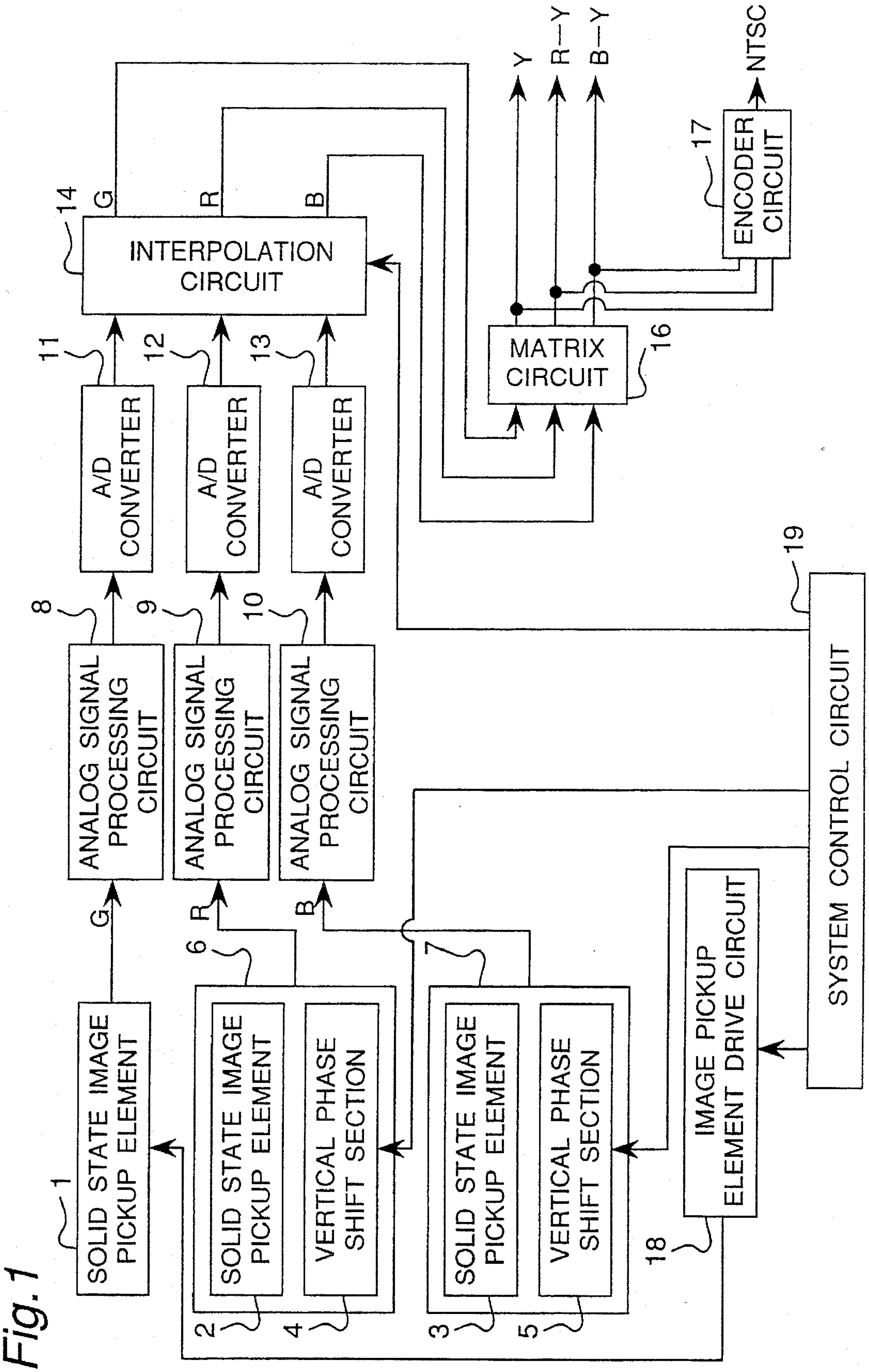
FIG. 1 is a block diagram showing an arrangement of an image pickup apparatus with a horizontal line interpolation function according to a first embodiment.

FIG. 1 shows a block diagram of an image pickup apparatus with a horizontal interpolation function in the first embodiment. In FIG. 1, solid state image pickup elements 1, 2, 3 are image pickup elements for obtaining G, R, B of the three chrominance signals, respectively, where the solid state image pickup element 1 obtains a G signal, the solid state image pickup element 2 obtains an R signal, and the solid state image pickup element 3 obtains a B signal. A vertical phase shift section 4 is included in the figure for schematically showing implementation of phase shift of a chrominance signal (where 2 and 4 are combined to form an image pickup section 6), and a vertical phase shift section 5 is included for schematically showing implementation of phase shift of a chrominance signal (where 3 and 5 are combined to form an image pickup section 7). It is assumed that, as for p1 and p2, an interval between lines of a video signal to be interlace-scanned is standardized to 1. Analog signal processing circuits 8, 9, 10 are circuits for performing analog signal processing on the three chrominance signals obtained by the solid state image pickup elements 1, 2, 3; analog-to-digital converter circuits 11, 12, 13 are circuits for converting the three chrominance signals processed by the analog signal processing circuits 8, 9, 10, respectively, from analog to digital form; and an interpolation circuit 14 is a circuit for performing interpolation on the three chrominance signals converted to digital form by the analog-to-digital converter circuits 11, 12, 13. A matrix circuit 16 is a circuit for performing matrix operation on the three chrominance signals interpolated by the interpolation circuit 14 to synthesize a luminance signal and two color-difference signals, and an encoder circuit 17 is a circuit for obtaining an NTSC signal from the luminance and color-difference signals obtained by the matrix circuit 16. An image pickup element drive circuit 18 is a circuit for driving the solid state image pickup element 1. A system control circuit 19 is a circuit for comprehensively controlling the vertical phase shift sections 4, 5, and the interpolation circuit 14, and the image pickup element drive circuit 18.

Figure 2A:
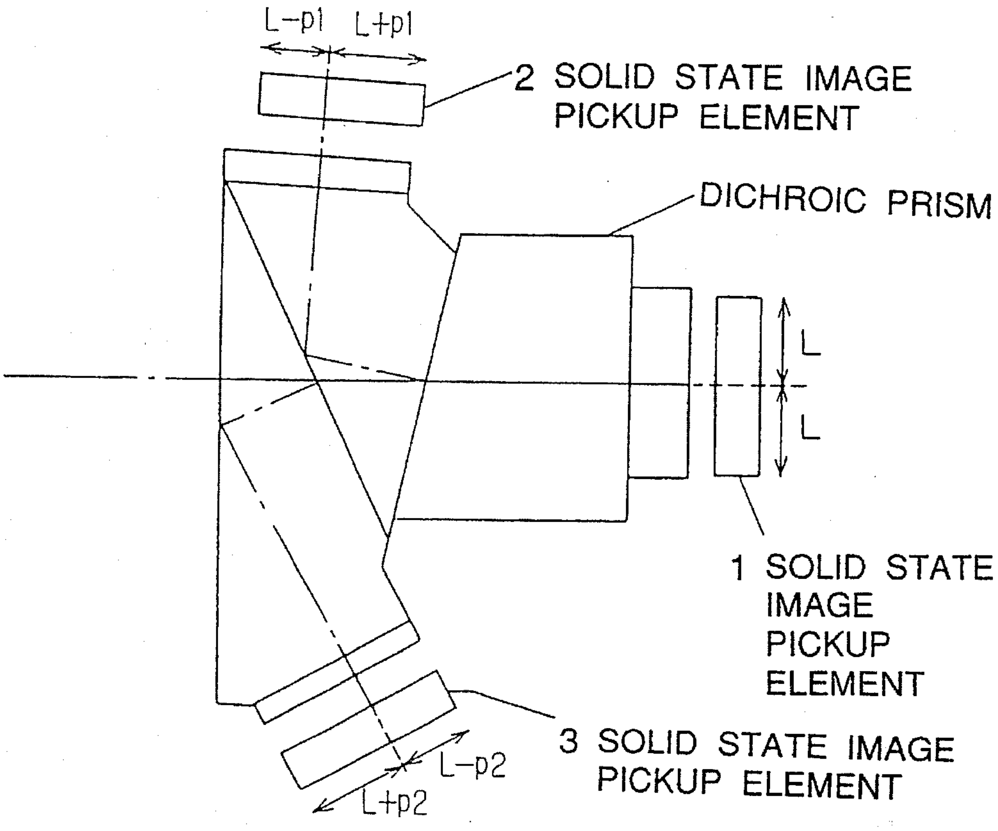
FIG. 2(*a*) is a schematic view showing an operation of phase shift sections 4, 5 in the first embodiment.
Figure 2B:
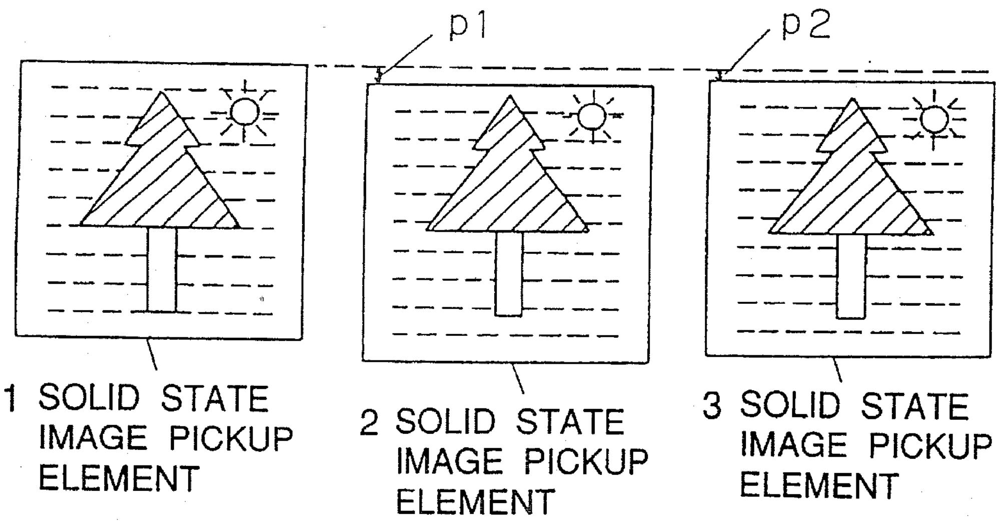

FIG. 2(*a*) shows an operation of the vertical phase shift sections 4, 5, schematically representing that the solid state image pickup elements 2, 3 are disposed so as to be shifted vertically with respect to the solid state image pickup element 1 for performing the phase shift of the chrominance signals. As shown in FIG. 2(*a*), the solid state image pickup elements 2, 3 are located so as to be shifted with respect to the solid state image pickup element 1 by p1, p2 ($0 \leq p1 < 1$, $0 \leq p2 < 1$), respectively.

FIG. 2(*b*) is a constitutional diagram of a color separation prism for separating G, R, and B signals, in the optical system of the image pickup apparatus of the present embodiment. With the vertical length of the image pickup element set at 2L, the solid state image pickup elements 2, 3 are shifted in position vertically by p1 and p2, respectively.

Figure 3:
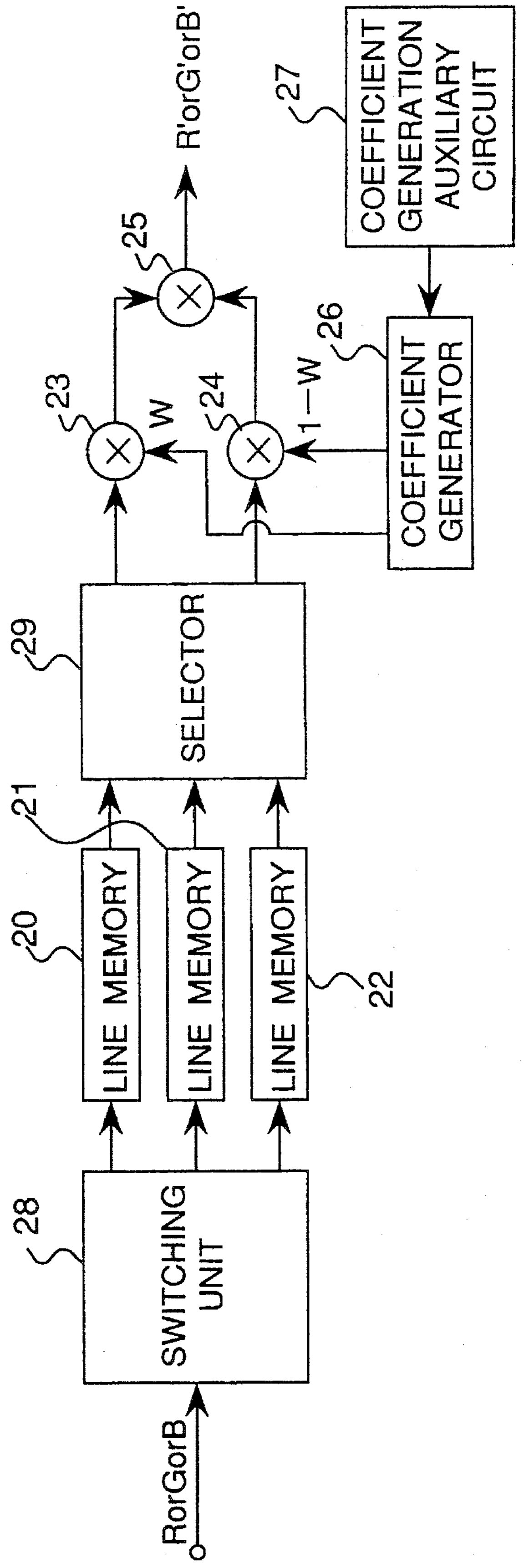
FIG. 3 is a schematic view showing a concrete arrangement of an interpolation circuit 14 in the first embodiment.
Figure 4A:
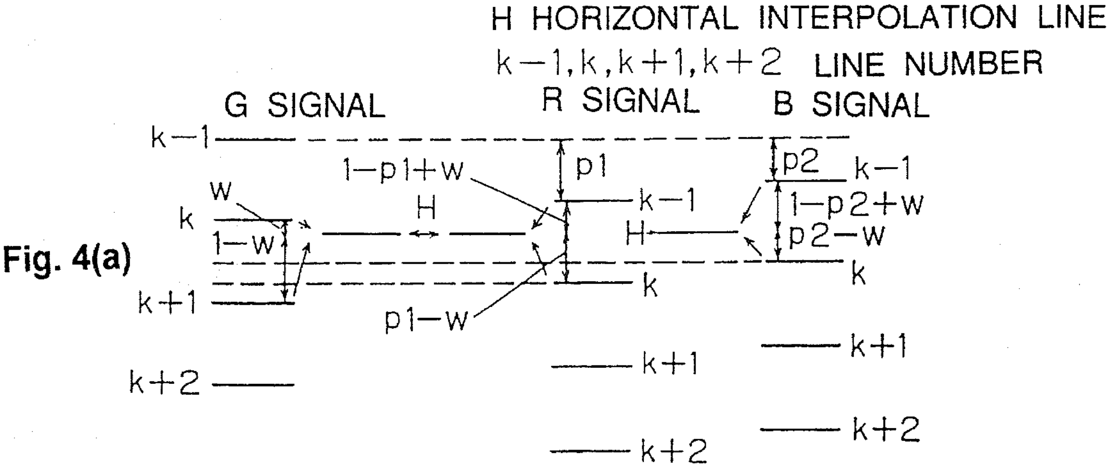
FIG. 4(*a*), FIG. 4(*b*), FIG. 4(*c*), and FIG. 4 (*d*) are views for explaining the method of interpolation by the interpolation circuit 14 in the first embodiment.
Figure 4B:
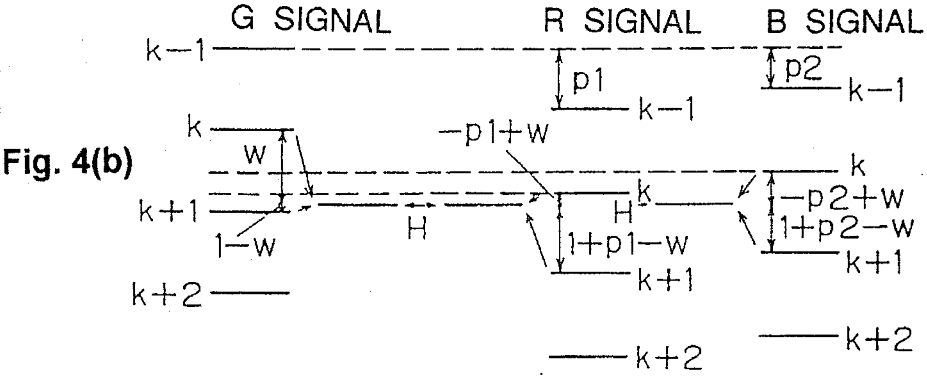
Figure 4C:
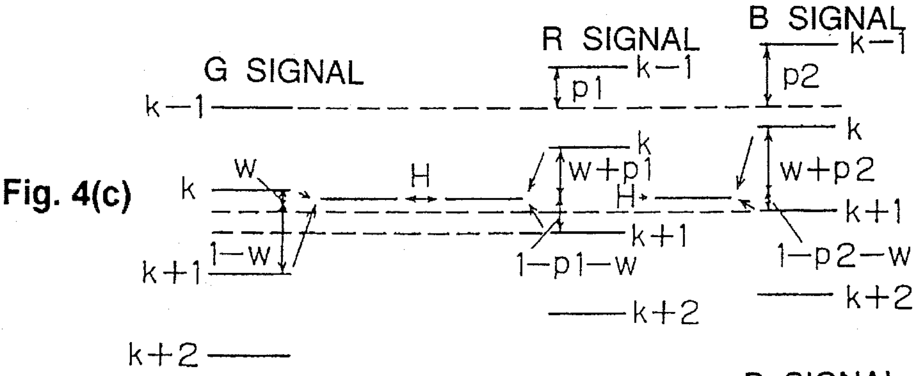
Figure 4D:
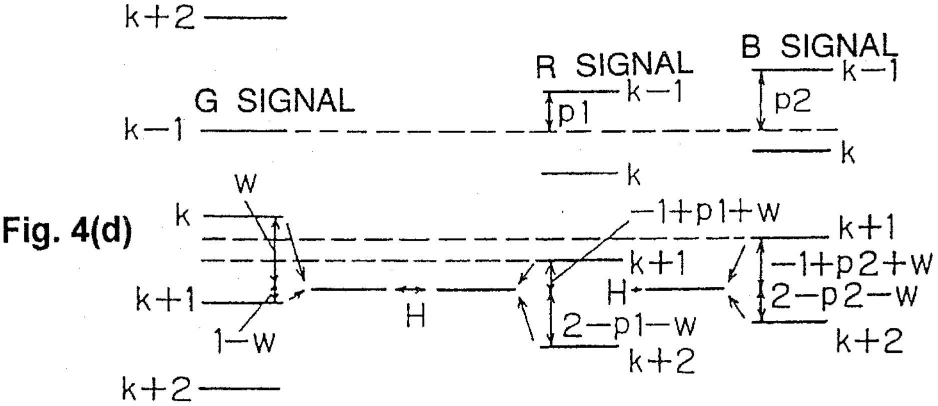

FIG. 3 shows an example of a theoretical construction of the interpolation circuit 14 of FIG. 1. One-line memories 20, 21, 22 are memories for storing 1-line portion of a video signal fed to the interpolation circuit, where one of the three is used for writing, two are used for reading, and the memories to be used for writing and reading are replaced with one another in turn by a switching unit 28 and a selector 29, so that real time processing can be implemented. A coefficient generating auxiliary circuit 27 sends to a coefficient generator 26 information of vertical positional shift amount of the three solid state image pickup elements (i.e. amount of vertical phase shift of three chrominance signals). The coefficient generator circuit 26 generates an interpolation coefficient to be used for interpolation calculation based on the information from the coefficient generating auxiliary circuit 27. Multipliers 23, 24 multiply signals derived from the 1-line memories with an interpolation coefficient obtained from the coefficient generator circuit 26, and an adder 25 adds up the two line signals multiplied with the interpolation coefficient. In addition, the whole construction of the interpolation circuit 14 as shown in FIG. 3 can be built up by providing the circuit construction shown in FIG. 3 to each of the three chrominance signals (R, G, B).

The image pickup apparatus with a horizontal line interpolation function of the present embodiment constructed as described above is now explained on its operation.

A G signal obtained by the solid state image pickup element 1, an R signal obtained by the image pickup section 6, and a B signal obtained by the image pickup section 7 are subjected to analog signal processing by the analog signal processing circuits 8, 9, 10, respectively, then converted from analog to digital signals by the analog-to-digital converter circuits 11, 12, 13, and transmitted to the interpolation circuit 14. The G, R, and B signals transmitted to the interpolation circuit 14 are subjected to the respective interpolation processing, and this interpolation processing is here explained with reference to FIG. 4(*a*) through FIG. 4(*d*). First considered is the case where the solid state image pickup elements 2, 3 are shifted with respect to the solid state image pickup element 1 downward thereof (i.e. in the direction in which line number increases). When a line at distances of w from the kth line and 1-w from the (k+1)th line of a G signal is synthesized by the interpolation (where it is assumed that line width is standardized to 1 and that 0≦w<1), if 0≦w<p1, then the interpolation line to be synthesized from the R signal will be a line at distances of 1−p1+w from the (k−1)th line and p1−w from the kth line of the R signal, taking into consideration the phase shift with respect to the G signal. This is the same also with the B signal, and if 0≦w<p2, then the interpolation line to be synthesized from a B signal will be a line at distances of 1−p2+w from the (k−1)th line and p2−w from the kth line of the B signal (FIG. 4(*a*)), taking into consideration the phase shift with respect to the G signal. Meanwhile, if p1≦w<1, then the interpolation line to be synthesized from an R signal will be a line at distances of w−p1 from the kth line and 1+p1−w from the (k+1)th line of the R signal, taking into consideration the phase shift with respect to the G signal. This is the same also with the B signal, if p2≦w<1, then the interpolation line to be synthesized from a B signal will be a line at distances of w−p2 from the kth line and 1+p2−w from the (k+1)th line of the B signal, taking into consideration the phase shift with respect to the G signal (FIG. 4(*b*)). Next considered is the case where the solid state image pickup elements 2, 3 are shifted with respect to the solid state image pickup element 1 upward (i.e. in the direction in which line number decreases). When a line at distances of w from the kth line and 1−w from the (k+1)th line of the G signal is synthesized by the interpolation, if 0≦w<p1, then the interpolation line to be synthesized from an R signal will be a line at distances of w+p1 from the kth line and 1−p1−w from the (k+1)th line of the R signal, taking into consideration the phase shift with respect to the G signal. This is the same also with the B signal, if 0≦w<p2, then the interpolation line to be synthesized from a B signal will be a line at distances of w+p2 from the kth line and 1−p2−w from the (k+1)th line of the B signal, taking into consideration the phase shift with respect to the G signal (FIG. 4(*c*)). Meanwhile, if p1≦w<1, then the interpolation line to be synthesized from an R signal will be a line at distances of −1+p1+1 from the (k+1)th line and 2−p1−w from the (k+2)th line of the R signal, taking into consideration the phase shift with respect to the G signal. This is the same also with the B signal, and if p2≦w<1, then the interpolation line to be synthesized from a B signal will be a line at distances of −1+p2+w from the (k+1)th line and 2−p2−w from the (k+2)th line of the B signal, taking into consideration the phase shift with respect to the G signal (FIG. 4(*d*)).

Figure 5:
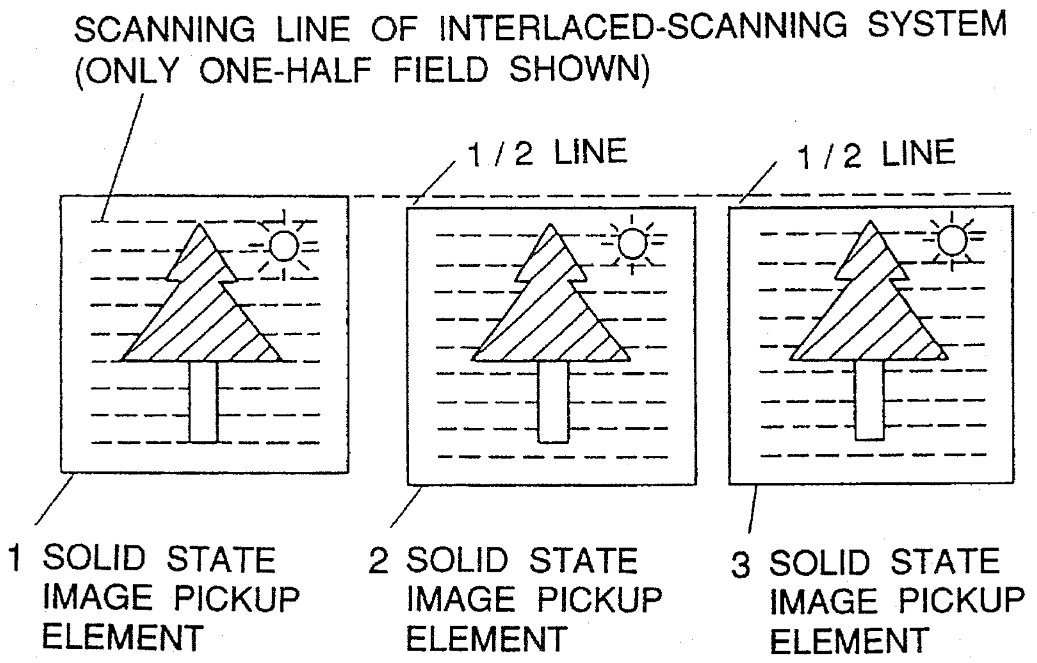
FIG. 5 is a schematic view showing an operation of the phase shift sections 4, 5 when p1=p2=½ in the first embodiment.
Figure 6A:
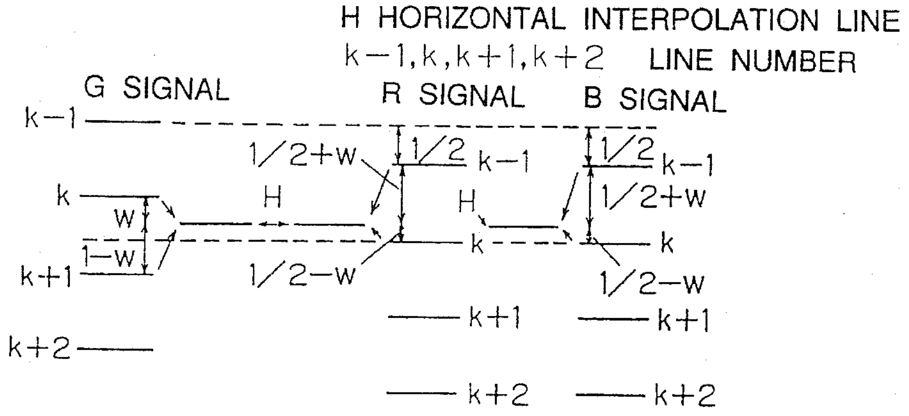
FIG. 6(*a*), FIG. 6(*b*), FIG. 6(*c*), and FIG. 6 (*d*) are views for explaining the method of interpolation by the interpolation circuit 14 when p1=p2=½ in the first embodiment.
Figure 6B:
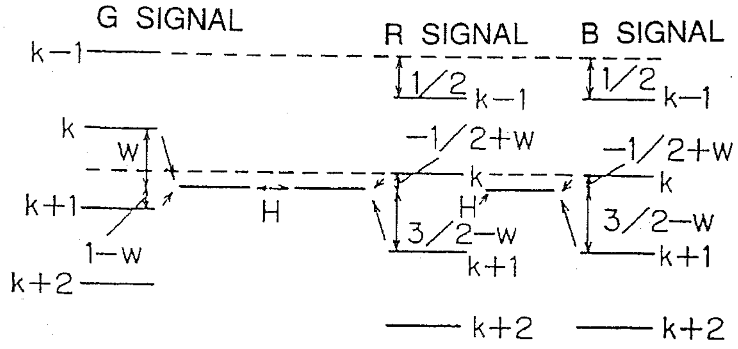
Figure 6C:
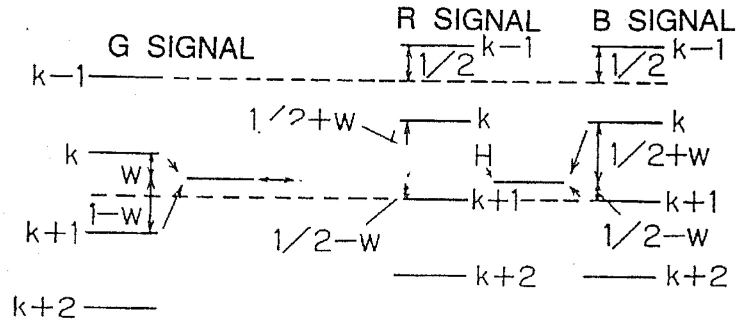
Figure 6D:
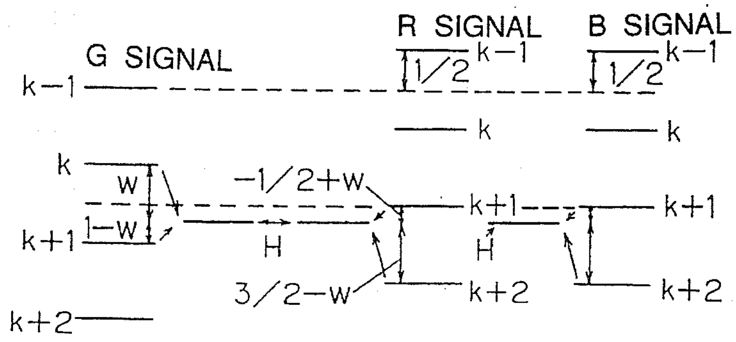

With an interpolation line synthesized in this way, an interpolation signal in the same phase can be synthesized from three chrominance signals shifted in phase from one another, and since deterioration in vertical frequency response characteristic due to interpolation differs among the three signals, in the case where the video signal is taken as a whole of the three chrominance signals (i.e. for example when a luminance signal synthesized from G, R, and B signals by matrix operation is considered), deterioration in frequency response can be reduced, so that deterioration in vertical sharpness at the time of horizontal line interpolation can be reduced. For example, a case where p1=p2=[½ line portion of a video signal to be interlace-scanned] is described with reference to FIG. 5 and FIGS. 6(*a*) through (*d*). FIG. 5 shows an operation of the vertical phase shift sections 4, 5, schematically representing that the solid state image pickup elements 2, 3 are so arranged as to be shifted with respect to the solid state image pickup element 1 vertically by a ½ line, in order to implement the phase shift of chrominance signals. First discussed is the case where the solid state image pickup elements 2, 3 are shifted with respect to the solid state image pickup element 1 downward (i.e. in the direction in which line number increases). When a line at distances of w from the kth line, (½)+w from the (k+1)th line and 1−w from the kth line of the G signal is synthesized by the interpolation (where it is assumed that line width is standardized to 1 and that 0≦w<1), if 0≦w<1, then the interpolation line to be synthesized from an R signal will be a line at distances of (½)+w from the (k−1)th line and (½)−w from the kth line of the R signal, taking into consideration the phase shift with respect to the G signal. This is the same also with the B signal, and if 0<w<p2, then the interpolation line to be synthesized from a B signal will be a line at distances of (½)+w from the (k−1)th line and (½)−w from the kth line of the B signal, taking into consideration the phase shift with respect to the G signal (FIG. 6(*a*)). Meanwhile, if p1≦w<1, then the interpolation line to be synthesized from an R signal will be a line at distances of (−½)+w from the kth line and (3/2)−w from the (k+1)th line of the R signal, taking into consideration the phase shift with respect to the G signal. This is the same also with the B signal, if p2≦w<1, then the interpolation line to be synthesized from a B signal will be a line at distances of −½)+w from the kth line and (3/2)−w from the (k+1)th line of the B signal, taking into consideration the phase shift with respect to the G signal (FIG. 6(*b*)). Next discussed is the case where the solid state image pickup elements 2, 3 are shifted with respect to the solid state image pickup element 1 upward (i.e. in the direction in which line number decreases). When an interpolation line at distances of w from the kth line and 1−w from the (k+1)th line of the G signal is synthesized by the interpolation, if 0≦w<p1, then the interpolation line to be synthesized from an R signal will be a line at distances of (½)+w from the kth line and (½)−w from the (k+1)th line of the R signal, taking into consideration the phase shift with respect to the G signal. This is the same also with the B signal, and if 0≦w<p2, then the interpolation line to be constituted from a B signal will be a line at distances of (½)+w from the kth line and (½)−w from the (k+1)th line of the B signal, taking into consideration the phase shift with respect to the G signal (FIG. 6(*c*)). Meanwhile, if p1≦w<1, then the interpolation line to be synthesized from an R signal will be a line at distances of (−½)+w from the (k+1)th line and (3/2)−w from the (k+2)th line of the R signal, taking into consideration the phase shift with respect to the G signal. This is the same also with the B signal, and if p2 ≦w<1, then the interpolation line to be synthesized from a B signal will be a line at distances of (−½)+w from the (k+1)th line and (3/2)−w from the (k+2)th line of the B signal, taking into consideration the phase shift with respect to the G signal (FIG. 6(*d*)). In the case as described above, when such an interpolation process for w =0.5 with the largest deterioration in vertical frequency response characteristic is done on the G signal, neither the R nor the B signal is subjected to the interpolation process and such a state can be maintained that there occurs no deterioration in vertical frequency response characteristic, and also, when an interpolation process for $w=0$ is done on the G signal, the R and B signals are interpolated with the largest deterioration in vertical frequency response characteristic but the G signal is not interpolated, so that such a state can be maintained that there occurs no deterioration in vertical frequency response characteristic, and therefore, in the case where the video signal is viewed as a whole of the three chrominance signals (i.e. for example when a luminance signal synthesized from the G, R, and B signals by matrix operation is considered), deterioration in vertical sharpness at the time of horizontal line interpolation can be reduced.

In addition, for such cases where the solid state image pickup element 2 is shifted upward with respect to the solid state image pickup element 1 while the solid state image pickup element 3 is shifted downward, or the solid state image pickup element 2 is shifted downward with respect to the solid state image pickup element 1 while the solid state image pickup element 3 is shifted upward, it is apparently also possible in the present embodiment to implement interpolations by combining the interpolations as described with reference to FIG. 4(*a*) through FIG. 4(*d*).

Further, in the present embodiment, the solid state image pickup element drive circuits for the solid state image pickup elements 2, 3 are included in the vertical phase shift sections 4, 5 and undergo the control of the system control circuit 19.

[2] <Second embodiment: Basic construction (A construction having two solid state image pickup elements)>

Next, a second embodiment is described.

Figure 7:
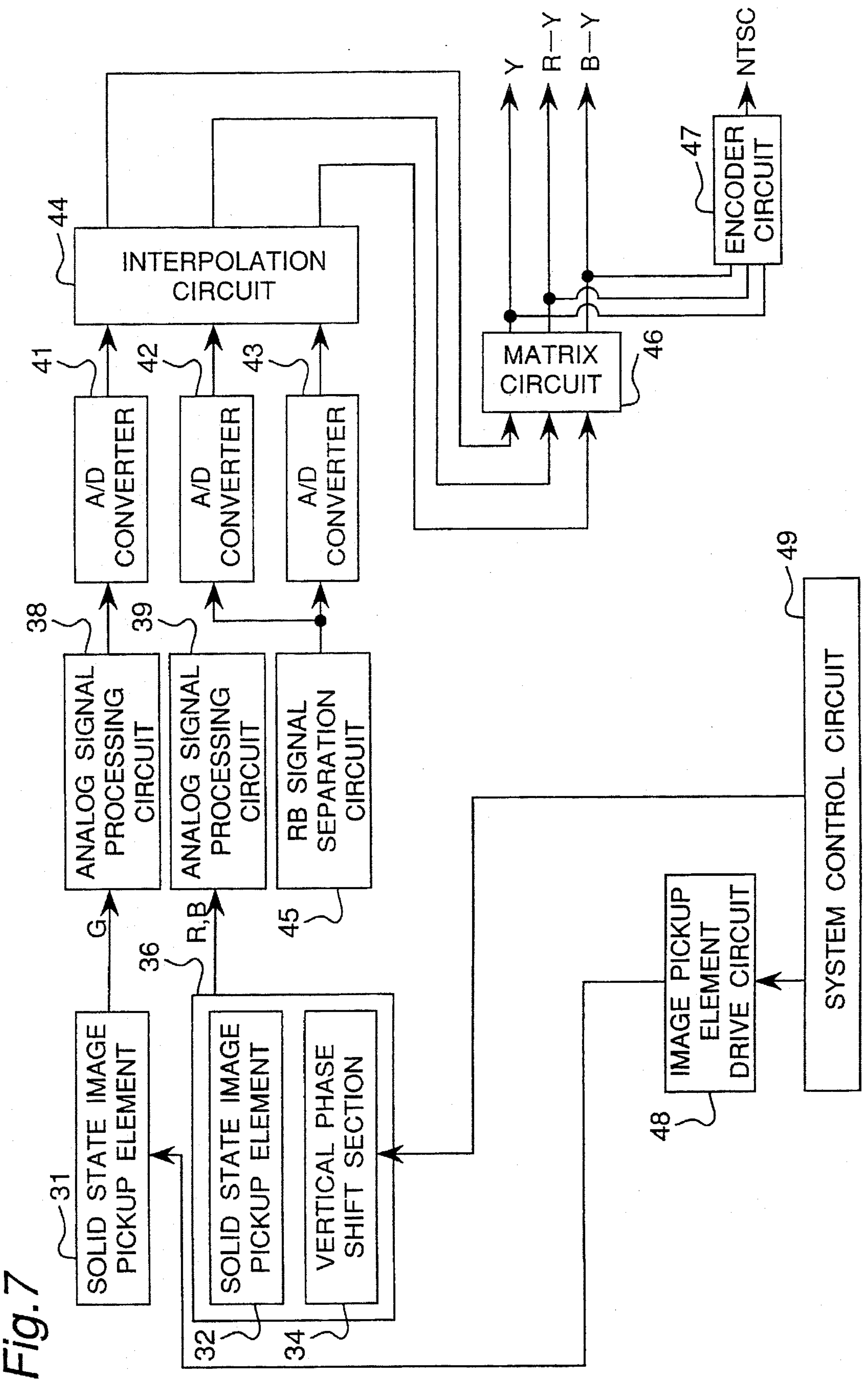
FIG. 7 is a block diagram showing the arrangement of an image pickup apparatus with a horizontal line interpolation function according to a second embodiment.

FIG. 7 shows a block diagram of an image pickup apparatus with a horizontal interpolation function in the second embodiment.

In the figure, solid state image pickup elements 31 and 32, a vertical phase shift section 34, analog signal processing circuits 38, 39, analog-to-digital converter circuits 41, 42, 43, an interpolation circuit 44, a matrix circuit 46, an encoder circuit 47, an image pickup element drive circuit 48, and a system control circuit 49 are respectively those which exhibit the same functions as the solid state image pickup elements 1, 2, the vertical phase shift section 4, the analog signal processing circuits 8, 9, the analog-to-digital converter circuits 11, 12, 13, the interpolation circuit 14, the matrix circuit 16, the encoder circuit 17, the image pickup element drive circuit 18, and the system control circuit 19, respectively, of the first embodiment as shown in FIG. 1. Therefore, their detailed description is omitted.

In the same figure, the solid state image pickup elements 31, 32 are image pickup elements for obtaining G, R and B of three chrominance signals, respectively, where the solid state image pickup element 31 obtains the G signal and the solid state image pickup element 32 obtains R and B signals. The vertical phase shift section 34 is included in the figure for schematically representing that phase shift of chrominance signals is implemented (where 32 and 34 are combined to form an image pickup section 36). In addition, it is assumed that line width of a video signal to be interlace-scanned is standardized to 1. The G signal obtained by the solid state image pickup element 31 is subjected to the same processing as in the first embodiment and then transmitted to the interpolation circuit 44. The R and B signals obtained by the image pickup section 36 are subjected to analog-to-digital signal processing at the analog signal processing circuit 39, thereafter separated into an R signal and a B signal by an R/B signal separation circuit 45, and subjected to the same processing as in the first embodiment and then transmitted to the interpolation circuit 44. It is noted that, since the interpolation circuit 44 is the same as in the first embodiment (see FIG. 3), the description is omitted.

Figure 8:
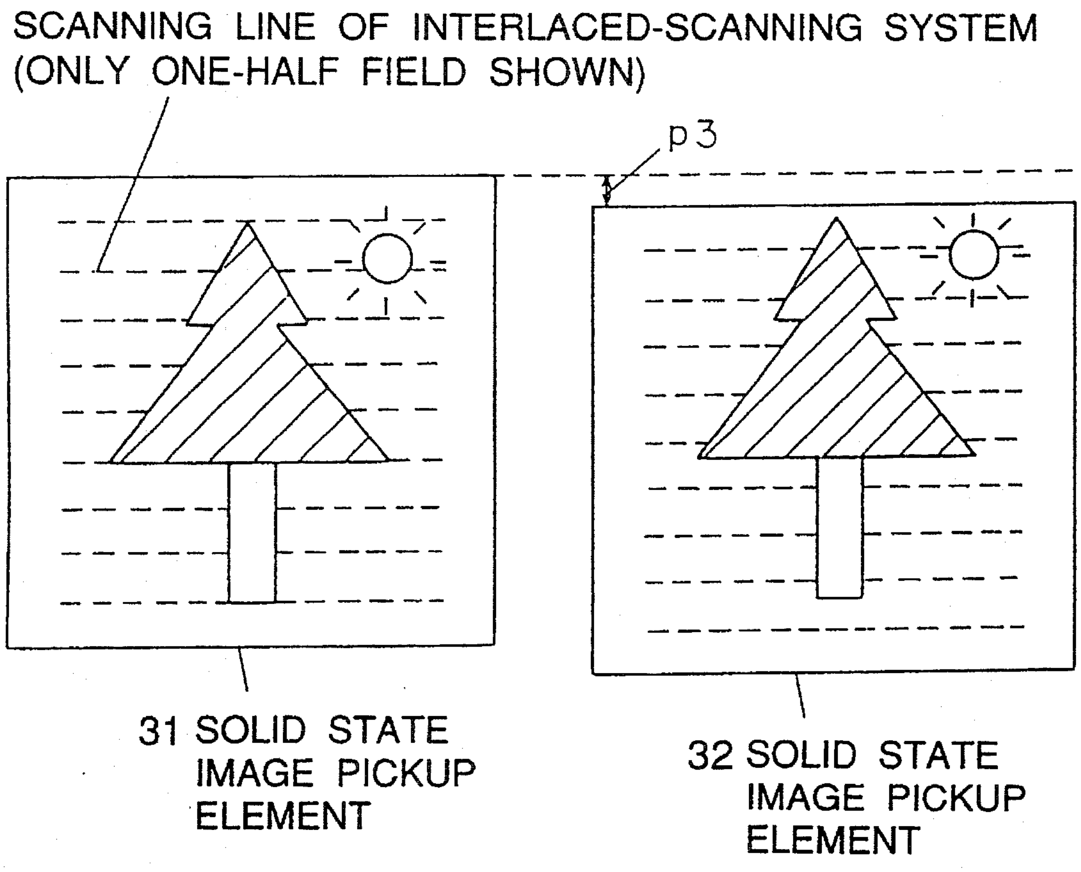
FIG. 8 is a schematic view showing an operation of the phase shift section 4 in the second embodiment.

FIG. 8 schematically represents that the solid state image pickup element 32 is disposed so as to be shifted with respect to the solid state image pickup element 31 in order to realize phase shift of a chrominance signal. As shown in this FIG., the solid state image pickup element 32 is disposed so as to be shifted with respect to the solid state image pickup element 31 by p3 ($0 \leqq p3 < 1$).

Figure 9:
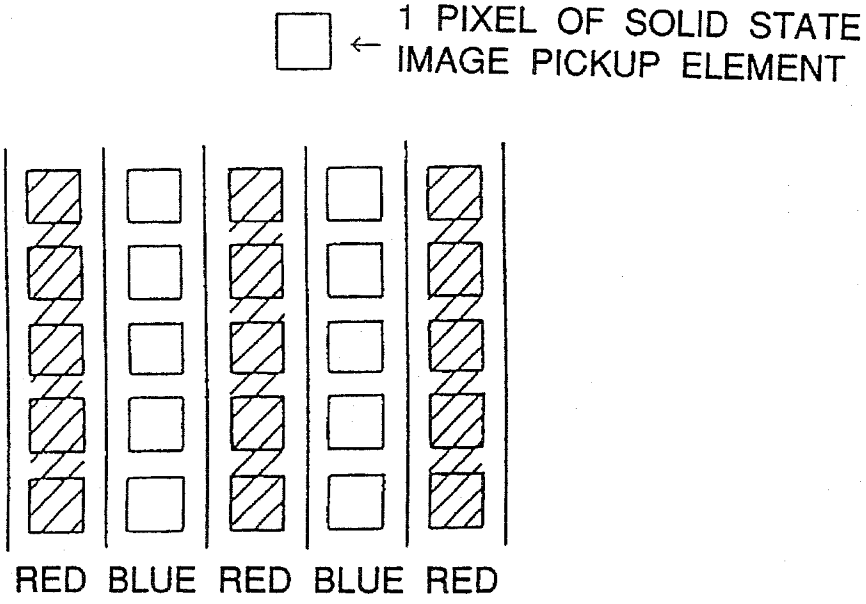
FIG. 9 is a view showing an arrangement of a light-receiving surface of a solid state image pickup element 2 in the second embodiment.

FIG. 9 is a view of a light-receiving surface of the solid state image pickup element 32 and the light-receiving surface of the solid state image pickup element 32 is equipped with an R-B color stripe filter of red (R) and blue (B) as shown in the figure, which arrangement allows R and B signals to be obtained from the solid state image pickup element 32. With the vertical length of the solid state image pickup element set to 2L, the solid state image pickup element 32 is shifted in vertical position by p3.

Figure 10:
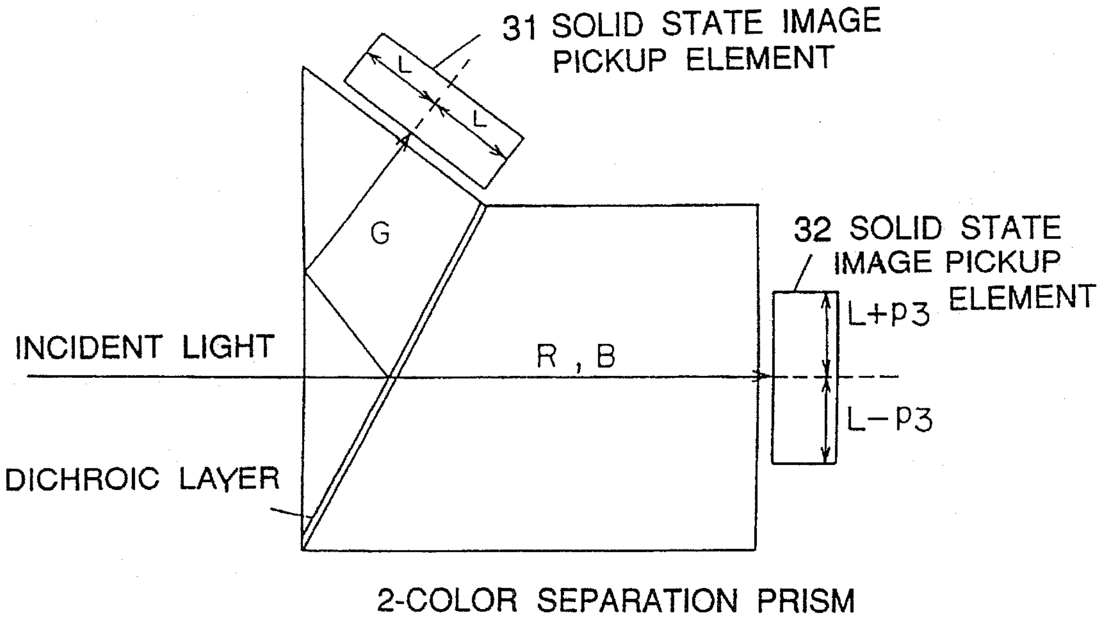
FIG. 10 is an arrangement example of a two-color separation prism in the second embodiment.
Figure 11A:
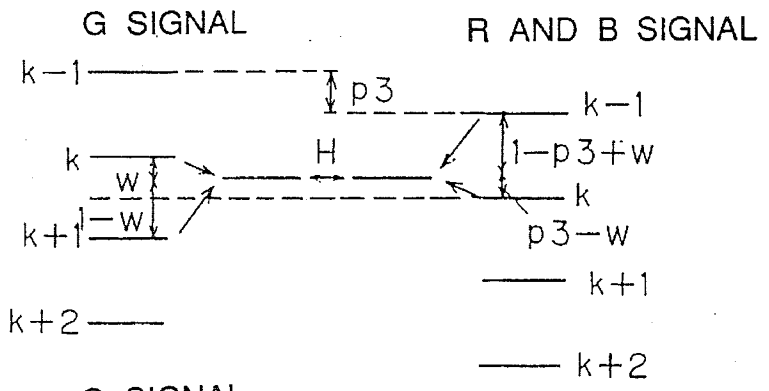
FIG. 11(*a*), FIG. 11(*b*), FIG. 11(*c*), and FIG. 11(*d*) are views for explaining the method of interpolation by the interpolation circuit 14 in the second embodiment.
Figure 11B:
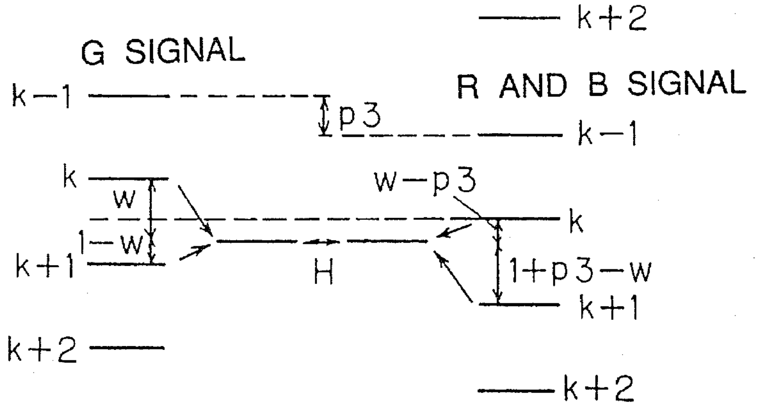
Figure 11C:
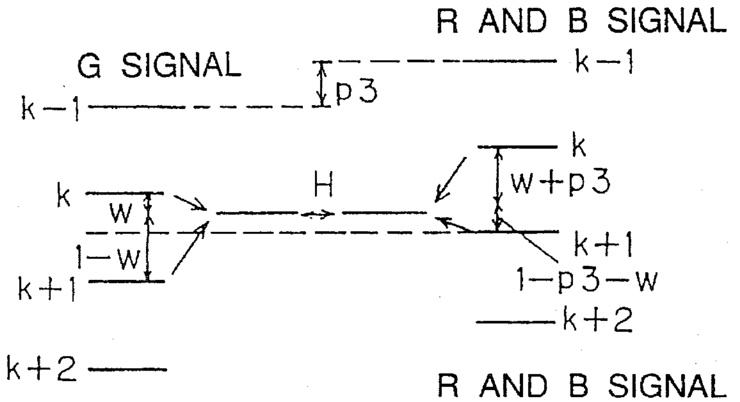
Figure 11D:
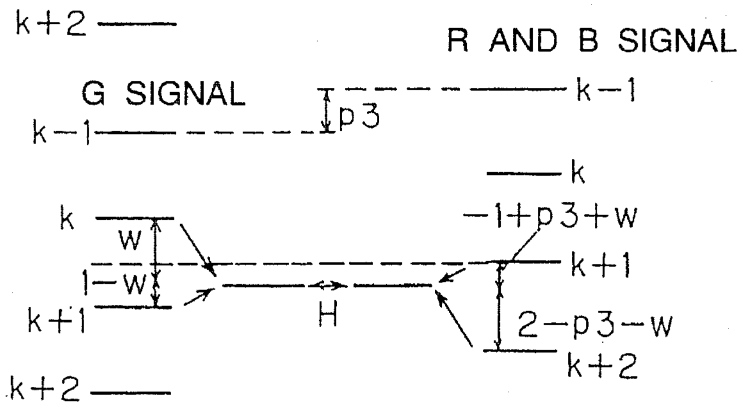

FIG. 10 is a constitutional diagram of a two-color separation prism for separating the G signal and the R and B signals, in the optical system of the image pickup apparatus in the present embodiment. Among the input light, whereas light of R and B goes straight within the prism, light of G is reflected by a dichroic layer as shown in the figure, so that G is separated from R and B.

The image pickup apparatus with a horizontal line interpolation function of the present embodiment constructed as described above is now described on its operation.

The G signal obtained by the solid state image pickup element 31 is subjected to analog signal processing by the analog signal processing circuit 38, while the R and B signals obtained by the image pickup section 36 are subjected to analog signal processing by the analog signal processing circuit 39 and moreover separated into an R signal and a B signal by the R-B signal separation circuit, and thereafter converted from analog to digital signals by the analog-to-digital converter circuits 41, 42, and 43, and then transmitted to the interpolation circuit 44. The G, R, and B signals transmitted to the interpolation circuit 44 are subjected to their corresponding interpolation processing and this interpolation processing is described with reference to FIG. 11(*a*) through FIG. 11 (*d*). First discussed is a case where the solid state image pickup element 32 is shifted downward with respect to the solid state image pickup element 31 (i.e. in the direction in which line number increases). When a line at distances of w from the kth line and $1-w$ from the $(k+1)$th line of the G signal (where it is assumed that line width is standardized to 1 and that $0 \leqq w < 1$), if $0 \leqq w < p3$, then the interpolation line to be synthesized from an R signal and a B signal will be a line at distances of $1-p3+w$ from the $(k-1)$th line and $p3-w$ from the kth line of the R signal and the B signal, taking into consideration the phase shift with respect to the G signal (FIG. 11(*a*)). Meanwhile, if $p3 \leqq w < 1$, then the interpolation line to be synthesized from an R signal and a B signal will be a line at distances of $w-p3$ from the kth line and $1+p3-w$ from the $(k+1)$th line of the R signal and the B signal, taking into consideration the phase shift with respect to the G signal (FIG. 11(*b*)). Next discussed is the case where the solid state image pickup element 32 is shifted upward with respect to the solid state image pickup element 31 (i.e. in the direction in which line number decreases). When a line at distances of w from the kth line and $1-w$ from the $(k+1)$th line of the G signal is synthesized by the interpolation process, if $0 \leqq w < p3$, then the interpolation line to be synthesized from an R signal and a B signal will be a line at distances of w+p3 from the kth line and 1−p3−w from the (k+1)th line of the R signal and the B signal, taking into consideration the phase shift with respect to the G signal (FIG. 11(*c*)). Meanwhile, if p3≦w<1, then the interpolation line to be synthesized from an R signal and a B signal will be a line at distances of −1+p3+w from the (k+1)th line and 2−p3−w from the (k+2)th line of the R signal and the B signal, taking into consideration the phase shift with respect to the G signal (FIG. 11(*d*)).

With an interpolation line synthesized in this way, an interpolation signal in the same phase can be synthesized from the G signal and the R and B signals shifted in phase from one another, and since deterioration in vertical frequency response characteristic due to interpolation differs among the G signal and the R and B signals, when the video signal is viewed as a whole of the three chrominance signals (i.e. for example when a luminance signal synthesized from G, R, and B signals by a matrix operation is considered), deterioration in vertical frequency response characteristic can be reduced, so that deterioration in vertical sharpness at the time of horizontal line interpolation can be reduced. For example, if p3=[½ line portion of a video signal to be interlace-scanned], then when such an interpolation process for w=0.5 with the largest deterioration in vertical frequency response characteristic is done, neither the R nor the B signal is subjected to interpolation process and such a state can be maintained that there occurs no deterioration in vertical frequency response characteristic, and also, when an interpolation process for w=0 is done on the G signal, the R and B signals are interpolated with the largest deterioration in vertical frequency response characteristic while the G signal is not interpolated, so that such a state can be maintained that there occurs no deterioration in vertical frequency response characteristic, and therefore, when the video signal is viewed as a whole of the three chrominance signals (i.e. for example when a luminance signal synthesized from the G, R, and B signals by matrix operation is considered), deterioration in vertical sharpness at the time of horizontal line interpolation can be reduced.

Also, with the arrangement of the present embodiment, the vertical shift section for phase shift of chrominance signals can be made one in number, so that the whole construction can be simplified compared to the first embodiment.

Further, in the present embodiment, the solid state image pickup element drive circuit for the solid state image pickup element 32 is included in the vertical phase shift section 34, which undergoes the control of the system control circuit 49.

Further, the present embodiment has been arranged such that the R and B signals obtained by the image pickup section 36, after subjected to the analog signal processing circuit 39, are separated into an R signal and a B signal by an R-B signal separation circuit, however, the present invention is not limited to this, but may be such that the analog signal processing circuit 39 and the R-B signal separation circuit are united into one.

Further, the present embodiment has been arranged such that an R-B color stripe filter is used for the solid state image pickup element 32 to obtain the R signal and the B signal, but the present invention is not limited to this.

In addition, in the first embodiment, in order to shift the phase of three chrominance signals, R, G, and B, it is proper, for example, that when the solid state image pickup elements, when the solid state image pickup element is secured in contact to the three-color separation prism provided for obtaining three chrominance signals, are positioned so as to be shifted vertically different from the conventional fashion, however, the present invention is not limited to this, and it may be conceived, for example, that the three-color separation prism is arranged to have such an inside refractive index that the optical path of the light is curved, whereby phase of the chrominance signals is shifted. Also, in the second embodiment, in order to shift the phase of G, and R and B of three chrominance signals respectively, it is proper, for example, that when the image pickup element is secured in contact to the two-color separation prism provided for obtaining two chrominance signals (a G signal and an R and B signal), the image pickup element is positioned so as to be shifted vertically which is different from the conventional fashion, but the present invention is not limited to this, and it may be conceived, for example, that the two-color separation prism is arranged to have such an inside refractive index that the optical path of input light is curved, whereby phase of the chrominance signals is shifted.

Also, in the first and second embodiments, when the phases of the three chrominance signals are shifted, shown is an arrangement that the R and B signals are shifted with respect to the G signal, but which is not limited to this, and it may be considered such that the G and B signals are shifted with respect to the R signal or the G and R signals are shifted with respect to the B signal.

Also, in the first and second embodiments, the three chrominance signals are R, G, and B, but the present invention is not limited to this, and for example, three chrominance signals of yellow, cyan, and magenta may be used.

Further, in the first and second embodiments, regarding the interpolation circuit, only control of line memories is described, however, in addition to this, control for reading from the image pickup elements or field memories is also necessitated and such control can be implemented according to shift amount of phase of the respective signals in the G, R, and B signals, but the present invention is not limited to this.

Further, in the first and second embodiments, the interpolation circuit is arranged to have three line memories, but is not limited to this, and may be considered an arrangement having four or more line memories. And the interpolation processing made by linear interpolation in the above two embodiments, but the present invention is not limited to this, and as is apparent, if it is arranged to have four or more line memories, it becomes possible to implement high-order interpolation processing such as quadratic interpolation.

Further, in the first and second embodiments, the range of p1, p2, and p3 is arranged to be equal to or more than 0 and less than 1, but the present invention is not limited to this, and for example, it is apparent that if it is set that p1=1.5, the same effect as in the case of p1 =0.5 can be obtained (similarly as to p2 and p3).

Further, in the first and second embodiments, there have been used an arrangement having both a matrix circuit and an encoder circuit, but the present invention is not limited to this, and for example, it may be arranged that only either one of the matrix circuit and the encoder circuit is incorporated or that neither of them is incorporated.

Further, in the first and second embodiments, the output of the encoder circuit is an NTSC signal, but the present invention is not limited to this.

[3] <Third embodiment: A construction having a drive control circuit and a frequency band limiting filter>

Figure 12:
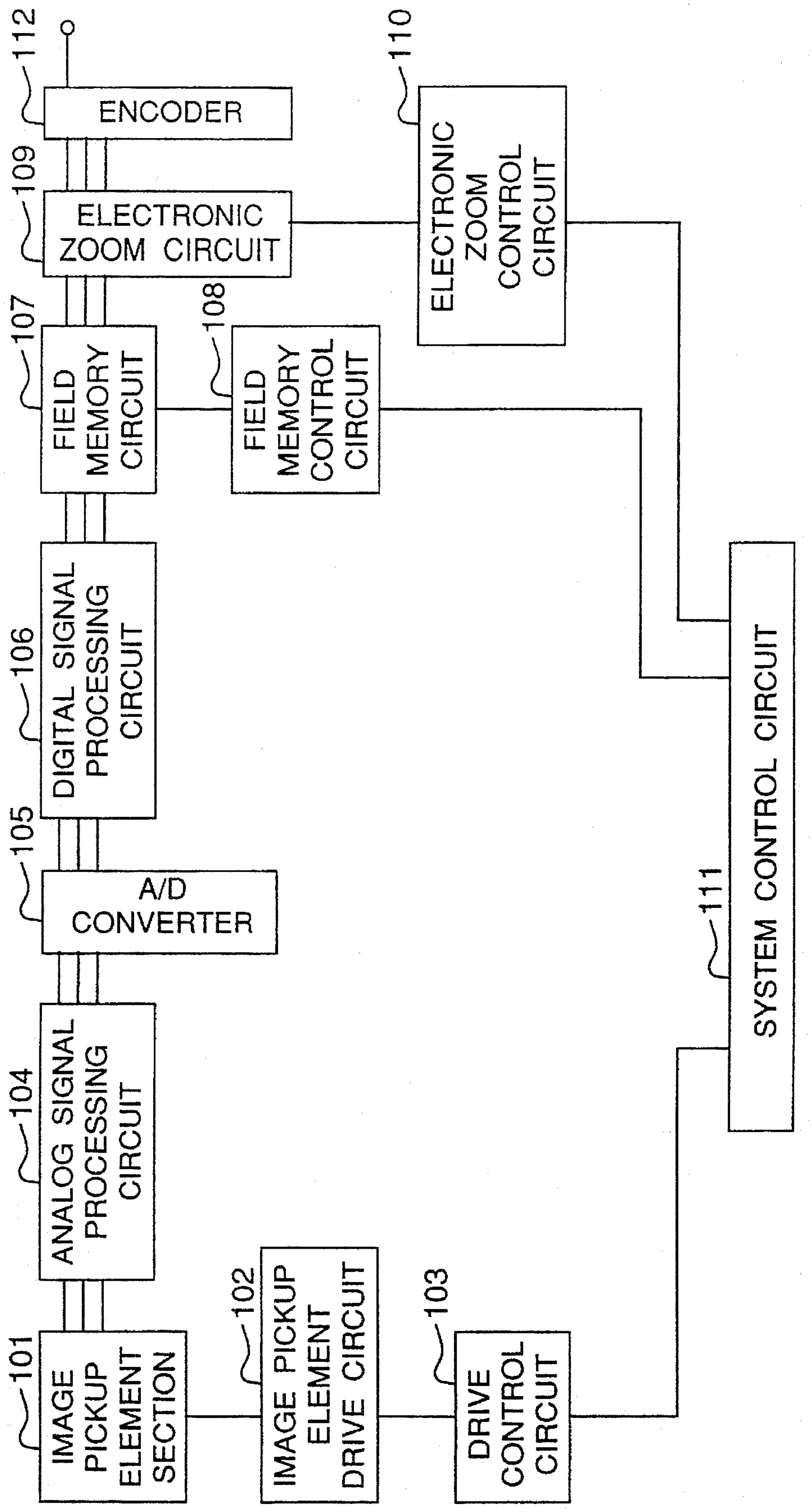
FIG. 12 is a block diagram of an image pickup apparatus with a horizontal line interpolation function according to a third embodiment.

FIG. 12 shows a block diagram of an image pickup apparatus with a horizontal line interpolation function in a third embodiment of the present invention. In FIG. 12, numeral 101 denotes an image pickup element section having a photoelectric conversion function; 102 denotes an image pickup element drive circuit corresponding to the image pickup element section 101; 103 denotes a drive control circuit for controlling the image pickup element drive circuit 102; 104 denotes an analog signal processing circuit for performing such processing as sampling and amplification on the output signal of the image pickup element 101; 105 denotes an analog-to-digital converter circuit (hereinafter, referred to as A/D converter) for an output signal of the analog signal processing circuit 102; 106 denotes a digital signal processing circuit for performing generation of luminance signals, chrominance signals or color-difference signals, and the like from an A/D converted digital signal or performing RGB signal processing; 107 denotes a field memory circuit for storing output signals of the digital signal processing circuit 106; 108 denotes a field memory control circuit for controlling the field memory circuit 107; 109 denotes an electronic zoom circuit for performing interpolation and enlargement processing with an output signal of the field memory circuit 107; 110 denotes an electronic zoom control circuit for controlling the electronic zoom circuit 109; 111 denotes a system control circuit for comprehensively controlling the drive control circuit 103, the field memory control circuit 108, and the electronic zoom control circuit 110; and 112 denotes an encoder circuit for obtaining an NTSC signal from R, G, and B.

The image pickup apparatus with a horizontal line interpolation function of the present embodiment constructed as described above is now described about its operation. A plurality of output signals of R, G, and B outputted from the image pickup element section 101 are subjected to analog signal processing and A/D conversion, thus formed into digital signals. These digital signals are subjected to RGB signal processing at the digital signal processing circuit 106, and fed to the field memory circuit 107. The signals fed to the field memory circuit 107 are arithmetically processed for interpolation by the field memory control circuit 108, the electronic zoom circuit 109, and the electronic zoom control circuit 110.

Figure 13A:
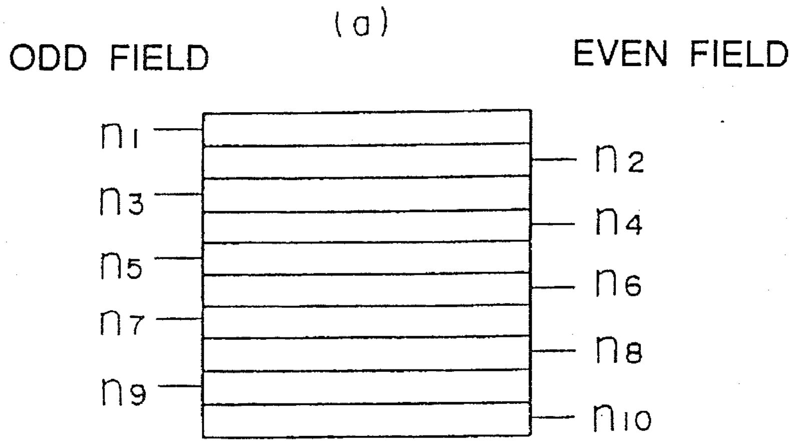
FIGS. 13(*a*) and 13(*b*) are explanatory views of a frame storage drive control of an image pickup element of an image pickup apparatus with a horizontal line interpolation function in the third, seventh, and eighth embodiments.
Figure 13B:
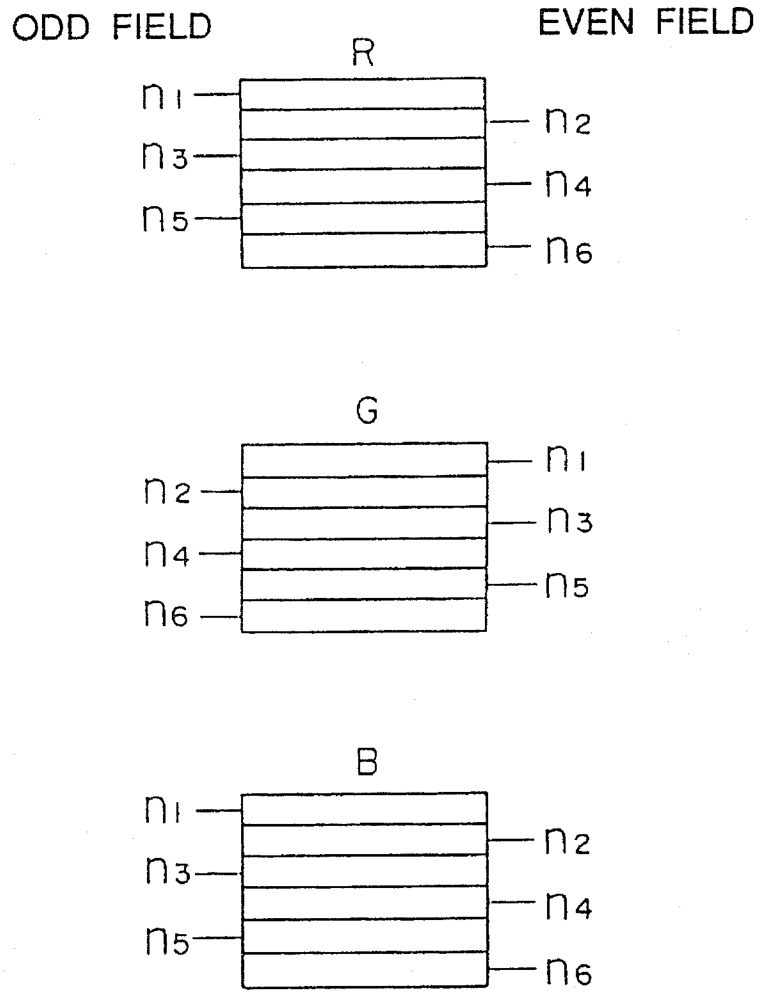

FIG. 13 shows a frame storage drive control of the image pickup element by the drive control circuit 103. In FIG. 13(*a*), shown is an outline of a common interlace-reading drive control of the image pickup element, while in FIG. 13(*b*) shown is an outline of a reading drive control of R, G and B image pickup elements for obtaining R, G and B signals, respectively, which is an arrangement example of the image pickup element section 101 in the present embodiment. In the frame storage mode as shown in FIG. 13(*a*), in the odd field, signals of pixels of alternate odd-numbered lines are read vertically out of the pixels in the photosensitive section during field shift periods, and then, in the even field, signals of pixels of even-numbered lines are read, and thus, interline transfer is accomplished. In the present embodiment, as shown in FIG. 13(*b*), in the odd field, the R and B image pickup elements among the R, G and B image pickup elements read signals of pixels of odd-numbered lines vertically, while the G image pickup element reads signals of pixels of even-numbered lines, and next, in the even field, the R and B image pickup elements among the R, G and B image pickup elements read signals of pixels of even-numbered lines vertically, while the G image pickup element reads signals of pixels of odd-numbered lines. In this way, odd/even reading by the R, G and B image pickup devices is inversed between the R and B image pickup elements and the G image pickup element by frame storage drive control.

Figure 14A:
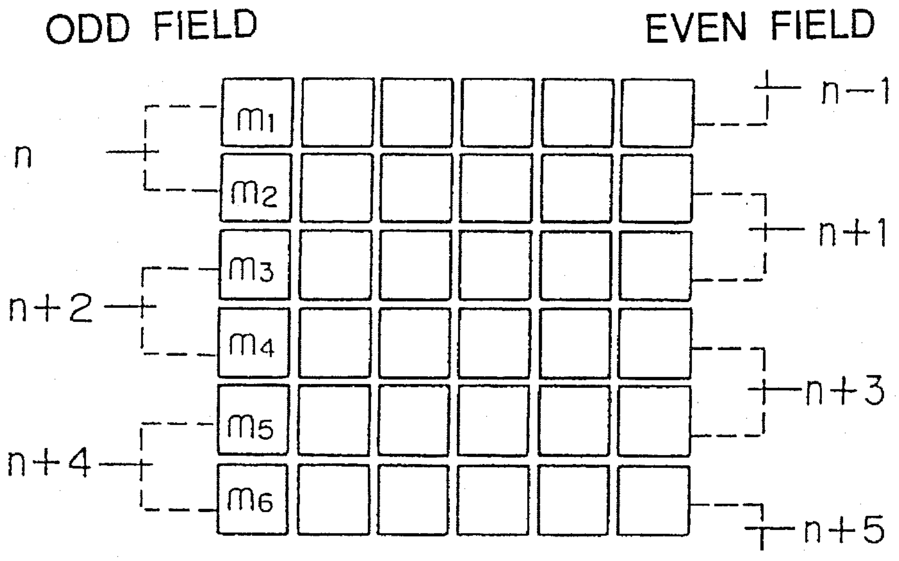
FIGS. 14(*a*) and 14(*b*) are an explanatory views of a field storage drive control of an image pickup element of an image pickup apparatus with a horizontal line interpolation function in the third, seventh, and eighth embodiments.
Figure 14B:
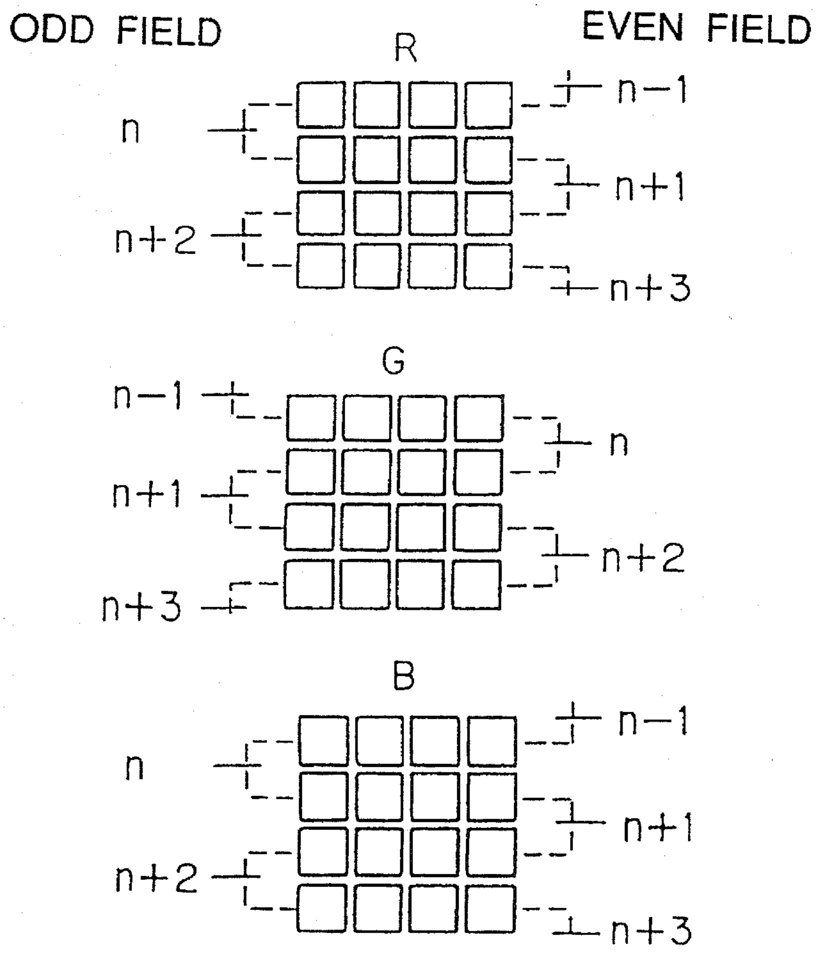

Nextly, FIG. 14 shows a field storage drive control of the image pickup elements. FIG. 14(*a*) shows an outline of a common interlace-reading drive control of the image pickup elements, while FIG. 14(*b*) shows an outline of a reading drive control of the R, G and B image pickup elements for obtaining R, G and B signals, which is another arrangement example of the image pickup element section 101 in the present embodiment. In the field storage mode as shown in FIG. 14(*a*), in the odd field, signals of odd-numbered lines and signals of their succeeding even-numbered lines are simultaneously added up (PDmix) and read from pixels of lines close to a horizontal transfer CCD (not shown), and next, in the even field, with combination for the addition changed, signals of even-numbered lines and signals of their succeeding odd-numbered lines from bottom are simultaneously added up and read, and thus, interline transfer is accomplished. In the present embodiment, as shown in FIG. 14(*b*), in the odd field, out of the R, G and B image pickup elements, the R and B image pickup elements perform the reading of the odd field as shown in FIG. 14(*a*), while the G image pickup element performs the reading of the even field, and next, in the even field, out of the R, G and B image pickup elements, the R and B image pickup elements perform the reading of the even field, while the G image pickup device performs the reading of the odd field. In this way, odd/even PDmix reading by the R, G and B image pickup elements is inversed between the R and B image pickup elements and the G image pickup element by the field storage drive control.

As shown in FIG. 13 and FIG. 14 above, by inversing the odd/even reading between the R and B image pickup elements and the G image pickup element, the resulting R and B signals and the G signal are shifted in their spatial position (phase) by a ½ line (line width in one field).

As described above, according to the present embodiment, the provision of the drive control circuit makes it possible to provide an image pickup apparatus which does not necessitate an assembly process of strict precision that, in order to shift the phase of three signals, R, G, and B, the solid state image pickup elements are secured in contact to a three-color separation prism provided for obtaining three chrominance signals or a two-color separation prism so as to be vertically shifted in position, and which reduces the total manufacturing cost including manufacturing equipment and time, and which alleviates deterioration in vertical frequency response characteristic due to interpolation as well as reduces deterioration in vertical sharpness due to horizontal line interpolation.

Nextly, the method of signal processing for the resulting R, G, and B chrominance signals is described below.

Figure 15A:
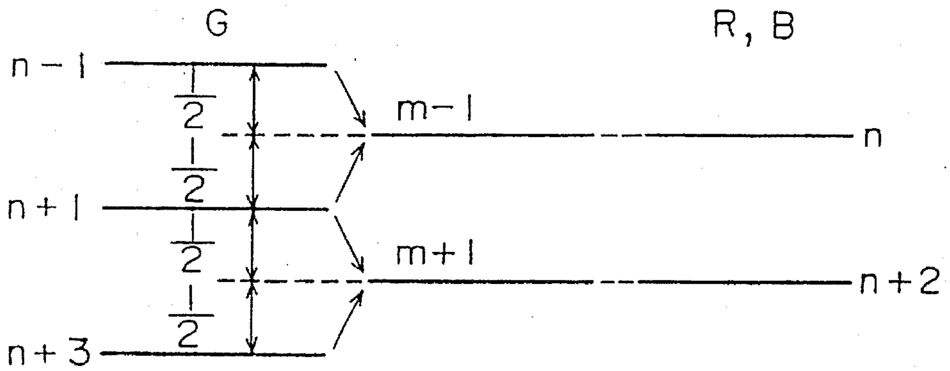
FIGS. 15(*a*) and 15(*b*) are explanatory views of a signal processing of the image pickup apparatus with a horizontal line interpolation function in the third embodiments.
Figure 15B:
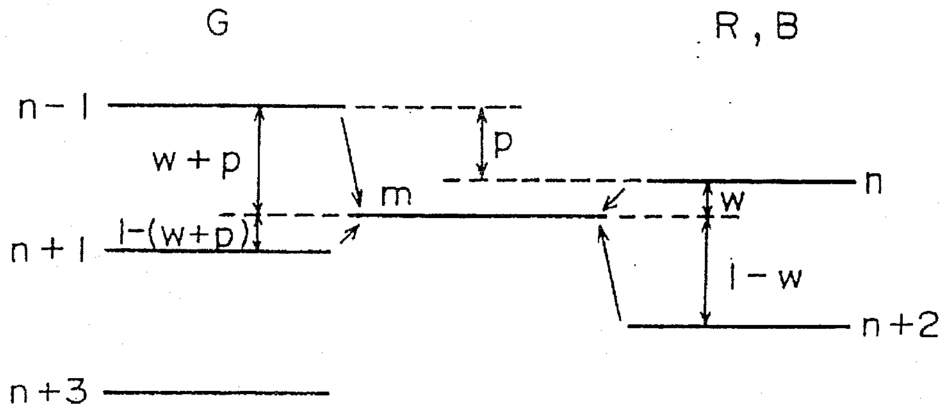

FIG. 15 shows an outline of the signal processing. FIG. 15(*a*) shows a case where the interpolation process is not performed, while FIG. 15(*b*) shows a case where the interpolation process is performed. Since the R and B signal and the G signal are shifted in phase by a ½ line (line width in one field) as shown in FIG. 15(*a*), it is required to be made coincident in vertical phase for signal processing. Therefore, two lines succeeding with respect to the G signal are subjected to averaging process (interpolation process with interpolation coefficients of ½ and ½), whereby the phases of the R, G and B signals are made coincident. This is shown in (Equation 1). Also, in the case of an interpolation process as shown in FIG. 15(*b*), if the phase shift between the R and B signal and the G signal is p (=½ line), then the interpolation coefficient can be represented by a function of w and p, in which case the resulting interpolation signal is shown in (Equation 2):

Equation 1:

$$R_m=R_n,\ B_m=B_n,\ G_m=(G_{-1}+G_n)/2$$

Equation 2:

$$R_m=w\times R_{n+2}+(1-w)\times R_n$$

$$B_m=w\times B_{n+2}+(1-w)\times B_n$$

$$G_m=(w+p)\times G_{n+1}+(1-w-p)\times G_{n-1}$$

With an interpolation line synthesized in this way, an interpolation signal in the same phase can be synthesized from chrominance signals of different two types of phase, and moreover, since deterioration in frequency response characteristic due to interpolation differs depending on their phase, when viewing the video signal as a whole of the three chrominance signals (i.e. for example when a luminance signal synthesized from G, R and B signals by matrix operation is considered), deterioration in frequency response characteristic can be reduced, so that deterioration in vertical sharpness of the horizontal line interpolation signal can be reduced. For example, if p=[½ line of a video signal to be interlace-scanned], then even when such an interpolation process for w=0.5 with the largest deterioration in frequency response characteristic is done, either of the G signal and the R and B signal is not subjected to interpolation process and such a state can be maintained that there occurs no deterioration in frequency response characteristic, and therefore, the horizontal line interpolation signal is reduced in deterioration in vertical sharpness as the whole of the video signal.

Although a case of control (CTL1) where the G signal is spatially shifted in position has been described above in connection with FIGS. 13, 14 and 15, yet another control (CTL1) in which the R and B signal is spatially shifted in position is also possible. Further, such control that position of the R signal only (CTL3) or the B signal only (CTL4) is spatially shifted is possible. This spatial position control is described below. A luminance (Y) signal is generated by R, G and B signals, and is represented by (Equation 3):

Equation 3:

$$Y=0.3R+0.59G+0.11B$$

where a spatially shifted signal (Ya) and a spatially unshifted signal (Yb) contained in the luminance signal are represented by the following equations (Equation 4) for the above cases of CTL1–CTL4, respectively:

Equation 4:

$$\begin{aligned}
CTL1:\ & Ya=0.3R+0.11B\\
& Yb=0.59G\\
CTL2:\ & Ya=0.59G\\
& Yb=0.3R+0.11B\\
CTL3:\ & Ya=0.59G+0.11B\\
& Yb=0.3R\\
CTL4:\ & Ya=0.3R+0.59G\\
& Yb=0.11B
\end{aligned}$$

Color-difference signals (R-Y and B-Y) are generated from the R, G and B signals, and are represented by (Equation 5):

Equation 5:

$$R-Y=0.7R-0.59G-0.11B$$

$$B-Y=0.3R-0.59G-0.89B$$

where a spatially shifted signal (Ca) and a spatially unshifted signal (Cb) contained in the individual color-difference signals are represented by the following (Equation 6) for the above cases of CTL1–CTL4, respectively:

Equation 6:

$$\begin{aligned}
CTL1:\ & Ca(R-Y)=0.7R-0.11B\\
& Ca(B-Y)=-0.3R+0.89B\\
& Cb(R-Y)=-0.59G\\
& Cb(B-Y)=-0.59G\\
CTL2:\ & Ca(R-Y)=-0.59G\\
& Ca(B-Y)=-0.59G\\
& Cb(R-Y)=0.7R-0.11B\\
& Cb(B-Y)=-0.3R+0.89B\\
CTL3:\ & Ca(R-Y)=-0.59G-0.11B\\
& Ca(B-Y)=-0.59G+0.89B\\
& Cb(R-Y)=0.7R\\
& Cb(B-Y)=-0.3R\\
CTL4:\ & Ca(R-Y)=0.7R-0.59G\\
& Ca(B-Y)=-0.3R+0.59G\\
& Cb(R-Y)=-0.11B\\
& Cb(B-Y)=0.89B
\end{aligned}$$

In order to reduce deterioration in vertical sharpness of a horizontal line interpolation signal in the whole video signal, it is necessary that Ya and Yb are approximately equal to each other and Ca and Cb are approximately equal to each other, in (Equation 4) and (Equation 6). This makes it understood that CTL1 and CTL2 are proper for the spatial position control. Accordingly, the following explanation is made to only the cases where the spatial position control is CTL1 and CTL2.

Figure 16A:
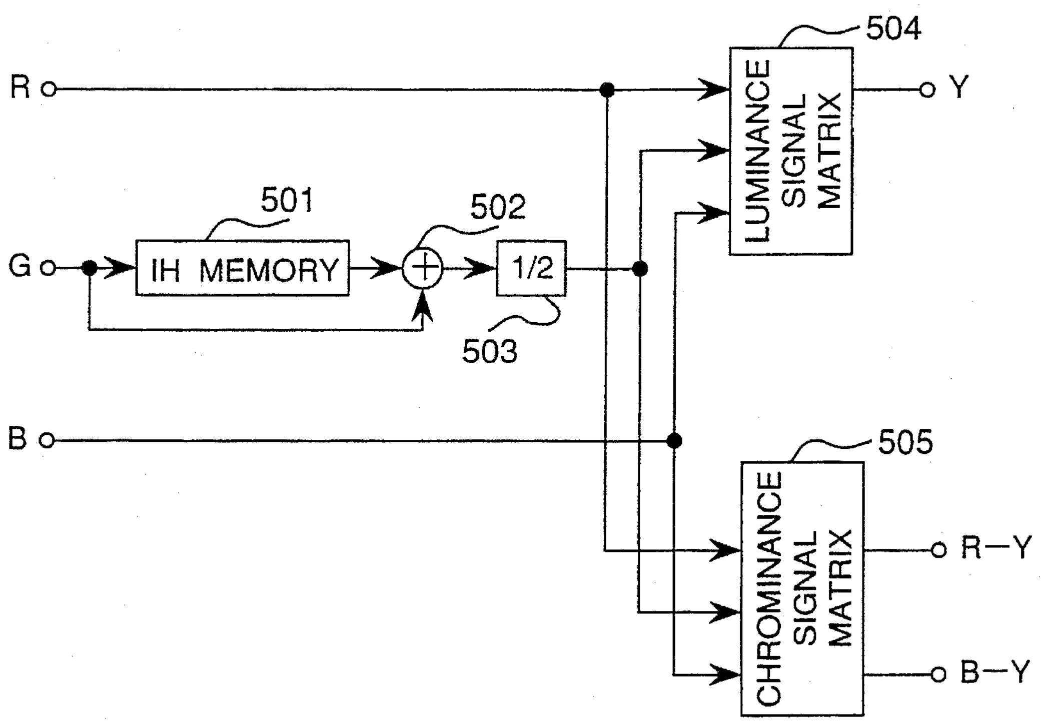
FIGS. 16(*a*) and 16(*b*) are constitutional diagrams of a digital signal processing circuit of the image pickup apparatus with a horizontal line interpolation function in the third and seventh embodiments.
Figure 16B:
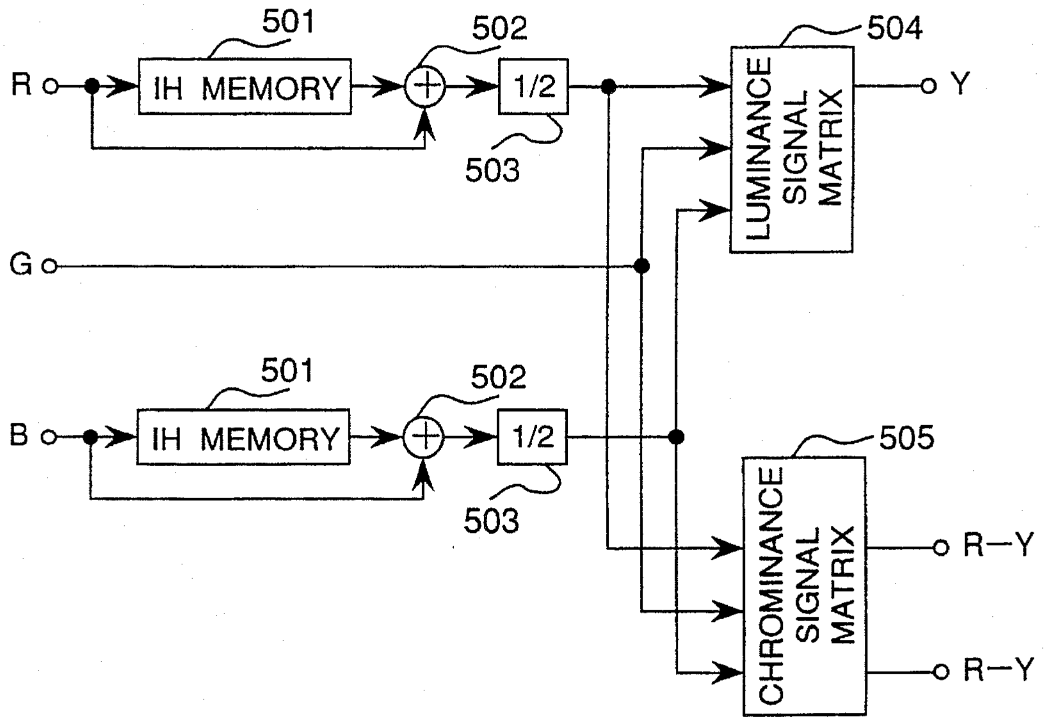

Next described is the circuit construction of the digital signal processing circuit 106 with reference to FIG. 12. FIG. 16 shows an example of the circuit construction. FIG. 16(*a*) takes a case where the spatial position control is CTL1, while FIG. 16(*b*) takes a case of CTL2. Those which exhibit the same effects as in FIGS. 16(*a*) and (*b*) are designated by like numbers, their detail being omitted. FIG. 16(*a*) comprises: a 1H memory 501 for delay of 1 horizontal line period of the G signal; an adder 502; a ½ amplifier 503 for gain control; a luminance signal matrix 504 for performing calculation as shown in (Equation 3); and a chrominance signal matrix 505 for performing calculation as shown in (Equation 5). Similarly, FIG. 16(*b*) comprises: a 1H memory 501 for delay of 1 horizontal line period of the R signal and the B signal; an adder 502; a ½ amplifier 503 for gain control; a luminance signal matrix 504 for performing calculation as shown in (Equation 3); and a chrominance signal matrix 505 for performing calculation as shown in (Equation 5). In the digital signal processing circuit constructed as above, the provision of a vertical interpolation function having the 1H memory, i.e. a 2H line averaging circuit allows the chrominance signals to be made coincident in phase, in which state luminance signal processing and chrominance signal processing are subsequently performed. Further, from FIGS. 16(*a*) and (*b*), it can be understood that FIG. 16(*a*), i.e. the case where the spatial position control is CTL1 (G signal is shifted), is better suited for reduction in circuit scale.

On the other hand, in signal processing in the case where the interpolation is not performed, phase adjustment with respect to chrominance signals which are shifted in spatial position (phase) as shown in FIG. 16 is done by LPF processing in the vertical direction, and therefore, high-band frequency characteristic would deteriorate. When the video signal is taken as a whole of the three chrominance signals (i.e. for example when a luminance signal synthesized from G, R and B signals by matrix operation is considered), the spatial position control CTL2 in which the R and B signal is shifted in phase as shown in (Equation 4) is superior in high-band frequency characteristic to CTL1 in which the G signal is shifted, in the case of the luminance signal matrix where the calculation as shown in (Equation 3) is performed. Also in the case of chrominance signal matrix where the calculation as shown in (Equation 5) is performed, the spatial position control CTL2 is superior to CTL1 in high-band frequency characteristic as shown in (Equation 6). Thus, it can be understood that the spatial position control CTL2 is preferred for high-band frequency characteristic in the signal processing in which interpolation processing is not performed.

Figure 17A:
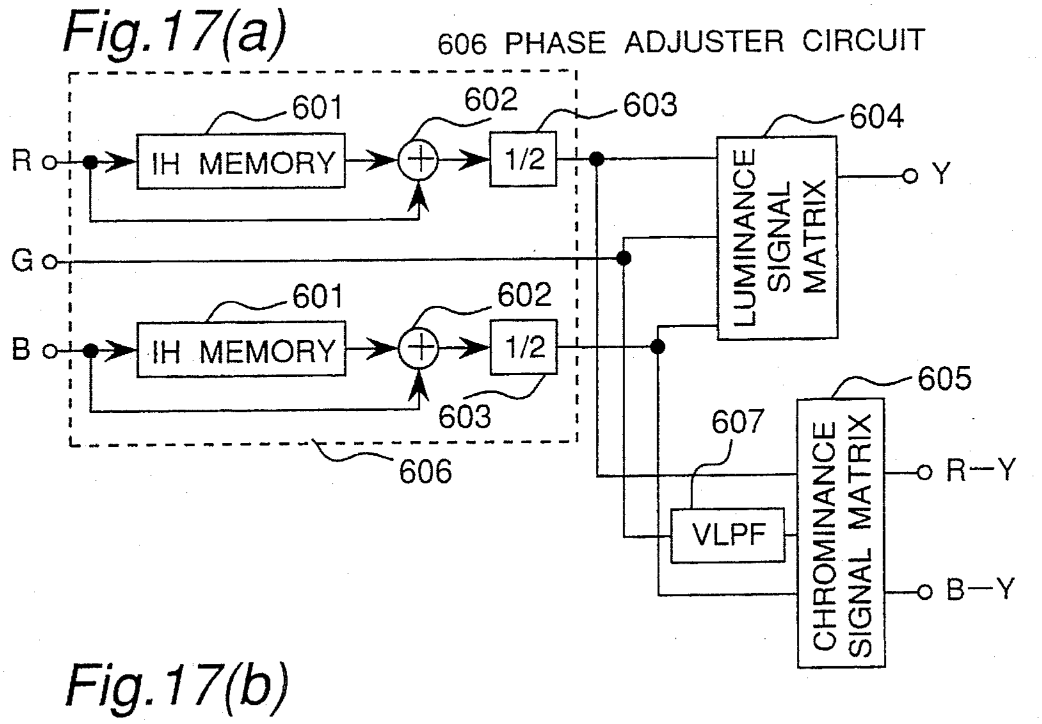
FIGS. 17(*a*) 17(*b*) and 17(*c*) are explanatory views of a false chrominance signal removal in the image pickup apparatus with a horizontal line interpolation function in the third embodiment.
Figure 17B:
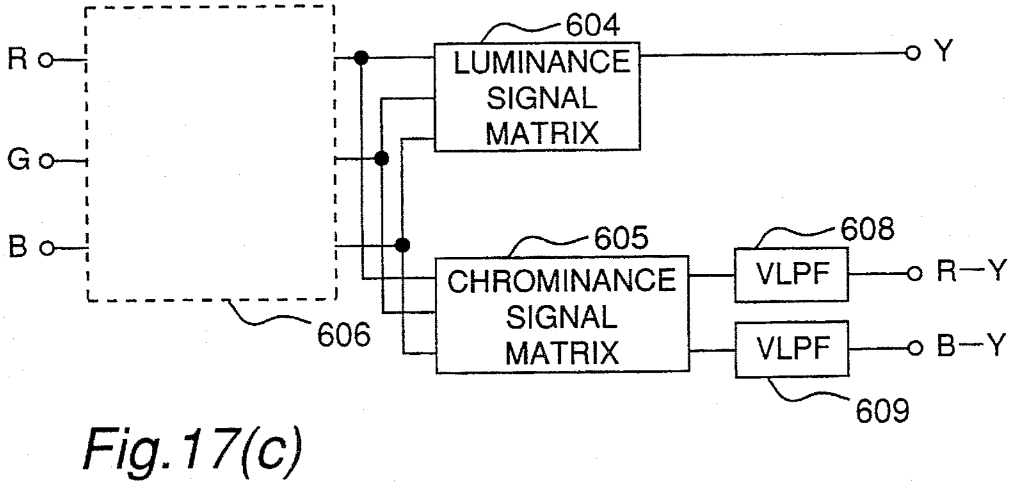
Figure 17C:
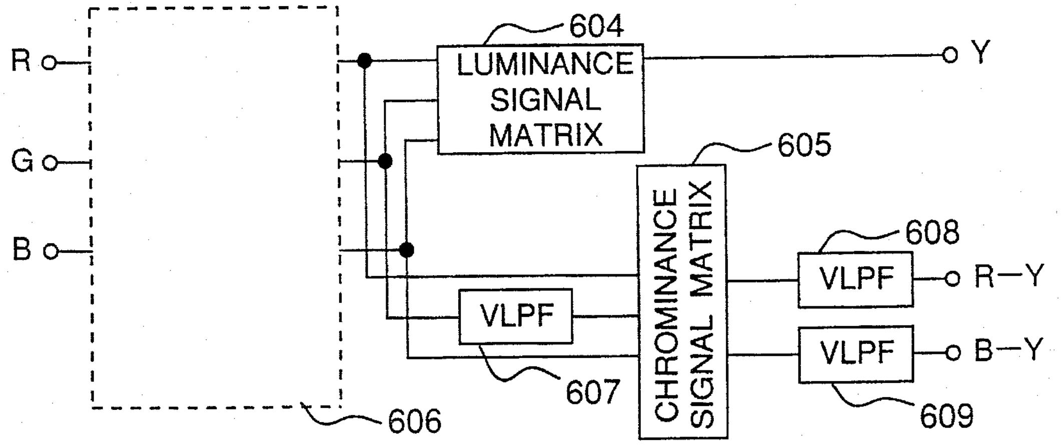

Further, in the chrominance signal matrix in which color-difference signals are generated, there would occur false signals in the high frequency band due to different high-band frequencies of chrominance signals. This point is described below. For example, when white color is picked up, it is necessary for color-difference signals R-Y, B-Y to be at zero level. However, in the case of the spatial position control CTL2, a G signal exists (G≠0) but an R/B signal does not exist (R=B=0) in the high frequency band, so that the color-difference signals R-Y, B-Y are other than at zero level as shown in (Equation 7) and therefore false chrominance signals will be generated. An arrangement example of the digital signal processing circuit 106 in FIG. 12 to remove these false chrominance signals is shown in FIG. 17. In FIG. 17, numeral 601 denotes a 1H memory for delay of 1 horizontal line period; 602 denotes an adder; 603 denotes a ½ amplifier for gain control; 604 denotes a luminance signal matrix for processing the calculation shown in (Equation 3); 605 denotes a chrominance signal matrix for processing the calculation shown in (Equation 5); 606 denotes a phase adjuster circuit composed of the 601 to 603; 607 denotes a VLPF for attenuating high-band frequency components of the G signal; and 608 and 609 denote VLPFs for attenuating high-band frequency components of the color-difference signals R-Y, B-Y.

Equation 7:

$$R-Y|_H=-0.59G$$

$$B-Y|_H=-0.59G$$

The signal processing circuit constructed as above is described below. Components 601 to 605 in FIG. 17 are the same as 501 to 505 in FIG. 16, and VLPFs 607, 608 and 609 only differ therefrom. Referring to FIG. 17(*a*), the VLPF 607 attenuates the high-band frequency component of the G signal so that the component becomes equal to that of the R and B signal, thereby reducing false signals that would be generated in the high frequency band of color-difference signals. Similarly, referring to FIG. 17(*b*), the VLPFs 608, 609 attenuate high-band frequency components of color-difference signals, thereby reducing false signals that would be generated in the high frequency band. In FIG. 17(*c*), where the effects of FIG. 17(*a*) and (*b*) are added up, the high-band frequency component of the G signal is attenuated and moreover high-band frequency components of color-difference signals are attenuated, whereby false signals that would be generated in the high frequency band are reduced. In this way, the provision of the vertical LPFs allows false signals generated in the high frequency band to be reduced, and thus, it becomes possible to provide an image pickup apparatus with a horizontal line interpolation function, free from false signals.

Figure 18:
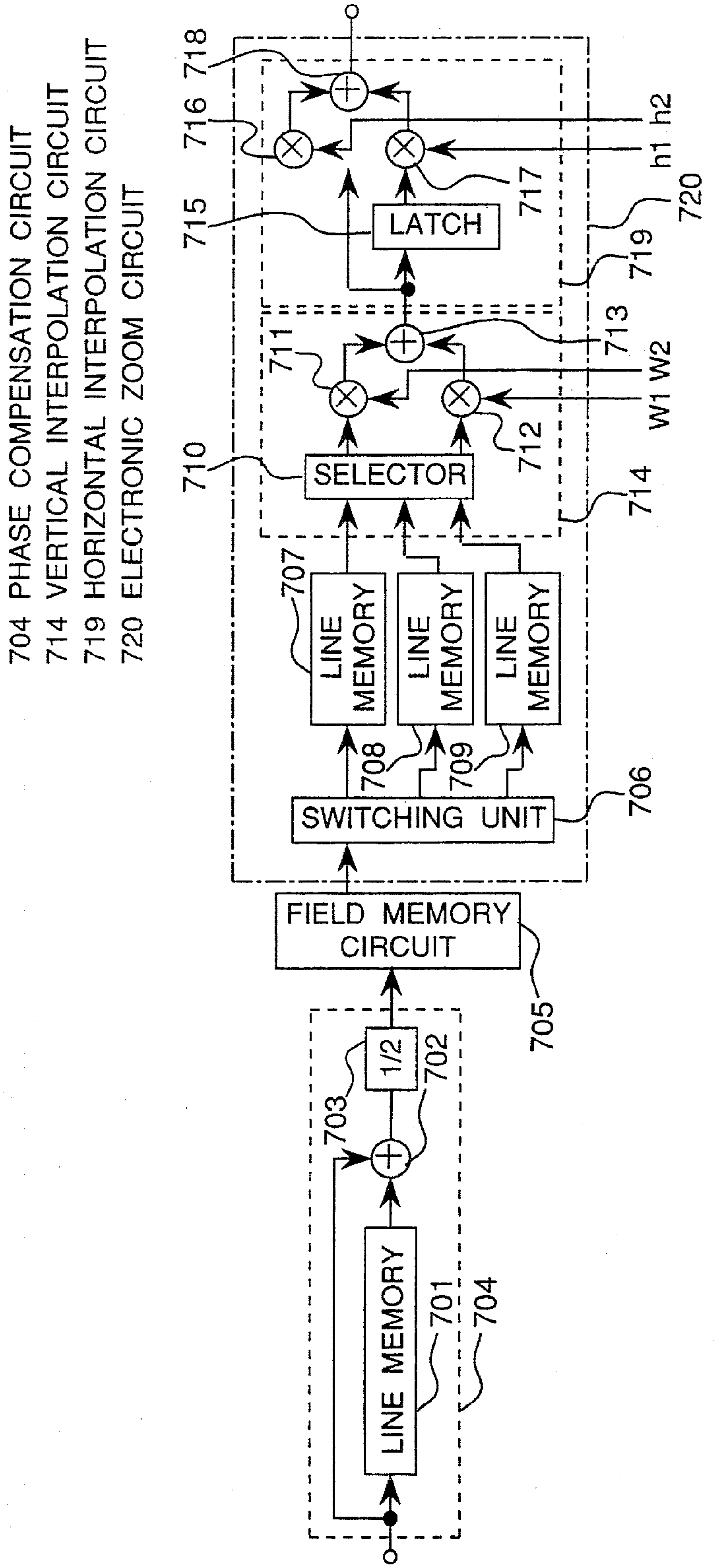
FIG. 18 is a constitutional diagram of an interpolation function portion of the image pickup apparatus with a horizontal line interpolation function in the third embodiment.

Nextly, an arrangement example of the interpolation function section as shown in FIG. 12, a block diagram of the image pickup apparatus with a horizontal line interpolation function, is described in regard to one signal with reference to FIG. 18. In the figure, numerals 701 to 704 denote a vertical spatial position phase compensation section for performing averaging process of 2 lines (interpolation processing with interpolation coefficients of ½, 1/2) for vertical phase adjustment as shown in FIG. 5, where 701 denotes a 1H memory; 702 denotes an adder; 703 denotes a ½ amplifier; and 704 denotes a phase compensation circuit composed of these components. Also, 705 denotes a field memory, and 706 denotes a switching unit for changing over write operations of 1H line memories 707 to 709 shown in the next. Numeral 710 denotes a selector 710 for selecting two out of the line memories; 711 and 712 denote multipliers; 713 denotes an adder; 714 denotes a vertical interpolation circuit composed of the 710 to 713; 715 denotes a latch circuit for performing horizontal delay; 716 and 717 denote multipliers; 718 denotes an adder; 719 denotes a horizontal interpolation circuit composed of the 715 to 718; and 720 denotes an electronic zoom circuit composed of the vertical interpolation circuit 714 and the horizontal interpolation circuit 719.

In the interpolation function portion constructed as above, a signal compensated for vertical phase shift by the phase compensation circuit 704 is stored in the field memory, then subjected to control by the field memory 705 (not shown) and control of three line memories within the electronic zoom circuit 720, and processed for interpolation calculation of multiplication data w1 and w2 within the vertical interpolation circuit 714 (where when w2=1−wl, a primary interpolation is effected). Next, within the horizontal interpolation circuit 719, interpolation calculation of multiplication h1 and h2 is performed (where when h2=1−h1, a primary interpolation is effected). However, the phase compensation circuit 704 is necessitated for signals shifted in phase vertically, and not for signals which are not shifted in phase vertically.

As described above, the provision of a phase compensation circuit, a vertical interpolation circuit, and a horizontal interpolation circuit makes it possible to implement the vertical and horizontal interpolation function in an image pickup apparatus with a horizontal line interpolation function in which phase is shifted vertically.

[4] <Fourth embodiment: A construction having a vertical interpolation selector circuit added>

Figure 19:
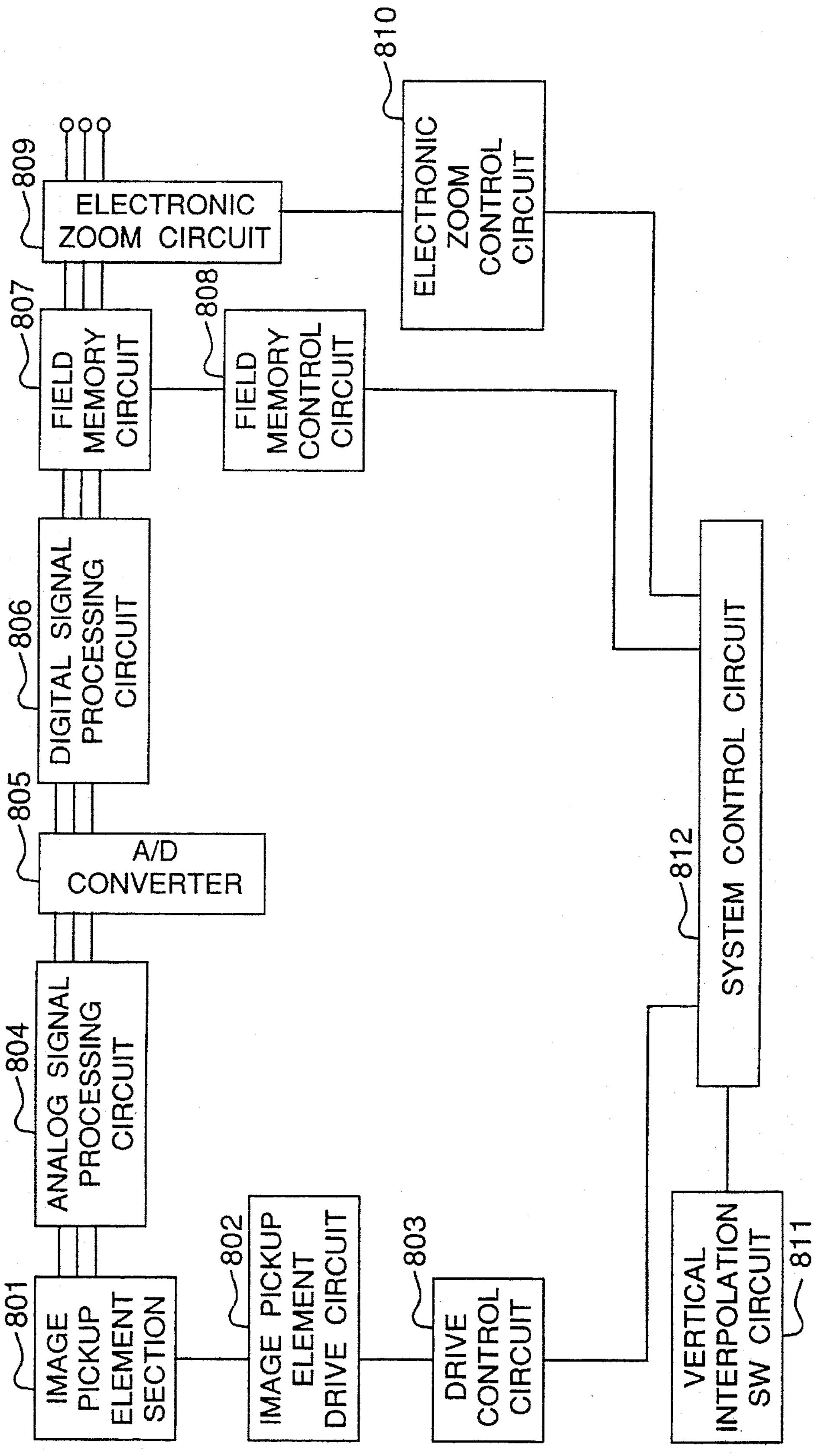
FIG. 19 is a block diagram of an image pickup apparatus with a horizontal line interpolation function in a fourth embodiment.

FIG. 19 is a block diagram of an image pickup apparatus with a horizontal line interpolation function representing a fourth embodiment. In the figure, 801 to 810 are the same as 101 to 110 in FIG. 12, and only a vertical interpolation SW circuit 711 and a system control circuit 812 for comprehensively controlling the aforementioned circuit differ therefrom. The image pickup apparatus with a horizontal line interpolation function constructed in this way is described below, focused on the different points.

In FIG. 19, when interpolation operation is not performed, the vertical interpolation SW circuit 811 is kept in an off state, where the image pickup element section 801 performs a normal drive operation in which the R, G and B signals are coincident in vertical phase with one another via the system control circuit 812, the drive control circuit 803, and the image pickup element drive circuit 802. On the other hand, when a horizontal line is generated by the interpolation function, the vertical interpolation SW circuit 811 is thrown into an on-state, where the image pickup element section 801 performs a drive operation in which the R and B signal and the G signal are different in vertical phase, by means as shown in FIG. 13 and FIG. 14 for the third embodiment, via the system control circuit 812, the drive control circuit 803, and the image pickup element drive circuit 802.

In the image pickup apparatus with a horizontal line interpolation function of the present embodiment constructed as above, in the case of signal processing in which the interpolation process is not performed, phase adjustment for chrominance signals is not necessitated because of coincident spatial position (phase), neither is required to perform vertical LPF processing, and therefore, high-band frequency characteristic will not deteriorate. Also, in the case of signal processing where the interpolation process is performed, deterioration in frequency response characteristic due to the interpolation process differs depending on their phase, as in the third embodiment, and therefore, when the video signal is taken as a whole of the three chrominance signals (i.e. for example when a luminance signal synthesized from G, R and B signals by matrix operation is considered), deterioration in frequency response characteristic can be reduced and deterioration in vertical sharpness of the horizontal line interpolation signal can also be reduced.

As described above, according to the present embodiment, with the provision of a drive control circuit and a vertical interpolation SW circuit, a high-resolution image free from deterioration in vertical resolution can be obtained when the interpolation process is not performed, and an image with less deterioration in image quality can be obtained as a result of reducing the deterioration in vertical sharpness of a horizontal line interpolation signal when the interpolation process is performed.

[5] <Fifth embodiment: "Vertical interpolation circuit+horizontal interpolation circuit" construction>

Figure 20:
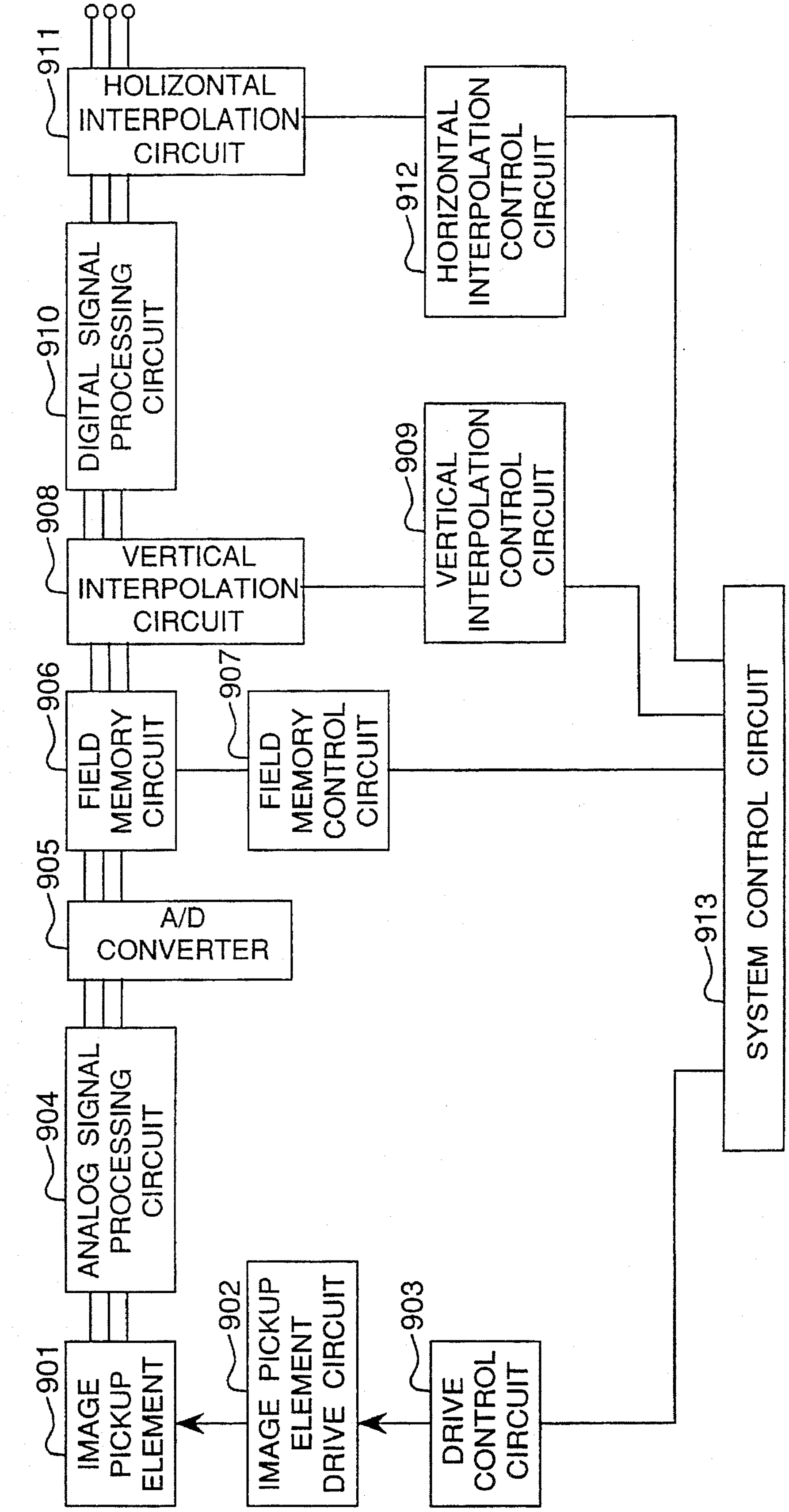
FIG. 20 is a block diagram of an image pickup apparatus with a horizontal line interpolation function in a fifth embodiment.

FIG. 20 is a block diagram of an image pickup apparatus with a horizontal line interpolation function representing a fifth embodiment. In the figure, 901 to 905 are the same as 101 to 105 in FIG. 12, and differs from in: a field memory circuit 906 for storing an output signal of an A/D converter circuit 905; a field memory control circuit 907 for controlling the field memory circuit 906; a vertical interpolation circuit 908 for performing a vertical interpolation process using an output signal of the field memory circuit 906; a vertical interpolation control circuit 909 for controlling the vertical interpolation circuit 908; a digital signal processing circuit 910 for generating luminance signals, chrominance signals and color-difference signals, or the like from output signals of the vertical interpolation circuit 908 or performing RGB signal processing; a horizontal interpolation circuit 911 for performing a horizontal interpolation process using output signals of the digital signal processing circuit 910; a horizontal interpolation control circuit 912 for controlling the horizontal interpolation circuit 911; and a system control circuit 913 for comprehensively controlling the above circuits.

The image pickup apparatus with a horizontal line interpolation function of the present embodiment constructed as above is described on its operation. The present embodiment differs from the third embodiment largely in that the electronic zoom circuit is divided into the vertical interpolation circuit 908 and the horizontal interpolation circuit 911. Now the electronic zoom function is explained with reference to FIG. 21 and FIG. 22.

Figure 21:
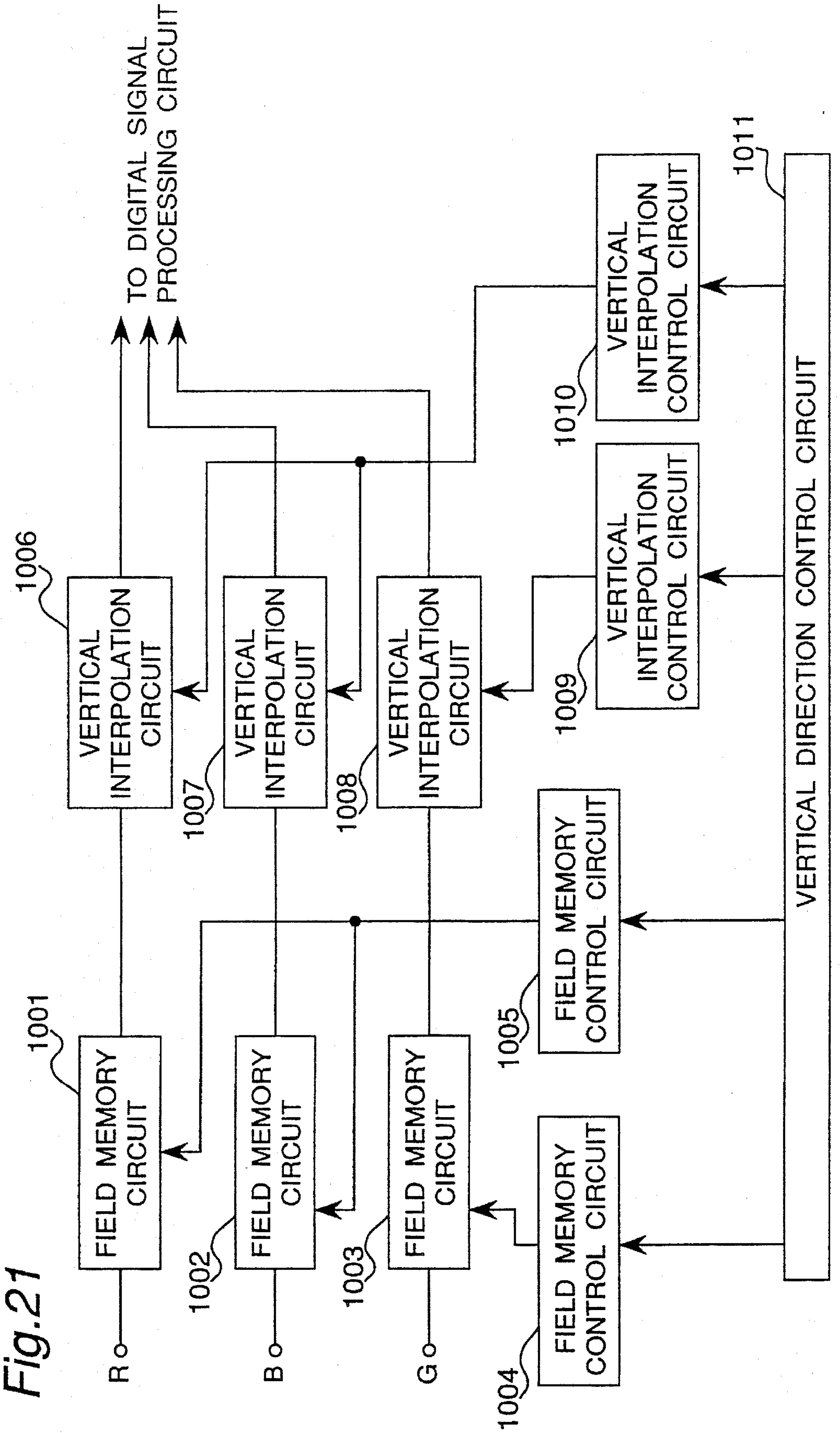
FIG. 21 is a constitutional diagram of a vertical electronic zoom function of the image pickup apparatus with a horizontal line interpolation function in the fifth embodiment.

FIG. 21 shows an arrangement example of the vertical electronic zoom function. In the figure, reference numerals 1001, 1002, 1003 denote field memory circuits for storing R, B, and G signals, respectively; 1004 denotes a field memory control circuit for controlling the field memory circuit 1003 (G signal); 1005 denotes a field memory control circuit for controlling the field memory circuits 1001 (R signal) and 1002 (B signal); 1006, 1007, and 1008 denote vertical interpolation circuits for performing vertical interpolation and enlargement processing on the R, B, and G signals derived from the field memory circuits 1001, 1002, and 1003, respectively; 1009 denotes a vertical interpolation control circuit for controlling the vertical interpolation circuit 1008; 1010 denotes a vertical electronic zoom control circuit for controlling the vertical interpolation circuits 1006 and 1007; and 1011 denotes a vertical direction control circuit incorporated in the system control circuit 913 in FIG. 20, for controlling the above control circuits.

Figure 22:
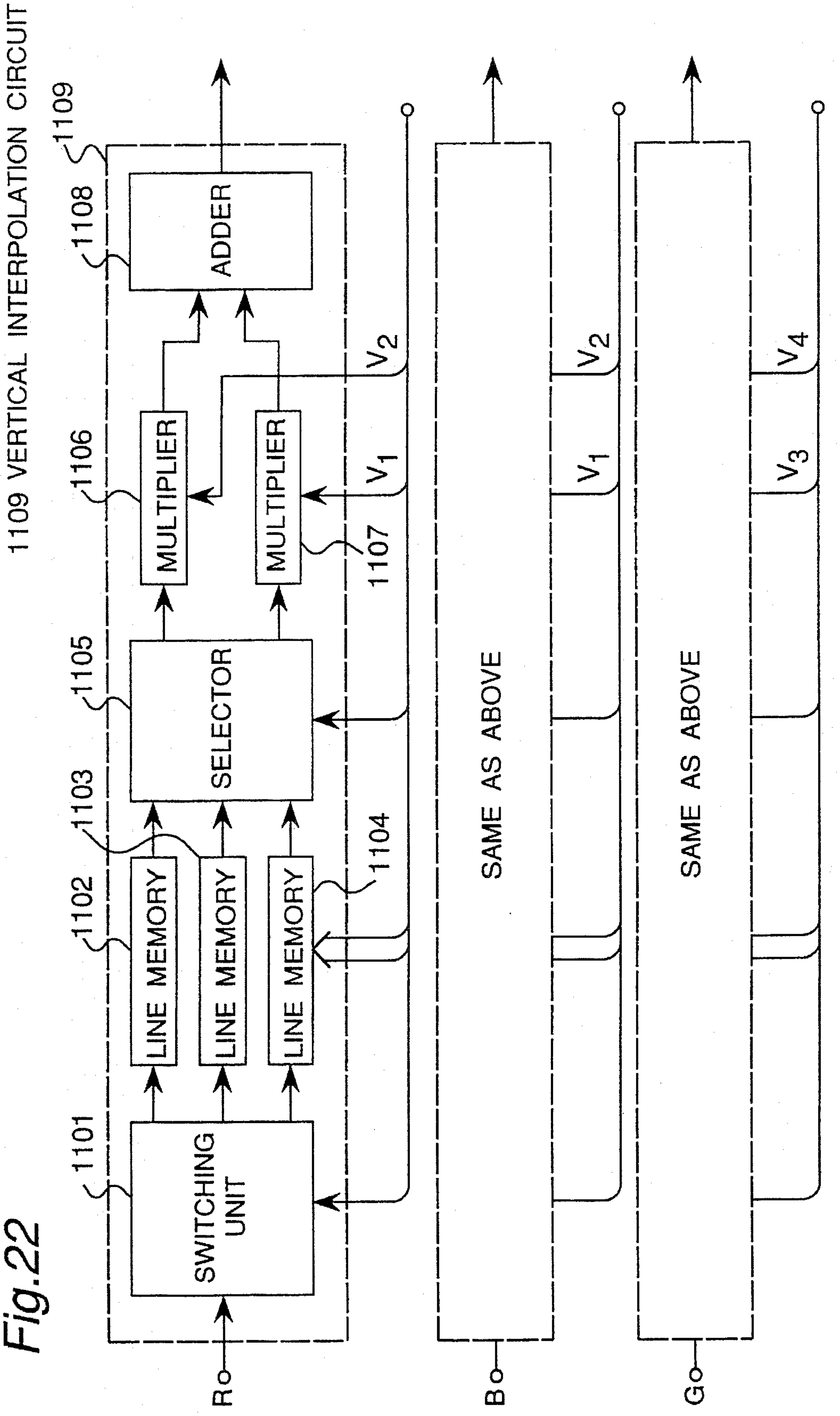
FIG. 22 is a constitutional diagram of vertical interpolation of the image pickup apparatus with a horizontal line interpolation function in the fifth embodiment.

FIG. 22 shows the vertical interpolation circuit. As shown in the figure, 1109 represents the whole vertical interpolation circuit, where 1101 through 1108 are the same as 706 through 713 in FIG. 18 of the third embodiment and their description is omitted. Also, among the R, G, and B signals, the circuit construction is of the same and the difference is in the fact that the multiplication coefficient (interpolation coefficient) from the vertical interpolation control circuit to multipliers is v1 and v2 for the R and B signals, and v3 and v4 for the G signal.

The vertical electronic zoom function constructed as above is described on the case where the R and B signals are shifted in vertical phase. The R and B signals are controlled by the field memory circuits 1001 and 1002 and the field memory control circuit 1005, and further by the vertical interpolation circuits 1006 and 1007 and the vertical interpolation control circuit 1010, so that a horizontal line is interpolated by calculation with vertical interpolation coefficients v1 and v2 which are determined from a vertical phase shift amount p (½ line) and the vertical interpolation coefficient w, as shown for the G signal in FIG. 15(*b*). Also, the G signal is controlled by the field memory circuit 1003 and the field memory control circuit 1004, and further by the vertical interpolation circuit 1008 and the vertical interpolation control circuit 1009, so that a horizontal line is interpolated by calculation with vertical interpolation coefficients v3 and v4 which are determined from the vertical interpolation coefficient w, as shown for the R and B signal in FIG. 15(*b*). Next, after vertical interpolation processing, signal processing for R, G, B signals or Y (luminance)/C (color) signals is performed by the digital signal processing circuit 910, and horizontal interpolation processing is performed by the horizontal interpolation circuit 911. This horizontal interpolation circuit can be constructed by the same circuit as the horizontal interpolation circuit 719 of FIG. 18, its description being omitted.

With the provision of the vertical interpolation circuits 1006 and 1007 as described above, it is possible to simultaneously perform the phase compensation function for the vertical phase shift p and the vertical interpolation function for the interpolation coefficient w, whereby the circuit for vertical phase compensation can be reduced, and therefore an image pickup apparatus with a horizontal line interpolation function can be provided in smaller circuit scale.

[6] <Sixth embodiment: Pseudo frame construction>

Figure 23:
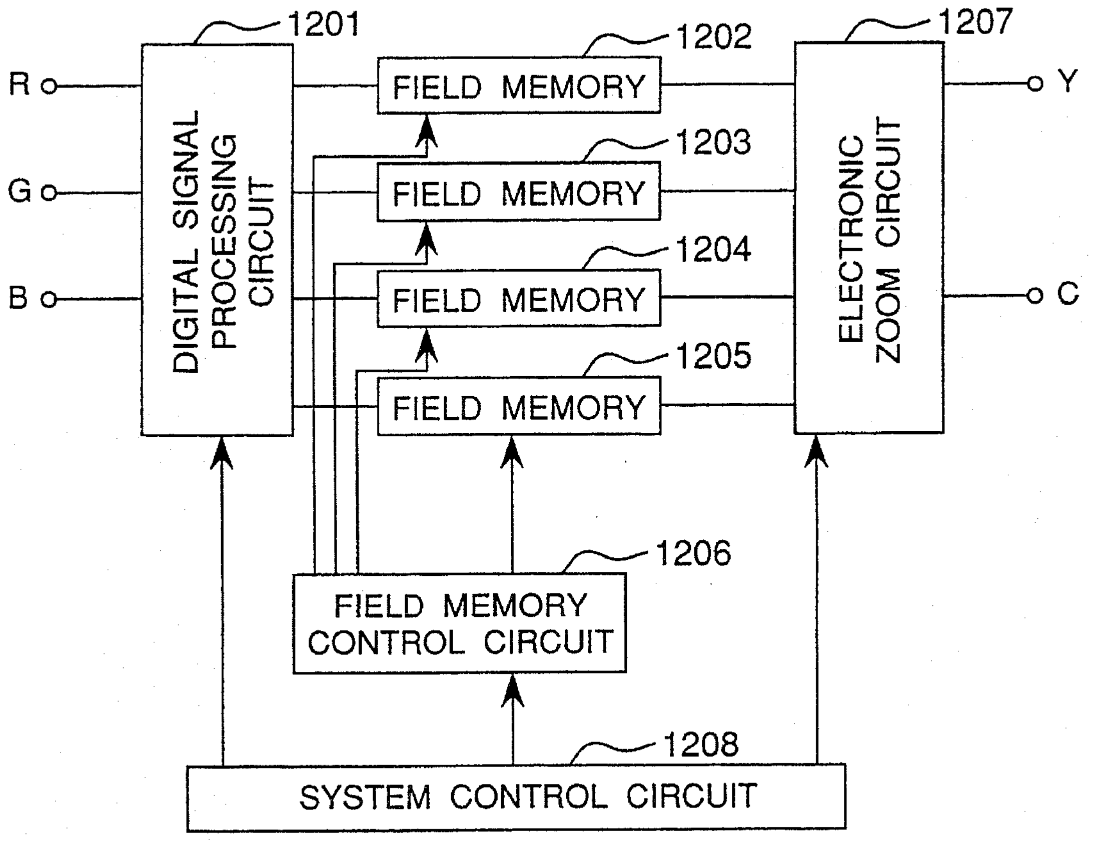
FIG. 23 is a block diagram showing a digital signal processing section of an image pickup apparatus with a horizontal line interpolation function in a sixth embodiment.
Figure 24:
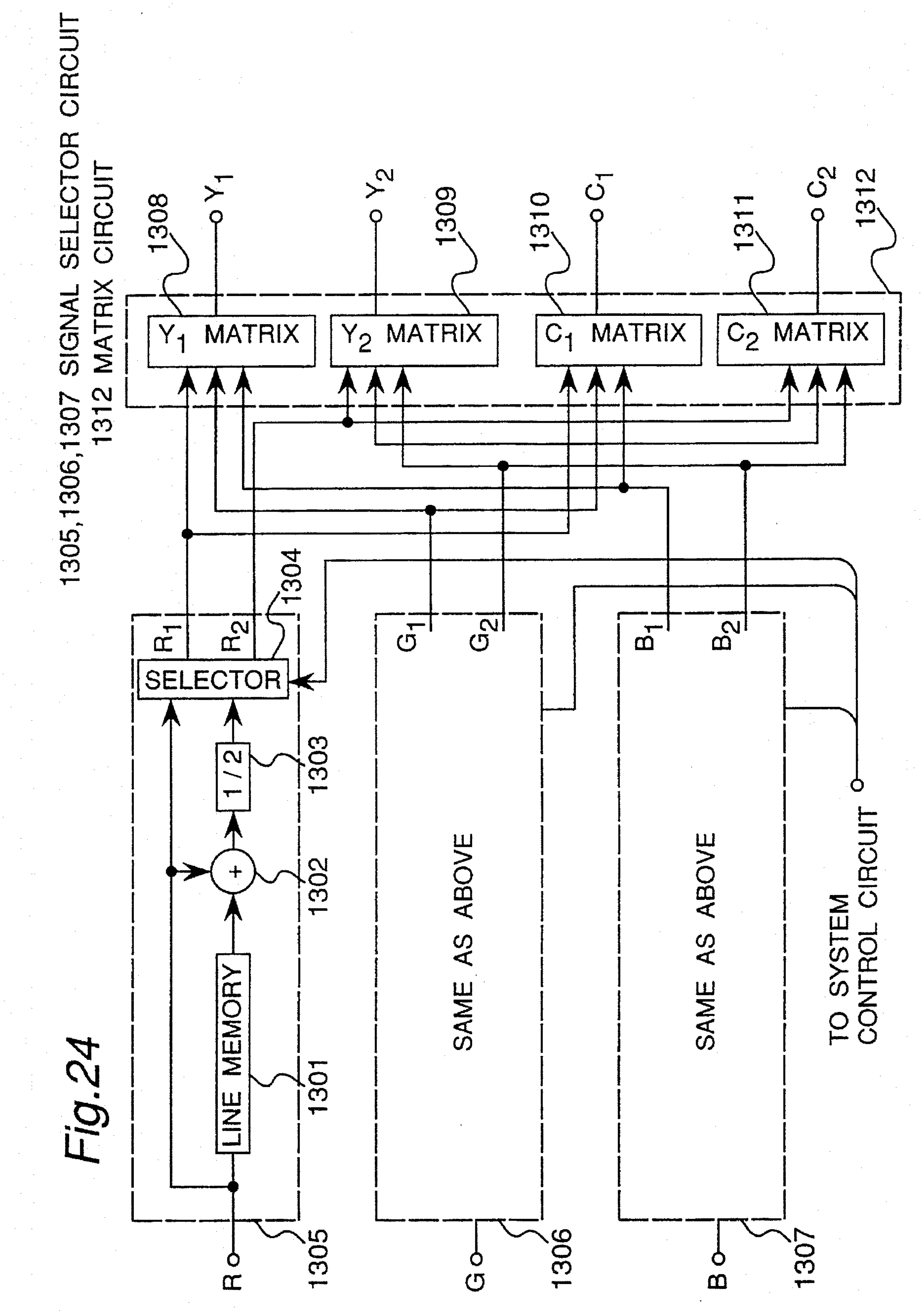
FIG. 24 is a block diagram showing a digital signal processing circuit of the image pickup apparatus with a horizontal line interpolation function in the sixth embodiment.

FIG. 23 is a block diagram showing the digital signal processing section of an image pickup apparatus with a horizontal line interpolation function which represents a sixth embodiment. In the figure, reference numeral 1201 denotes a digital signal processing circuit for obtaining two types of luminance signals Y1, Y2 and two types of chrominance signals CTL1, CTL2 from the R, G, and B signals; 1202 through 1205 denote field memories for storing the various signals; 1206 denotes a field memory control circuit for controlling the field memories mentioned above; 1207 denotes an electronic zoom circuit for performing interpolation and enlargement using Y1, Y2, C1, and C2; and 1208 denotes a system control circuit for comprehensively controlling the digital signal processing circuit, the field memory control circuit, and the electronic zoom circuit. Also, FIG. 24 is a block diagram showing a construction of the digital signal processing circuit 1201 of FIG. 23. In the figure, reference numeral 1301 denotes a line memory for storing signals of a 1H period; 1302 denotes an adder; 1303 denotes a ½ amplifier for performing gain control; 1304 denotes a selector circuit for selecting two signals R1 and R2 out of the three signals depending on information from the system control circuit; 1305, 1306, and 1307 denote signal selector circuits each composed of the above 1301 through 1304; 1308 denotes a Y1 matrix circuit for generating a luminance signal Y1; 1309 denotes a Y2 matrix circuit for generating a luminance signal Y2; 1310 denotes a C1 matrix circuit for generating a chrominance signal C1; 1311 denotes a C2 matrix circuit for generating a chrominance signal C2; and 1312 denotes a matrix circuit composed of the above 1308 through 1311.

Figure 25:
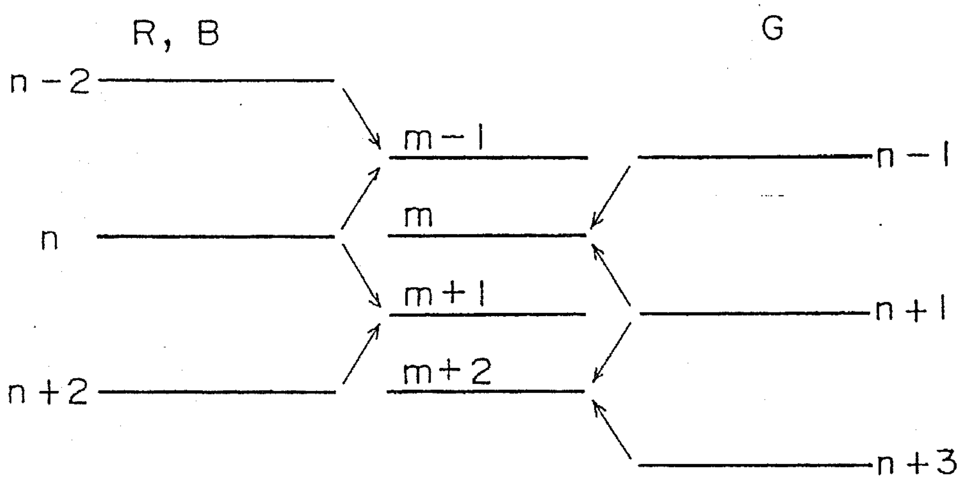
FIG. 25 is a first explanatory view of horizontal line interpolation in the image pickup apparatus with a horizontal line interpolation function in the sixth and seventh embodiments.
Figure 26:
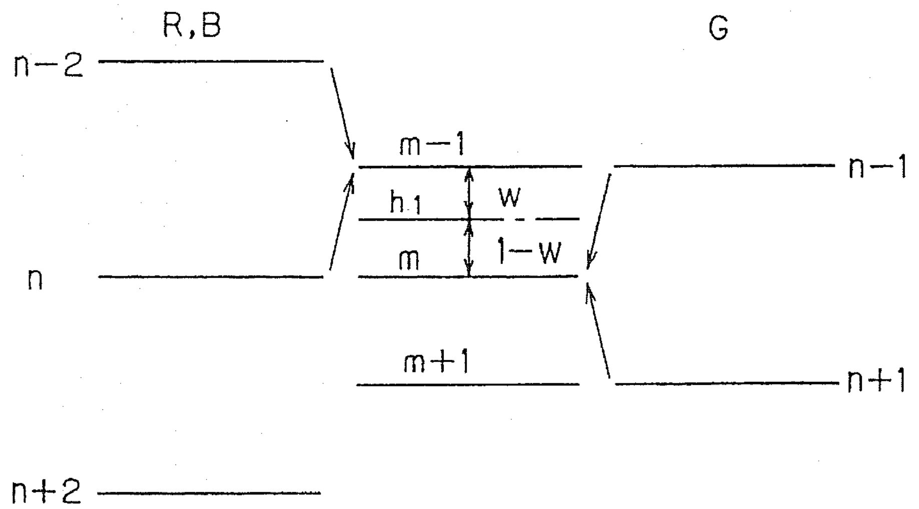
FIG. 26 is a second explanatory view of horizontal line interpolation in the image pickup apparatus with a horizontal line interpolation function in the sixth embodiment.
Figure 27:
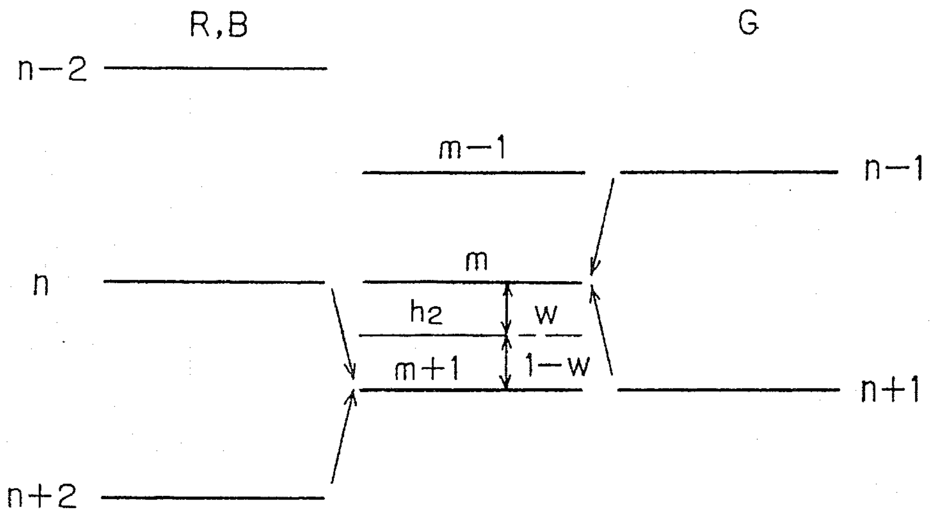
FIG. 27 is a third explanatory view of horizontal line interpolation in the image pickup apparatus with a horizontal line interpolation function in the sixth embodiment.

The image pickup apparatus with a horizontal line interpolation function constructed as above is described below on its operation with reference to FIGS. 25, 26, and 27. In FIG. 24, in the signal selector circuits 1305 through 1307, firstly three signals are generated from signals of successive two lines. This is illustrated in FIG. 25. FIG. 25 shows a signal generated from R, G and B signals where the R and B signal is shifted in vertical phase with respect to the G signal by a ½ line. For example, in the R and B signal, an interpolation signal of the (m−1)th line is generated from signals of the (n−2)th line and the nth line while an interpolation signal of the (m+1)th line is generated from signals of the nth line and the (n+2)th line, and similarly, in the G signal, an interpolation signal of the mth line is generated from signals of the (n−1)th line and the (n+1)th line while an interpolation signal of the (m+2)th line is generated from signals of the (n+1)th line and the (n+3)th line. In this way, signals of three lines including interpolation signals are generated from signals of successive two lines. Next, in the selector circuit 1304 in FIG. 24, two signals are selected out of the above three signals. This is illustrated in FIG. 26 and FIG. 27. FIG. 26 shows an interpolation line h1 generated from the R, G and B signals in which the R and B signal is shifted in vertical phase with respect to the G signal by a ½ line as in the FIG. 25, while FIG. 27 shows an interpolation line h2 generated in the same manner. As shown in FIG. 26, signals required to generate the interpolation line h1 between the (n−1)th line and the nth line, $R_{m-1}$, $G_{m-1}$, $B_{m-1}$ and $R_m$, $G_m$, $B_m$, are shown by (Equation 8), while luminance signals $Y_{m-1}$, $Y_m$ and color-difference signals $(R-Y)_{m-1}$, $(R-Y)_m$ and $(B-Y)_{m-1}$, $(B-Y)_m$ to be generated are shown by (Equation 9):

Equation 8:

$$R_{m-1} = (R_{n-2} + R_n)/2,\ G_{m-1} = G_{n-1},$$
$$B_{m-1} = (B_{n-2} + B_n)/2$$
$$R_m = R_n,\ G_{m-1} = (G_{n-1} + G_{n+1})/2,$$
$$B_m = B_n$$

Equation 9:

$$Y_{m-1} = 0.3R_{m-1} + 0.59G_{m-1} + 0.11B_{m-1} =$$
$$0.3(R_{n-2} + R_n)/2 + 0.59G_{n-1} + 0.11(B_{n-2} + B_n)/2$$
$$Y_m = 0.3R_n + 0.59(G_{n-1} + G_{n+1})/2 + 0.11B_n$$
$$(R - Y)_{m-1} = 0.7(R_{n-2} + R_n)/2 - 0.59G_{n-1} -$$
$$0.11(B_{n-2} + B_n)/2$$
$$(R - Y)_m = 0.7R_n - 0.59(G_{n-1} + G_{n+1})/2 - 0.11B_n$$
$$(B - Y)_{m-1} = -0.3(R_{n-2} + R_n)/2 - 0.59G_{n-1} +$$
$$0.89(B_{n-2} + B_n)/2$$
$$(B - Y)_m = -0.3R_n - 0.59(G_{n-1} + G_{n+1})/2 + 0.89B_n$$

Also, as shown in FIG. 27, signals required to generate the interpolation line h2 between the nth line and the (n+1)th line, $R_m$, $G_m$, $B_m$ and $R_{m+1}$, $G_{m+1}$, $B_{m+1}$, are shown by (Equation 10), while luminance signals $Y_m$, $Y_{m+1}$ and color-difference signals $(R-Y)_m$, $(R-Y)_{m+1}$ and $(B-Y)_m$, $(B-Y)_{m+1}$ to be generated are shown by (Equation 11):

Equation 10:

$$R_m = R_n,\ G_m = (G_{n-1} + G_{n+1})/2,\ B_m = B_n$$
$$R_{m+1} = (R_n + R_{n+2})/2,\ G_{m+1} = G_{n+1}$$
$$B_{m+1} = (B_n + B_{n+2})/2$$

Equation 11:

$$Y_m = 0.3R_n + 0.59(G_{n-1} + G_{n+1})/2 + 0.11B_n$$
$$Y_{m+1} = 0.3(R_n + R_{n+2})/2 + 0.59G_{n+1} + 0.11(B_n +$$
$$B_{n+2})$$
$$(R - Y)_m = 0.7R_n - 0.59(G_{n-1} + G_{n+1})/2 - 0.11B_n$$
$$(R - Y)_{m+1} = 0.7(R_n + R_{n+2})/2 - 0.59G_{n+1} -$$
$$0.11(B_n + B_{n+2})/2$$
$$(B - Y)_m = -0.3R_n - 0.59(G_{n-1} + G_{n+1})/2 +$$
$$0.89B_n$$
$$(B - Y)_{m+1} = -0.3(R_n + R_{n+2})/2 - 0.59G_{n+1} +$$
$$0.89(B_n + B_{n+2})/2$$

Figure 28:
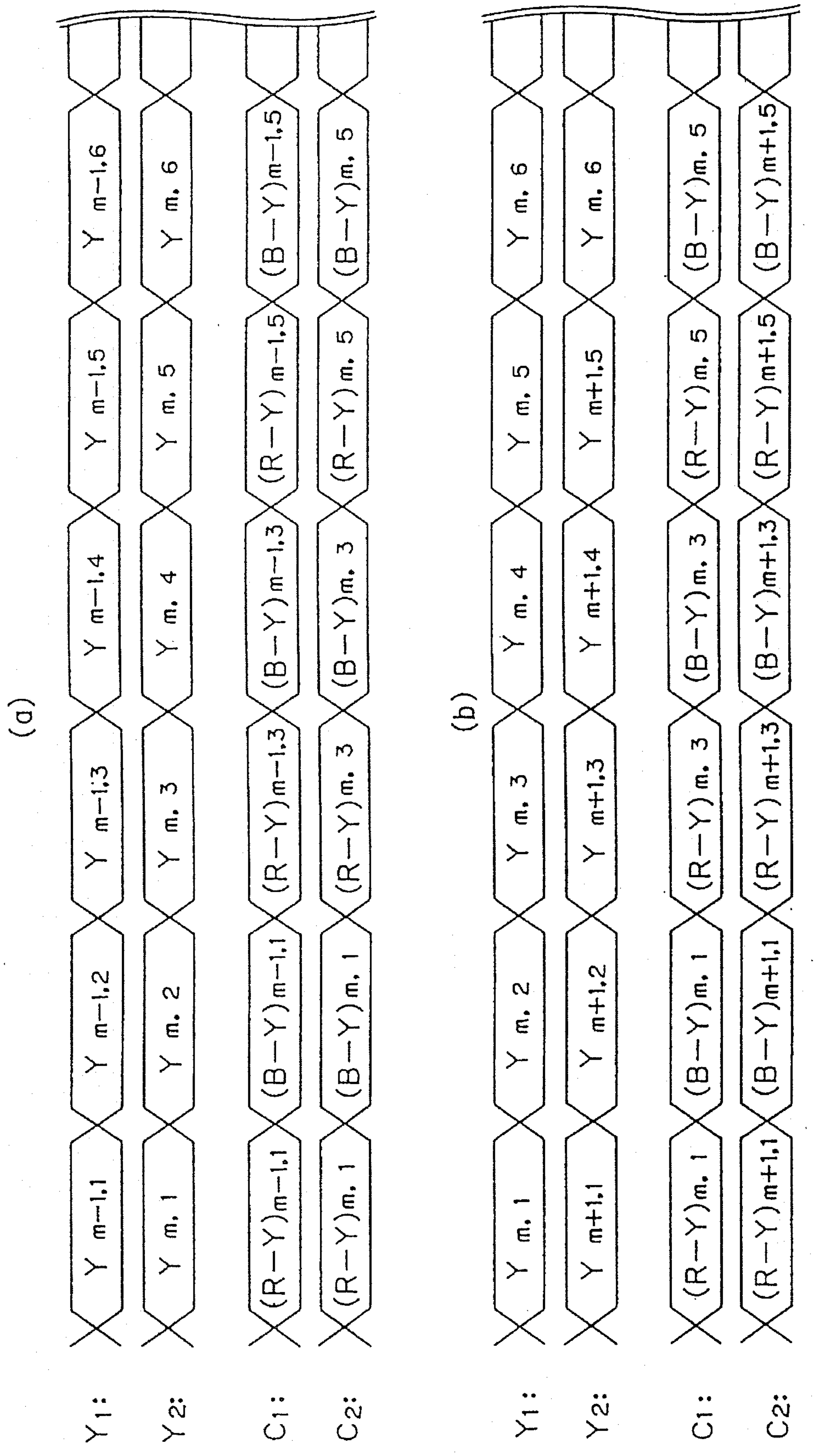
FIG. 28 is an explanatory view of an output signal of the digital signal processing circuit in the image pickup apparatus with a horizontal line interpolation function in the sixth embodiment.

By selecting two signals required to generate interpolation lines out of three signals generated from signals of successive two lines, it becomes possible to generate an interpolation signal at any arbitrary position. The above-described selection of two signals is implemented by the selector circuit depending on the control from the system control circuit, and matrix operation of $Y_{m-1}$ for generation of the interpolation line h1 and $Y_m$ for generation of the interpolation line h2 is implemented by the Y1 matrix circuit 1308, and matrix operation of $Y_m$ for generation of the interpolation line h1 and $Y_{m+1}$ for generation of the interpolation line h2 is implemented by the Y2 matrix circuit 130. Similarly, matrix operation of $(R-Y)_{m-1}$, $(B-Y)_{m-1}$ for generation of the interpolation line h1 and $(R-Y)_m$, $(B-Y)_m$ for generation of the interpolation line h2 is implemented by the C1 matrix circuit 1310, while with matrix operation of $(R-Y)_m$, $(B-Y)_m$ for generation of the interpolation line h1 and $(R-Y)_{m+1}$, $(B-Y)_{m+1}$ for generation of the interpolation line h2 is implemented by the C2 matrix circuit 1311. Further, in the C1 and C2 matrices, (R-Y) signals and (B-Y) signals are outputted in time division after decimated. Output signals of the digital signal processing circuit 1201 of FIG. 23, which performs the above-described operation, is shown in FIG. 23. In FIG. 28, for example, $(Y_{m-1,1})$ represents the luminance signal of the 1st pixel of the (m−1)th line. FIG. 28(*a*) diagrams an output signal of interpolation as shown in FIG. 26, where chrominance signals are time-sequenced with color-difference signals decimated every two pixels. Outputs in FIG. 28(*a*) are signals of the (m−1)th and mth lines, while outputs in FIG. 28(*b*) are signals of the mth and (m+1)th lines.

Figure 29:
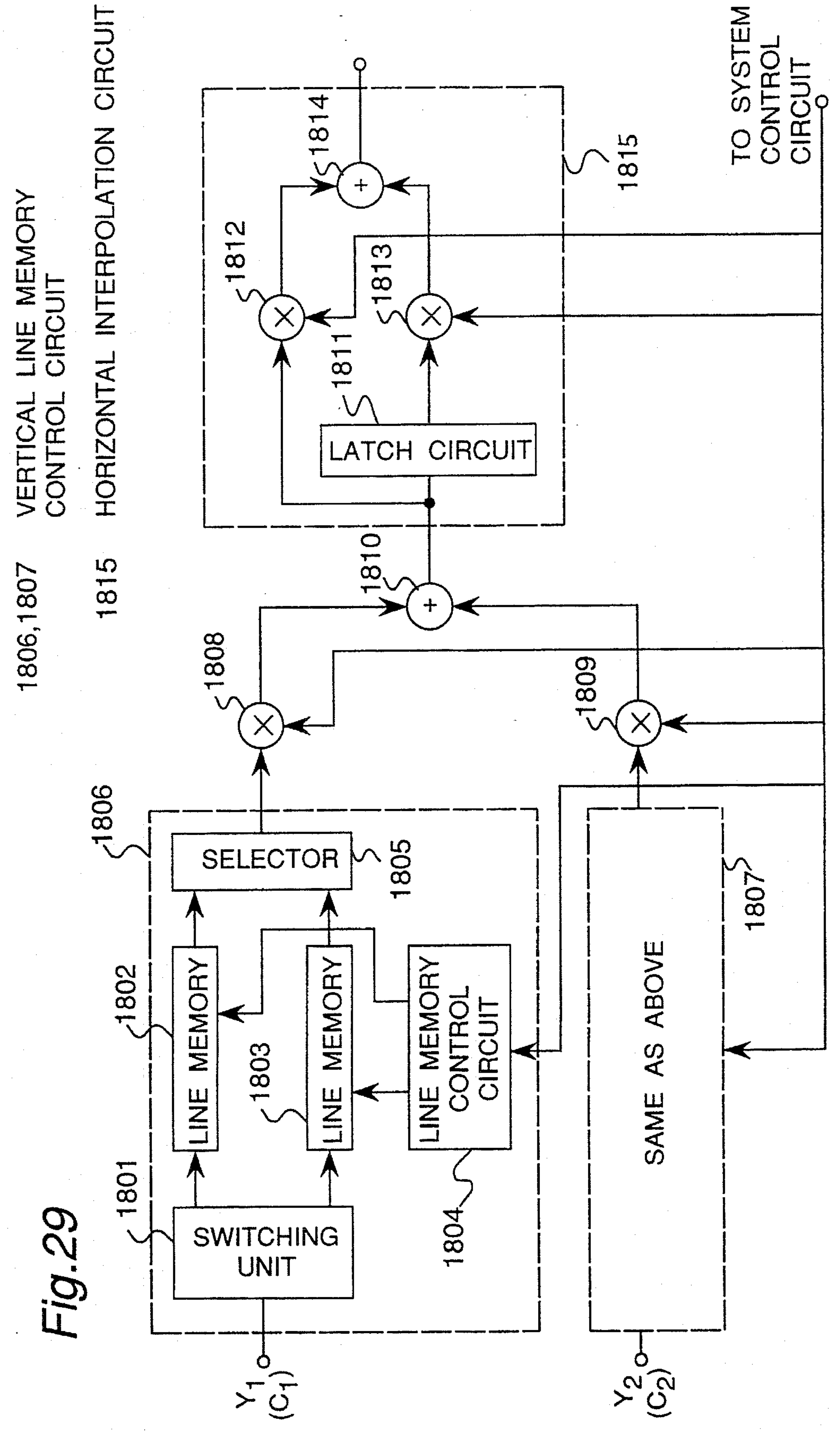
FIG. 29 is a constitutional diagram of an electronic zoom circuit in the image pickup apparatus with a horizontal line interpolation function in the sixth embodiment.

Next, output signals of the digital signal processing circuit 1201 in FIG. 23 are respectively stored in the field memories 1202–1205 by control of the field memory control circuit 1206, and thereafter subjected to interpolation calculation in the electronic zoom circuit 1207 using the above signals from the field memories. The interpolation calculation is performed with signals of two lines in the positional relation of a frame signal. For example, in the case of FIG. 26, interpolation calculation is implemented by using signals of the (m−1)th line and the mth line which are in the positional relation of a frame signal, while in the case of FIG. 27, the interpolation calculation is similarly performed by using signals of the mth line and the (m+1)th line, which are in the positional relation of a frame signal. An construction example of this electronic zoom circuit is illustrated in FIG. 29. In the figure, reference numeral 1801 denotes a switching unit; 1802, 1803 denote line memories; 1804 denotes a line memory control circuit; 1805 denotes a selector circuit; 1806, 1807 denote vertical line memory control circuits; 1808, 1809 denote multipliers for vertical interpolation; 1810 denotes an adder; 1811 denotes a latch circuit for giving horizontal delay; 1812, 1813 denote multipliers for horizontal interpolation; 1814 denotes an adder; and 1815 denotes a horizontal interpolation circuit. Operation of the electronic zoom circuit is described below, focused on its different points from the electronic zoom circuit 720 of FIG. 18. In FIG. 29, signals of two lines, Y1 and Y2 or C1 and C2, which are to be calculated for interpolation, are fed to perform vertical interpolation calculation with the respective signals and vertical interpolation data. Therefore, the vertical line memory control circuits 1806 and 1807 control the two line memories so that one of the two is used for Write and the other is for Read.

As described above, according to the present embodiment, with the provision of a digital signal processing circuit and an electronic zoom circuit for generating Y1 and Y2 signals and C1 and C2 signals, it is possible to generate an interpolation signal from luminance signals and color-difference signals of two lines which are in the positional relation of a frame signal having less deterioration in image quality, and therefore, deterioration in vertical sharpness of a horizontal line interpolation signal can be reduced, so that an image with less deterioration in image quality can be obtained. Further, since signals of two lines necessary for interpolation are fed as inputs to the electronic zoom circuit, the number of lines memories within the electronic zoom circuit is small and the circuit scale can be reduced.

In addition, in the third, fourth, fifth, and sixth embodiments, drive control of the image pickup devices has been performed in order to shift the phase of three chrominance signals, R, G, and B, but, it may be conceived, for example, that the image pickup device, when secured in contact to the three-color separation prism for obtaining three chrominance signals, are shifted in position vertically unlike the conventional fashion, in addition to the drive control, or that the three-color separation prism is arranged so as to have such an inside refractive index that the optical path of light is curved, whereby the phase of chrominance signals is shifted. Also, in this case, the range of p1, p2, and p3 has been arranged to be equal to or more than 0 and less than 1, but the present invention is not limited to this, and for example, it is apparently possible to arrange that p1=1.5, in which case the same effect as in the case of p1=0.5 can be obtained (this is applicable also to p2 and p3).

Further, the third, fourth, fifth, and sixth embodiments have been described only on the fact that R, G, and B signals are generated as outputs in connection to the image pickup section, however, there may be considered a construction, of a three–plate type image pickup apparatus having three solid state image pickup elements for obtaining R, G, and B signals, respectively, or of a two-plate type image pickup apparatus having two image pickup elements one of which is to obtain a G signal while the other is to obtain R and B signals.

Further, the third embodiment has been described taking the case where R, G, and B signals from the electronic zoom circuit are converted into NTSC signals by the encoder circuit, while the fourth, fifth, and sixth embodiments have been described up to a state where the R, G, and B signals or Y and C signals are outputted from the electronic zoom circuit, however, the signals may also be converted into NTSC signals or other signals.

Further, in the third, fourth, fifth, and sixth embodiments, the three signals have been assumed to be R, G, and B, but the present invention is not limited to this, and for example, three chrominance signals of yellow, cyan, and magenta may be used.

Further, in the third, fourth, fifth, and sixth embodiments, the interpolation circuit has been described with regard to only control of line memories, but, in addition to this, control for reading from the image pickup elements or field memories is also necessitated, but, such control can be implemented depending on the R, G, and B signals or Y and C signals, but the present invention is not limited to this.

Further, in the third, fourth, fifth, and sixth embodiments, the interpolation process has been described in the case of linear interpolation, but the present invention is not limited to this, and it is apparently possible to perform high-order interpolation processing such as quadratic interpolation by using three or more line memory output signals.

Further, it is possible to use the contents of the third, fourth, fifth, and sixth embodiments described for the individual embodiments, in combination with one another. For example, although removal of false signals has been described in connection to only the third embodiment, yet this may be used in combination with the fourth, fifth, and sixth embodiments.

[7] <Seventh embodiment: A construction for forming a frame still image>

Figure 30:
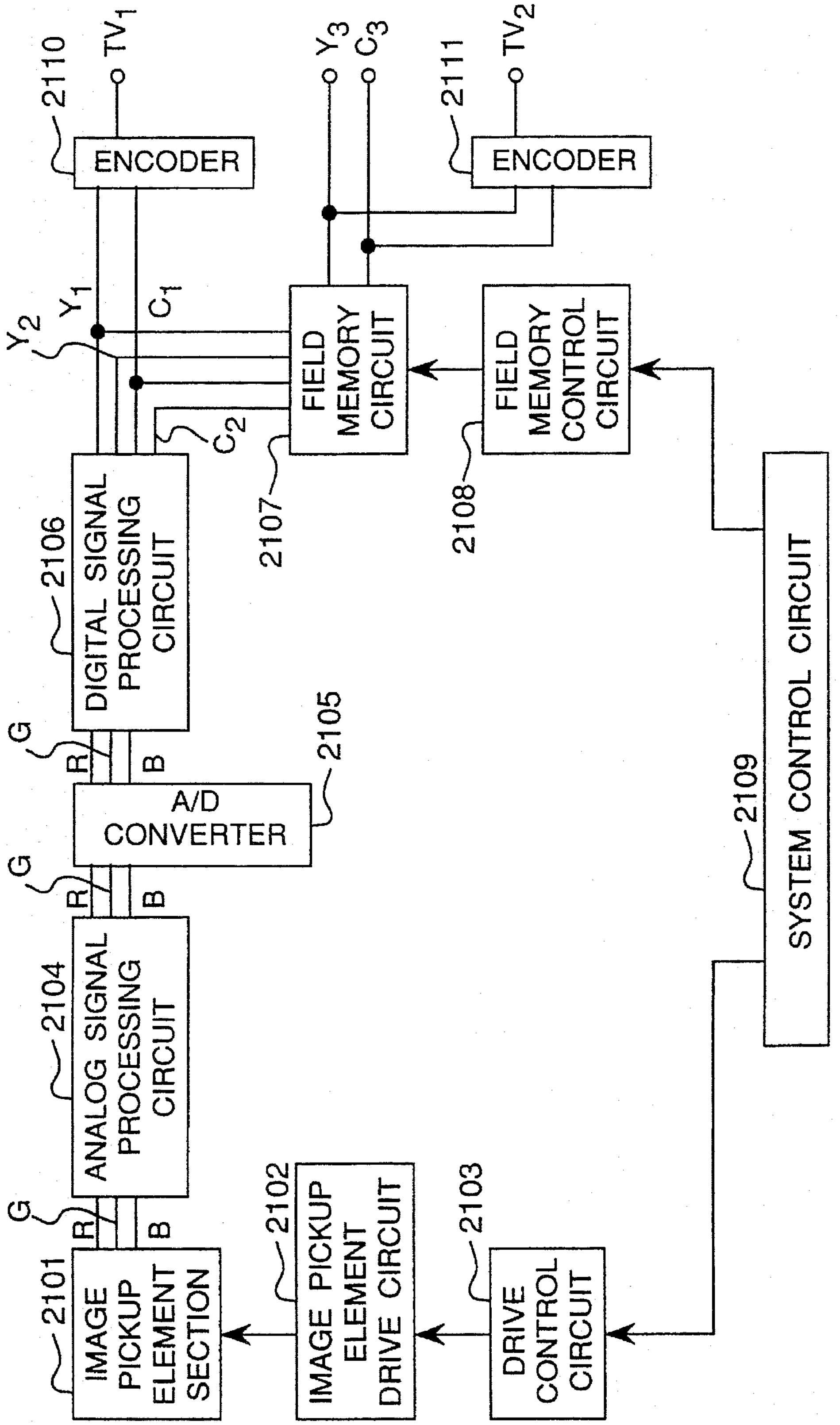
FIG. 30 is a block diagram of an image pickup apparatus with a horizontal line interpolation function in the seventh embodiment.

FIG. 30 is a block diagram of an image pickup apparatus with a horizontal line interpolation function in a seventh embodiment. Referring to FIG. 30, reference numeral 2101 denotes an image pickup element section having a photoelectric conversion function; 2102 denotes an image pickup element drive circuit for the image pickup element section 2101; 2103 denotes a drive control circuit for controlling the image pickup element drive circuit 2102; 2104 denotes an analog signal processing circuit for performing processing such as sampling and amplification on output signals of the image pickup element 2101; 2105 denotes an analog-to-digital converter circuit (hereinafter, referred to as A/D converter) for output signals of the analog signal processing circuit 2102; 2106 denotes a digital signal processing circuit for performing generation of luminance signals, chrominance signals and color-difference signals, or the like from A/D converted digital signals or performing RGB signal processing; 2107 denotes a field memory circuit for storing output signals of the digital signal processing circuit 2106; 2108 denotes a field memory control circuit for controlling the field memory circuit 2107; 2109 denotes a system control circuit for comprehensively controlling the drive control circuit 2103 and the field memory control circuit 2108; 2110 denotes an encoder circuit for obtaining television signals such as NTSC signals from output signals of the digital signal processing circuit 2106; and 2111 denotes an encoder circuit for obtaining television signals such as NTSC signals from output signals of the field memory circuit 2107.

The image pickup apparatus with a horizontal line interpolation function of the present embodiment constructed as above is described below on its operation. A plurality of output signals of R, G, and B fed from the image pickup element section 2101 are subjected to analog signal processing and A/D conversion and thus formed into digital signals. These digital signals are processed for luminanoe signals (Y1, Y2) and chrominance signals (C1, C2) by the digital signal processing circuit 2106, and fed to the field memory circuit 2107. The signals fed to the field memory circuit 2107 are yielded as a frame still image output by the field memory control circuit 2108.

FIG. 13 shows frame storage drive control of the image pickup elements by the drive control circuit 2103. FIG. 13(*a*) shows an outline of the common interlace-reading drive control of the image pickup elements, while FIG. 13(*b*) shows an outline of the reading drive control of R, G, and B image pickup elements for obtaining each R, G, and B signals, which is an construction example of the image pickup element section 2101 in the present embodiment. In the frame storage mode as shown in FIG. 13(*a*), in the odd field, signals of pixels of alternate odd-numbered lines are read vertically out of the pixels in the photosensitive section during field shift periods, and next, in the even field, signals of pixels of even-numbered lines are read, and thus, interline transfer is accomplished. In the present embodiment, as shown in FIG. 13(*b*), in the odd field, the R and B image pickup elements out of the R, G and B image pickup elements read signals of pixels of odd-numbered lines vertically, while the G image pickup element reads signals of pixels of even-numbered lines, and next, in the even field, the R and B image pickup elements out of the R, G and B image pickup elements read signals of pixels of even-numbered lines vertically, while the G image pickup element reads signals of pixels of odd-numbered lines. In this way, odd/even reading by the R, G and B image pickup elements is inversed between the R and B image pickup elements and the G image pickup element by the frame storage drive control.

Nextly, FIG. 14 shows field storage drive control of the image pickup elements. FIG. 14(*a*) outlines common interlace-reading drive control of the image pickup elements, while FIG. 14(*b*) outlines reading drive control of the R, G and B image pickup elements for obtaining R, G and B signals, which is another arrangement example of the image pickup element section 2101 in the present embodiment. In the field storage mode as shown in FIG. 14(*a*), in the odd field, signals of odd-numbered lines and signals of their succeeding even-numbered lines are simultaneously added up (PDmix) and read from pixels of lines close to a horizontal transfer CCD (not shown), and then in the even field, with combination for the addition changed, signals of even-numbered lines and signals of their succeeding odd-numbered lines as counted from bottom are simultaneously added up and read, so that the interline transfer is accomplished. In the present embodiment, as shown in FIG. 14(*b*), in the odd field, out of the R, G and B image pickup elements, the R and B image pickup elements perform the reading of the odd field as shown in FIG. 14(*a*), while the G image pickup element performs the reading of the even field, and then in the even field, out of the R, G and B image pickup elements, the R and B image pickup elements perform the reading of the even field, while the G image pickup element performs the reading of the odd field. In this way, odd/even PDmix reading by the R, G and B image pickup elements is inversed between the R and B image pickup elements and the G image pickup element by the field storage drive control.

As shown in FIG. 13 and FIG. 14 above, by inversing the odd/even reading between the R and B image pickup elements and the G image pickup element, the resulting R and B signals and the G signal are shifted in their spatial position (phase) by a ½ line (line width in one field).

As described above, according to the present embodiment, there is exemplified a case where a drive control circuit is provided to shift the phase of the three chrominance signals, R, G, and B. Other than this, the three chrominance signals R, G, and B can be shifted in phase also by securing the solid state image pickup elements in contact to a three-color separation prism provided for obtaining three chrominance signals or a two-color separation prism in such a way that the image pickup elements are shifted in position vertically.

Nextly, the method of signal processing for the resulting R, G, and B chrominance signals is described below.

Figure 31A:
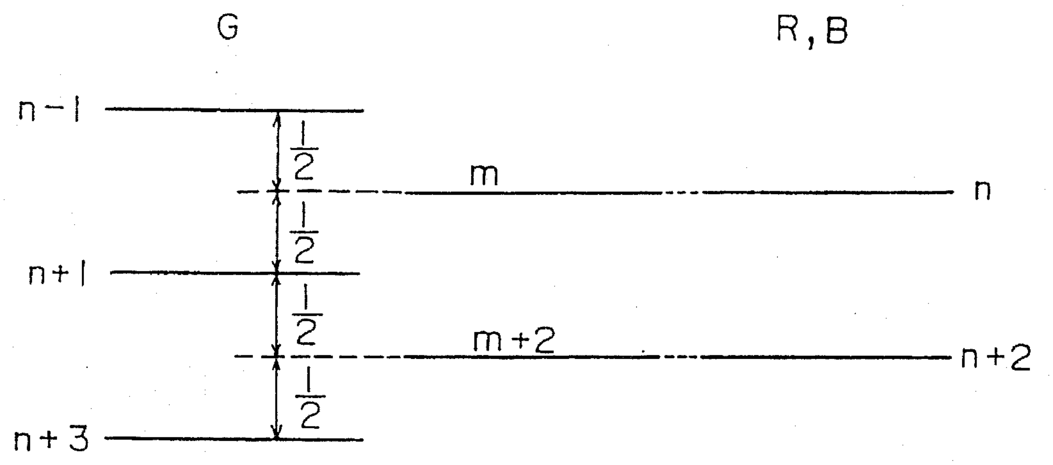
FIGS. 31(*a*) and 31(*b*) are explanatory views of signal processing of the image pickup apparatus with a horizontal line interpolation function in the seventh embodiment.
Figure 31B:
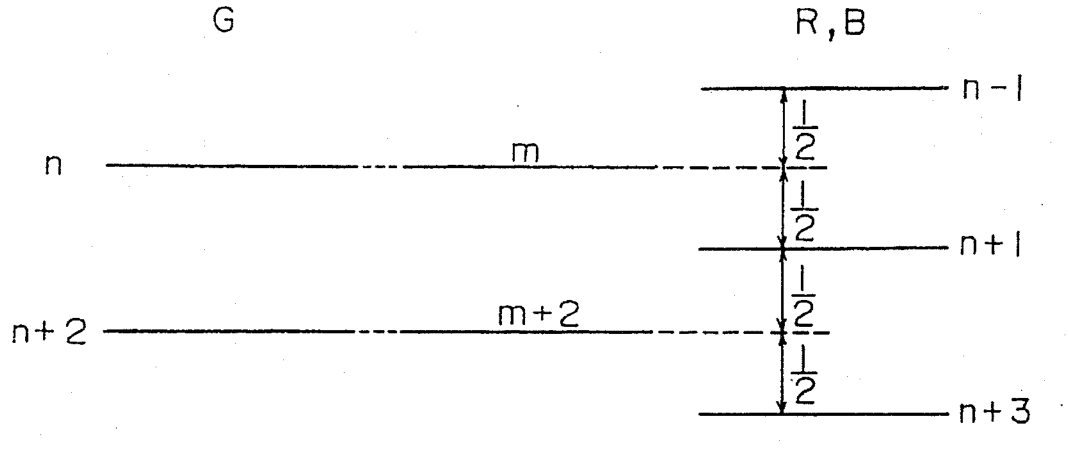

FIG. 31 outlines the signal processing. FIG. 31(*a*) outlines processing for obtaining a G signal coincident in phase with the R signal and the B signal, while FIG. 31(*b*) outlines processing for obtaining an R signal and a B signal coincident in phase with the G signal. Since the R and B signal and the G signal are shifted in phase by a ½ line (line width in one field) as shown in FIG. 31, the signals need to be made coincident in vertical phase for signal processing. Thus, in the case of FIG. 31(*a*), two lines succeeding with respect to the G signal are subjected to averaging process (interpolation process with interpolation coefficients of ½, 1/2), so that the phase of the R, G and B signals are made coincident in phase with each other, while in the case of FIG. 31(*b*), averaging process is effected on two lines succeeding with respect to the R and B signal (interpolation process with interpolation coefficients of ½, 1/2), whereby the R, G, and B signals can be made coincident in phase. This is shown in (Equation 12):

$$(a):\quad R_m = R_n,\ B_m = B_n,\ G_m = (G_{n-1} + G_{n+1})/2$$

$$(b):\quad R_m = (R_{n-1} + R_{n+1})/2,\ B_m = (B_{n-1} + B_{n+1})/2,\ G_m = G_n$$

Although a case of control (CTL1) where the G signal is spatially shifted in position has been described above in connection to FIGS. 13, 14 and 31(*a*), yet another control (CTL2) in which the R and B signal is spatially shifted in position is also possible in FIG. 31(*b*). Further, such control that position of the R signal only (CTL3) or the B signal only (CTL4) is spatially shifted is possible. This spatial position control is described below. A luminance (Y) signal is generated by R, G and B signals, and is represented by Equation 3:

$$Y=0.3R+0.59G+0.11B$$

where a spatially shifted signal (Ya) and a spatially unshifted signal (Yb) both contained in the luminance signal are represented by the following equations (Equation 4) for the above cases of CTL1–CTL4, respectively:

Equation 4:

$$\begin{aligned} CTL1:&\quad Ya = 0.3R + 0.11B \\ &\quad Yb = 0.59G \\ CTL2:&\quad Ya = 0.59G \\ &\quad Yb = 0.3R + 0.11B \\ CTL3:&\quad Ya = 0.59G + 0.11B \\ &\quad Yb = 0.3R \\ CTL4:&\quad Ya = 0.3R + 0.59G \\ &\quad Yb = 0.11B \end{aligned}$$

Color-difference signals (R-Y and B-Y) are generated from the R, G and B signals, and are represented by (Equation 5):

Equation 5:

$$R-Y=0.7R-0.59G-0.11B$$

$$B-Y=-0.3R-0.59G+0.89B$$

where a spatially shifted signal (Ca) and a spatially unshifted signal (Cb) both contained in the individual color-difference signals are represented by the following (Equation 6) for the above cases of CTL1–CTL4, respectively:

Equation 6:

$$\begin{aligned}
CTL1:\ & Ca(R-Y)=0.7R-0.11B \\
& Ca(B-Y)=-0.3R+0.89B \\
& Cb(R-Y)=-0.59G \\
& Cb(B-Y)=-0.59G \\
CTL2:\ & Ca(R-Y)=-0.59G \\
& Ca(B-Y)=-0.59G \\
& Cb(R-Y)=0.7R-0.11B \\
& Cb(B-Y)=-0.3R+0.89B \\
CTL3:\ & Ca(R-Y)=-0.59G-0.11B \\
& Ca(B-Y)=-0.59G+0.89B \\
& Cb(R-Y)=0.7R \\
& Cb(B-Y)=-0.3R \\
CTL4:\ & Ca(R-Y)=0.7R-0.59G \\
& Ca(B-Y)=-0.3R+0.59G \\
& Cb(R-Y)=-0.11B \\
& Cb(B-Y)=0.89B
\end{aligned}$$

In order to obtain a pseudo frame video signal as a whole video signal, it is necessary for Ya and Yb to be approximately equal and for Ca and Cb to be approximately equal, by (Equation 4) and (Equation 5). This fact makes it understood that CTL1 or CTL2 is proper for the spatial position control. Accordingly, only cases of CTL1 and CTL2 spatial position control are described hereinbelow.

Nextly, an example of circuit construction for the signal processing as shown in FIG. 31 is outlined in FIG. 16. FIG. 16(*a*) is a case where the spatial position control is CTL1, while FIG. 16(*b*) is a case where the spatial position control is CTL2. Those which exhibit the same effects between FIGS. 16(*a*) and (*b*) are designated by like numerals and omitted in their description. FIG. 16(*a*) comprises: a 1H memory 501 for delay of 1 horizontal line period of the G signal; an adder 502; a ½ amplifier 503 for gain control; a luminance signal matrix 504 for performing calculation as shown in (Equation 3); and a chrominance signal matrix 505 for performing calculation as shown in (Equation 5). Similarly, FIG. 16(*b*) comprises: a 1H memory 501 for delay of 1 horizontal line period of the R an B signal; an adder 502; a ½ amplifier 503 for gain control; a luminance signal matrix 504 for performing calculation as shown in (Equation 3); and a chrominance signal matrix 505 for performing calculation as shown in (Equation 5). In the digital signal processing circuit constructed as above, the provision of a vertical interpolation function having the 1H memory, i.e. a 2H line averaging circuit allows the chrominance signals to be made coincident in phase, in which state luminance signal processing and chrominance signal processing are subsequently performed. Further, from FIGS. 16(*a*) and (*b*), it can be understood that FIG. 16(*a*), i.e. the case where the spatial position control is CTL1 (G signal is shifted), is better suited for reduction in circuit scale.

On the other hand, phase adjustment with respect to chrominance signals which are shifted in spatial position (phase) as shown in FIG. 16 is done by LPF processing in the vertical direction, and therefore, in this case, high-band frequency characteristic would deteriorate. When the video signal is viewed as a whole of the three chrominance signals (i.e. for example when a luminance signal synthesized from G, R and B signals by matrix operation is considered), the spatial position control CTL2 in which the R and B signal is shifted in phase as shown in (Equation 4) is superior in high-band frequency characteristic to CTL1 in which the G signal is shifted, in the case of the luminance signal matrix where the calculation as shown in (Equation 3) is performed. Also in the case of chrominance signal matrix where the calculation as shown in (Equation 5) is performed, the spatial position control CTL2 is superior to CTL1 in high-band frequency characteristic as shown in (Equation 6). Thus, it can be understood that the spatial position control CTL2 is preferred for high-band frequency characteristic in the signal processing in which interpolation processing is not performed.

Further, in the chrominance signal matrix in which color-difference signals are generated, there would occur false signals in the high frequency band due to different high-band frequencies of chrominance signals. For example when white color is picked up, it is necessary for color-difference signals R-Y, B-Y to be at zero level. However, in the case of the spatial position control CTL2, a G signal exists ($G \neq 0$) but an R signal or a B signal does not exist ($R=B=0$) in the high frequency band, so that the color-difference signals R-Y, B-Y are other than at zero level as shown in (Equation 7) and therefore false chrominance signals will be generated. This point has been described in detail in the third embodiment, its description being omitted.

Figure 32:
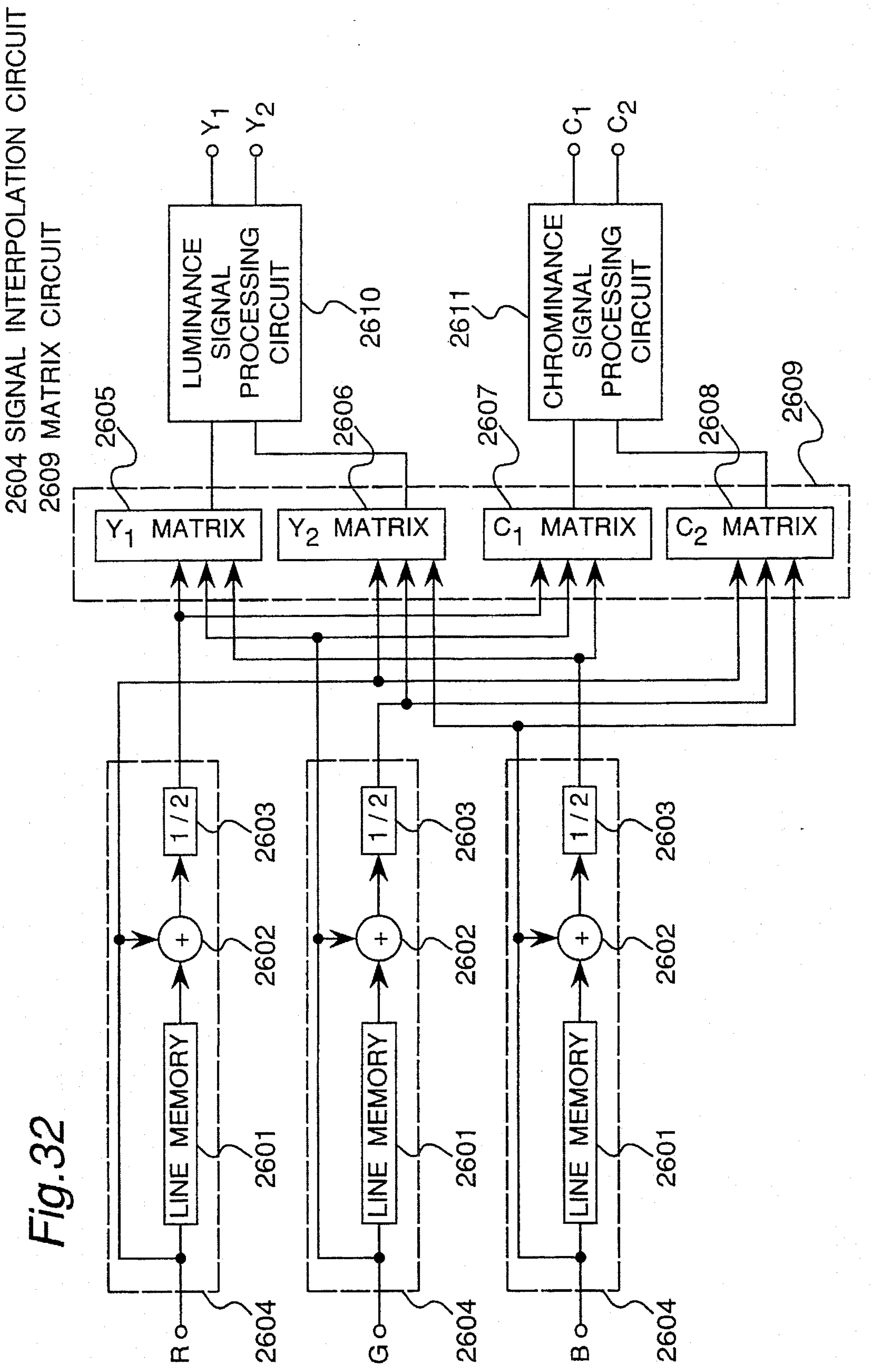
FIG. 32 is a block diagram showing the digital signal processing circuit of the image pickup apparatus with a horizontal line interpolation function in the seventh embodiment.

Next described is the circuit construction of the digital signal processing circuit 2106 in FIG. 30, with reference to FIG. 32. In the figure, reference numeral 2601 denotes a line memory for storing signals of a 1H period; 2602 denotes an adder; 2603 denotes a ½ amplifier for performing gain control; 2604 denotes a signal interpolation circuit composed of the 2601 to 2603; 2605 denotes a Y1 matrix circuit for generating a luminance signal Y1; 2606 denotes a Y2 matrix circuit for generating a luminance signal Y2; 2607 denotes a C1 matrix circuit for generating a chrominance signal C1; 2608 denotes a C2 matrix circuit for generating a chrominance signal C2; 2609 denotes a matrix circuit composed of the 2605 to 2608; 2610 denotes a luminance signal processing circuit for performing processing such as aperture or coring on the luminance signals Y1 and Y2; and 2611 denotes a chrominance signal processing circuit for performing processing such as white balance and color regeneration on the chrominance signals C1 and C2.

Figure 34:
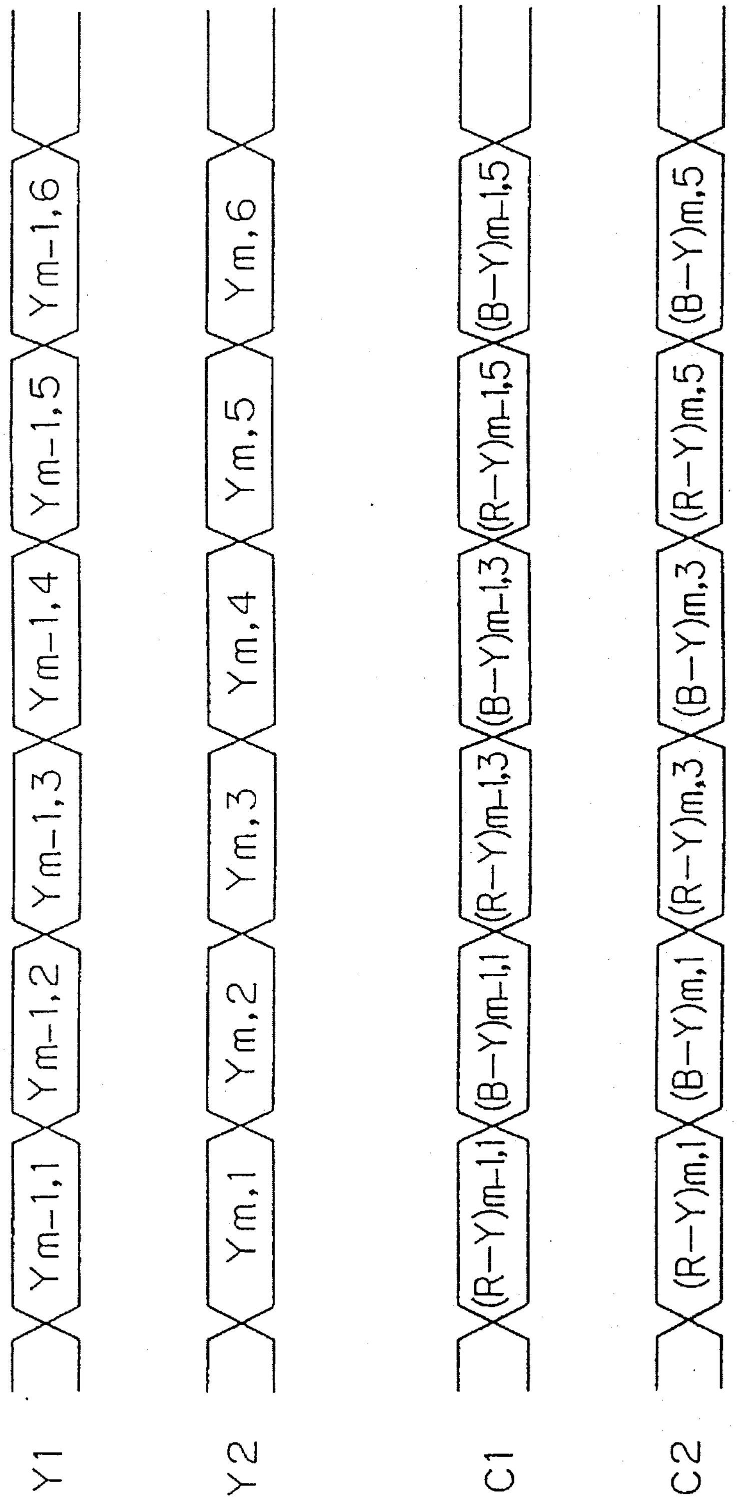
FIG. 34 is an explanatory view of an output signal of the digital signal processing circuit of the image pickup apparatus with a horizontal line interpolation function in the seventh embodiment.

The image pickup apparatus with a horizontal line interpolation function constructed as above is described below on its operation with reference to FIGS. 25, 33, and 34. Referring to FIG. 32, in the signal interpolation circuit 2604, an interpolation signal is generated from signals of successive two lines. This is illustrated in FIG. 25. FIG. 25 shows a signal generated from R, G and B signals where the R and B signal is shifted in vertical phase with respect to the G signal by a ½ line. For example, in the R and B signal, an interpolation signal of the (m+1)th line is generated from signals of the (n−2)th line and the nth line while an interpolation signal of the (m+1)th line is generated from signals of the nth line and the (n+2)th line, and similarly, in the G signal, an interpolation signal of the mth line is generated from signals of the (n−1)th line and the (n+1)th line while an interpolation signal of the (m+2)th line is generated from signals of the (n+1)th line and the (n+3)th line. In this way, interpolation signals are generated from signals of successive two lines. Next, the matrix circuit 2609 in FIG. 32 performs matrix signal processing with signal interpolation circuit output signals of R, G, and B. FIG. 33 shows luminance signals $Y_{m-1}$, $Y_m$ . . . and color-difference signals $(R-Y)_{m-1}$, $(R-Y)_m$ . . . and $(B-Y)_{m-1}$, $(B-Y)_m$ . . . to be generated from R, G, and B signals in which the R and B signals are shifted in vertical phase with respect to the G signal by a ½ line, as in FIG. 25. As shown in FIG. 33, chrominance signals $R_{m-1}$, $G_{m-1}$, $B_{m-1}$ and $R_m$, $G_m$, $B_m$ are shown by (Equation 8), while luminance signals $Y_{m-1}$, $Y_m$ and color-difference signals $(R-Y)_{m-1}$, $(R-Y)_m$ and $(B-Y)_{m-1}$, $(B-Y)_m$ to be generated are shown by (Equation 9):

$$R_{m-1} = (R_{n-2} + R_n)/2,\ G_{m-1} = G_{n-1},$$
$$B_{m-1} = (B_{n-2} + B_n)/2$$
$$R_m = R_n,\ G_{m-1} = (G_{n-1} + G_{n+1})/2,$$
$$B_m = B_n$$

Equation 8:

$$Y_{m-1} = 0.3R_{m-1} + 0.59G_{m-1} + 0.11B_{m-1} =$$
$$0.3(R_{n-2} + R_n)/2 + 0.59G_{n-1} + 0.11(B_{n-2} + B_n)/2$$
$$Y_m = 0.3R_n + 0.59(G_{n-1} + G_{n+1})/2 + 0.11B_n$$
$$(R - Y)_{m-1} = 0.7(R_{n-2} + R_n)/2 - 0.59G_{n-1} - 0.11(B_{n-2} + B_n)/2$$
$$(R - Y)_m = 0.7R_n - 0.59(G_{n-1} + G_{n+1})/2 - 0.11B_n$$
$$(B - Y)_{m-1} = -0.3(R_{n-2} + R_n)/2 - 0.59G_{n-1} + 0.89(B_{n-2} + B_n)/2$$
$$(B - Y)_m = -0.3R_n - 0.59(G_{n-1} + G_{n+1})/2 + 0.89B_n$$

Equation 9:

The above matrix operation for $Y_m-1$ is performed by the Y1 matrix circuit 2605, and the matrix operation for $Y_m$ is performed by the Y2 matrix circuit 2606. Similarly, the matrix operation for $(R-Y)_{m-1}$, $(B-Y)_m-1$ is performed by the C1 matrix circuit 2607, and the matrix operation for $(R-Y)_m$, $(B-Y)_m$ is performed by the C2 matrix circuit 2608. Further, in the C1 and C2 matrices, (R-Y) signals and (B-Y) signals are outputted in time division after decimated. Output signals of the digital signal processing circuit 2106 of FIG. 30 are shown in FIG. 34. In FIG. 34, for example, $(Y_{m-1,1})$ represents the luminance signal of the 1st pixel of the (m−1)th line. FIG. 34 shows a case where chrominance signals are time-sequenced with color-difference signals decimated every two pixels. Outputs in FIG. 34 are a (m−1)th line signal as the Y1 signal and a mth line signal as the Y2 signal.

Next, output signals of the digital signal processing circuit 2106 in FIG. 30 are converted to a television signal (TV1) by the encoder circuit 2110 and outputted as a dynamic image. Also, output signals of the digital signal processing circuit 2106 are controlled by the field memory control circuit 2108 so that images at any arbitrary moments are stored in the field memory circuit 2107, and outputted as a first field signal composed of Y1 and C1 signals, and as a second field signal composed of Y2 and C2 signals and as a luminance signal Y3 and a color-difference signal C3 in time sequence, and further, the Y3 signal and the C3 signal are converted to a television signal (TV2) by the encoder circuit 2111 and outputted as a still image.

Figure 35A:
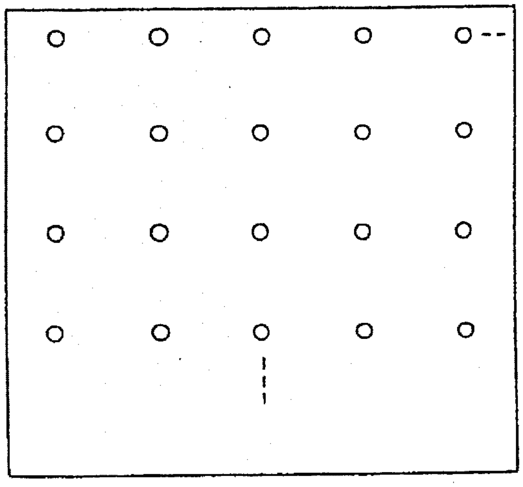
FIGS. 35(*a*), 35(*b*) and 35(*c*) are second explanatory views of an output signal of the digital signal processing circuit of the image pickup apparatus with a horizontal line interpolation function in the seventh embodiment.
Figure 35B:
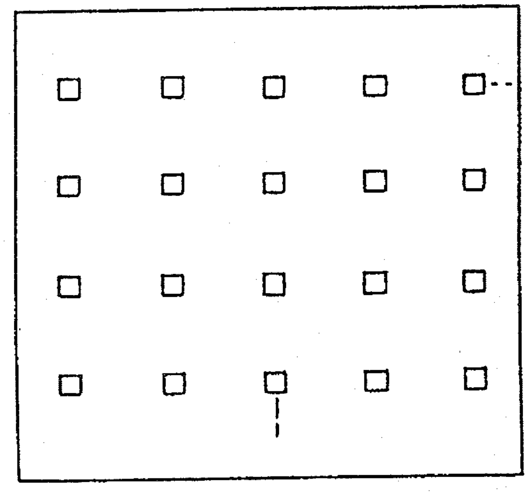
Figure 35C:
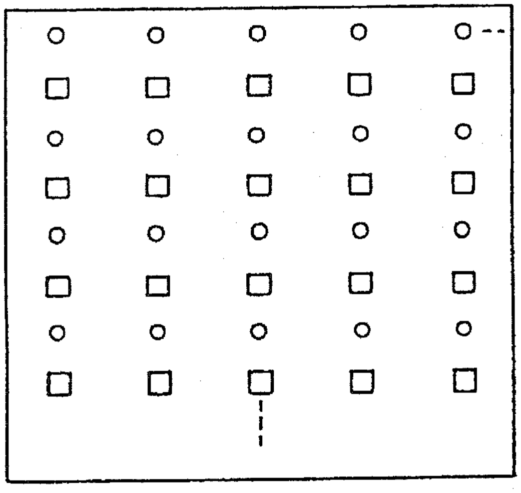

This is explained with reference to FIG. 35. In FIG. 35, (*a*) shows spatial positions represented by the Y1 and C1 signals, (*b*) shows spatial positions represented by Y2 and C2 signals, and (*c*) shows spatial positions represented by Y1, Y2 and CTL1, CTL2 signals. The Y1 and C1 signals in FIG. 35(*a*) and the Y2 and C2 signals in (*b*) are outputted simultaneously every field from the digital signal processing circuit 2106 as shown in FIG. 34. Thus, the above television signal (TV1) is composed of the Y1 signal and the C1 signal and outputted as a dynamic image, and the Y3 and C3 signals form an output of Y1 and C1 signals at positions of (*a*) as a first field signal, an output of Y2 and C2 signals at positions of (*b*) as a second field signal, where the first and second field signals form a high-quality frame still image. Also, the television signal (TV2) combines the Y3 signal and the C3 signal into a composite signal, where the first and second filed signals form a high-quality frame still image.

As described above, according to the present embodiment, with the provision of a digital signal processing circuit for generating Y1 and Y2 signals and C1 and C2 signals, a field memory circuit, and a field memory control circuit, it is possible to generate luminance signals and color-difference signals in the positional relation of a frame signal and to obtain two field signals forming a frame signal of the same time point.

[8] <Eighth embodiment: a construction for forming a frame still image+vertical interpolation selector circuit added>

Figure 36:
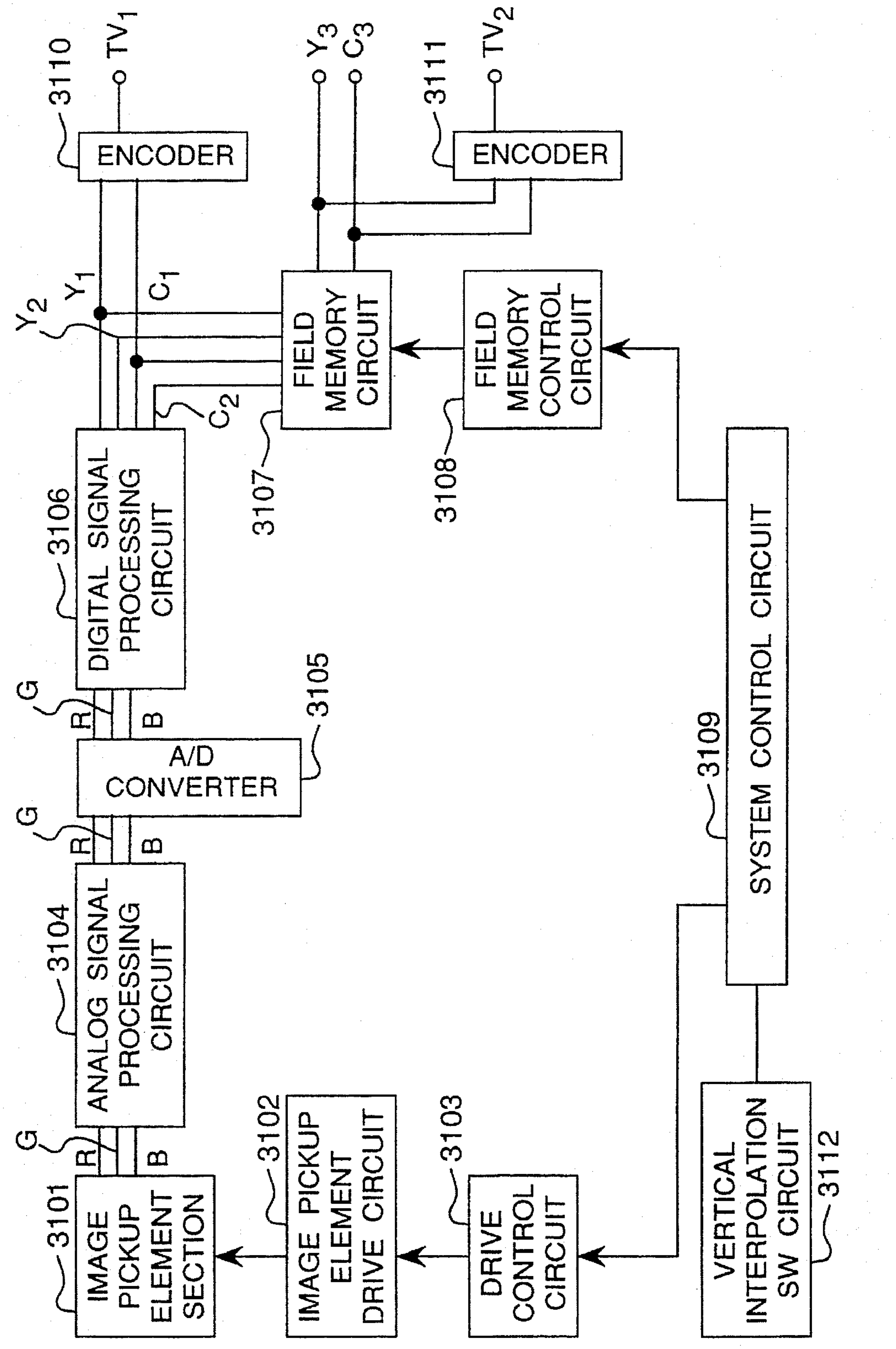
FIG. 36 is a block diagram of an image pickup apparatus with a horizontal line interpolation function in the eighth embodiment.

FIG. 36 is a block diagram of an image pickup apparatus with a horizontal line interpolation function which shows an eighth embodiment. In the figure, 3101 through 3108 and 3110, 3111 are the same as 2101 through 2108 and 2110, 2111 in FIG. 30, and a vertical interpolation SW circuit 3112 and a system control circuit 3109 for comprehensively controlling the circuits differ therefrom. The image pickup apparatus with a horizontal line interpolation function constructed as above is described below, focused on the different points.

Referring to FIG. 36, when still image generation process is not performed, the vertical interpolation SW circuit 3112 is kept in an off state, where the image pickup element section 3101 performs a normal drive operation in which the R, G and B signals are coincident in vertical phase with one another via the system control circuit 3109, the drive control circuit 3103, and the image pickup element drive circuit 3102. On the other hand, when still image processing is performed by the still image generation function, the vertical interpolation SW circuit 3112 is turned to an on-state, where the image pickup element section 3101 performs a drive operation in which the R and B signal and the G signal are different in vertical phase, by means as shown in FIG. 13 and FIG. 14 for the seventh embodiment, via the system control circuit 3109, the drive control circuit 3103, and the image pickup element drive circuit 3102.

In the image pickup apparatus with a horizontal line interpolation function of the present embodiment constructed as above, in the case of signal processing in which the still image generation process is not performed, phase adjustment for chrominance signals is not necessitated because of coincident spatial position (phase), and neither is required to perform vertical LPF processing, and therefore, high-band frequency characteristic will not deteriorate. Also, in the case of signal processing where the frame still image generation process is performed, the digital signal processing circuit can generate Y1, Y2 and C1, C2 signals, while the field memory circuit and the field memory control circuit can generate frame still images, as in the seventh embodiment.

As described above, according to the present embodiment, with the provision of a drive control circuit and a vertical interpolation SW circuit, a high-resolution image free from deterioration in vertical resolution can be obtained when the still image process is not performed, and two field signals forming a frame signal of the same time point can be obtained when the still image process is performed.

In addition, in the seventh and eighth embodiments, drive control of the image pickup elements has been performed in order to shift the phase of three chrominance signals, R, G, and B, but it may be conceived, for example, that the solid state image pickup elements, when secured in contact to the three-color separation prism for obtaining three chrominance signals, are shifted in position vertically unlike the conventional fashion, in addition to the drive control, or that the three-color separation prism is arranged so as to have such an inside refractive index that the optical path of light is curved, whereby the phase of chrominance signals is shifted. Also, in this case, the range of p1, p2, and p3 has been arranged to be equal to or more than 0 and less than 1, but the present invention is not limited to this, and for example, it is apparently possible to arrange that p1=1.5, in which case the same effect as in the case of p1=0.5 can be obtained (this is applicable also to p2 and p3).

Further, the seventh and eighth embodiments have been described taking a case where the three signals are outputs of the solid state image pickup elements, but, the case is the same with signals stored in filed memories or frame memories or the like, where means for shifting the vertical phase can perform memory read control.

Further, in the seventh and eighth embodiments, the image pickup element section has been described only in terms of its output of R, G, and B signals, but, as the construction therefor, there may be considered a three-plate type image pickup apparatus having three solid state image pickup elements for obtaining R, G, and B signals respectively, and a two-plate type image pickup apparatus having two image pickup elements of which one element is for obtaining the G signal and the other element for obtaining the R signal and B signal.

Further, in the seventh and eighth embodiments, the three signals have been assumed to be R, G, and B, but the present invention is not limited to this, and for example, three chrominance signals of yellow, cyan, and magenta may be used.

Further, in the seventh and eighth embodiments, the field memory circuit has been described only on the function of recording images at any arbitrary moments as well as producing an output as a still image by control of the field memory control circuit, and otherwise, for example the recordable number of images can be determined depending on the memory capacity, and the function of instructing arbitrary moments for recording or the way of updating images and the like can be implemented by the provision of switching function via the system control circuit and the field memory control circuit, and therefore, its description is omitted.

Further, the seventh and eighth embodiments have been described taking a case matching the current television signals of the interlacing system as the form of output, however, it is also possible to output frame dynamic signals (Y1, Y2 and C1, C2 signals) as a dynamic output matching televisions of the non-interlacing system, or to output 1-frame image in compliance with the printer input system as an output for still images.

Yet further, the seventh and eighth embodiments have been described taking a case where Y1, Y2 signals and C1, C2 signals are outputted as pseudo frame signals (frame positional signals generated by interpolation), however, the present invention, without being limited to this, may be such that pseudo frame signals of R1, R2 and G1, G2 and B1, B2 are outputted by each of R, G, and B signals, or that Y signals are outputted as pseudo frame signals and C signals are outputted as normal field signals, taking into consideration sensitivity with respect to resolution of the human eye.

What is claimed is:

1. An image pickup apparatus with a horizontal interpolation function comprising:

a plurality of solid state image pickup elements for obtaining three chrominance signals C1, C2, and C3 which are different from each other;

a first vertical phase shift section for shifting a vertical phase of the chrominance signal C2 with respect to the chrominance signal C1 by a specified pitch p1;

a second vertical phase shift section for shifting a vertical phase of the chrominance signal C3 by a specified pitch p2;

coefficient generator means for generating:

(1) a first interpolation coefficient w for interpolating the chrominance signal C1 where $0 \leqq w < 1$;

(2) a second coefficient for interpolating the chrominance signal C2 from the first interpolation coefficient w and the specified pitch p1;

(3) a third coefficient for interpolating the chrominance signal C3 from the interpolation coefficient w and the specified pitch p2;

an interpolation circuit for producing an interpolation horizontal line signal by interpolating the chrominance signal C1 using the first interpolation coefficient w, the chrominance signal C2 using the second coefficient and, the chrominance signal C3 using the third coefficient.

2. The image pickup apparatus with a horizontal line interpolation function as claimed in claim 1, wherein said plurality of solid state image pickup elements for obtaining the different three chrominance signals C1, C2, and C3 comprises a first solid state image pickup element for obtaining the chrominance signal C1, a second solid state image pickup element for obtaining the chrominance signal C2, and a third solid state image pickup element for obtaining the chrominance signal C3.

3. The image pickup apparatus with a horizontal line interpolation function as claimed in claim 1 or 2, wherein said first vertical phase shift section and said second vertical phase shift section are disposed so that the solid state image pickup elements are located so as to be spatially shifted in a vertical direction by the specified pitches p1 and p2.

4. The image pickup apparatus with a horizontal line interpolation function as claimed in claim 1, wherein said first vertical phase shift section and second vertical phase shift section comprise a drive control circuit for controlling a drive circuit for driving the solid state image pickup elements.

5. The image pickup apparatus with a horizontal line interpolation function as claimed in claim 1, wherein said first vertical phase shift section and second vertical phase shift section comprise a drive control circuit for controlling a drive circuit for driving the solid state image pickup elements and said solid state image pickup elements are located so as to be spatially shifted in a vertical direction.

6. The image pickup apparatus with a horizontal line interpolation function as claimed in claim 1, further comprising a drive control circuit which performs frame storage drive control, and at the same time, odd-field reading is effected to some of the plurality of image pickup elements while even-field reading is effected to the rest of the image pickup elements.

7. The image pickup apparatus with a horizontal line interpolation function as claimed in claim 1, further comprising a drive control circuit which performs field storage drive control, and at the same time, odd-field reading is effected to some of the plurality of image pickup elements while even-field reading is effected to the rest of the image pickup elements.

8. The image pickup apparatus with a horizontal line interpolation function as claimed in claim 1, wherein values of the pitches p1 and p2 satisfy the conditions that $0 \leqq p1 < 1$ and $0 \leqq p2 < 1$, respectively.

9. The image pickup apparatus with a horizontal line interpolation function as claimed in claim 1, wherein the pitches p1 and p2 are quantities corresponding to a ½ line portion of 1 field image.

10. The image pickup apparatus with a horizontal line interpolation function as claimed in claim 1, wherein the pitches p1 and p2 are set as $p1=p2=p$.

11. The image pickup apparatus with a horizontal line interpolation function as claimed in claim 1, wherein said plurality of solid state image pickup elements for obtaining the different three chrominance signals C1, C2, and C3 are a first solid state image pickup element for obtaining the chrominance signal C1 and a second solid state image pickup element for obtaining the chrominance signals C2 and C3, and wherein the vertical phase pitches are $p1=p2=p3$.

12. The image pickup apparatus with a horizontal line interpolation function as claimed in claim 11, wherein the value of the pitch p3 satisfies a condition of 0≦p3<1.

13. The image pickup apparatus with a horizontal line interpolation function as claimed in claim 11 or 12, wherein the pitch p3 is a quantity corresponding to a ½ line portion of a video signal to be interlace-scanned.

14. The image pickup apparatus with a horizontal line interpolation function as claimed in claim 11, wherein said interpolation circuit performs interpolation processing on the chrominance signal C1 with an interpolation coefficient w (0≦w<1), and performs interpolation processing on the chrominance signals C2 and C3 with interpolation coefficients determined depending on w and p3.

15. The image pickup apparatus with a horizontal line interpolation function as claimed in claim 11, wherein the two solid state image pickup elements are located so as to be spatially shifted in a vertical direction by the specified pitch p3.

16. The image pickup apparatus with a horizontal line interpolation function as claimed in claim 1, wherein the different three chrominance signals C1, C2, and C3 are three chrominance signals R, G, and B.

17. The image pickup apparatus with a horizontal line interpolation function as claimed in claim 1, wherein the different three chrominance signals C1, C2, and C3 are three chrominance signals R, G, and B, and wherein C1=G.

18. The image pickup apparatus according to claim 1, further comprising a coefficient generation auxiliary means for generating the specified pitches p1 and p2.

19. The image pickup apparatus according to claim 1, further comprising control means for changing the specified pitch p1 of the first vertical phase shift section and the specified pitch p2 of the second vertical phase shift section.

20. The image pickup apparatus according to claim 1, wherein the interpolation means further comprises means for separately interpolating the chrominance signals C1, C2 and C3.

* * * * *